(12) United States Patent
Otani et al.

(10) Patent No.: US 8,817,382 B2
(45) Date of Patent: Aug. 26, 2014

(54) OPTICAL PROJECTION SYSTEM AND PROJECTOR INCLUDING THE SAME

(75) Inventors: Makoto Otani, Matsumoto (JP); Eiji Morikuni, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 34 days.

(21) Appl. No.: 13/529,444

(22) Filed: Jun. 21, 2012

(65) Prior Publication Data

US 2013/0010371 A1  Jan. 10, 2013

(30) Foreign Application Priority Data

Jul. 4, 2011  (JP) .................................. 2011-147999

(51) Int. Cl.
*G02B 13/08* (2006.01)
*G02B 13/12* (2006.01)

(52) U.S. Cl.
CPC ............... *G02B 13/08* (2013.01); *G02B 13/12* (2013.01)
USPC ............ 359/668; 359/432; 359/434; 359/557

(58) Field of Classification Search
USPC ................. 359/296, 449, 432, 578, 668–677, 359/738–740; 353/20, 30, 31, 70, 76, 85, 353/97, 100, 101, 119, 121, 122
See application file for complete search history.

(56) References Cited

U.S. PATENT DOCUMENTS

| 5,671,993 | A | 9/1997 | Shikama |
| 6,829,111 | B2 | 12/2004 | Fujisawa et al. |
| 7,095,563 | B2 | 8/2006 | Nurishi |
| 7,113,344 | B2 | 9/2006 | Nurishi et al. |
| 7,580,601 | B2* | 8/2009 | Katsuma et al. ................. 385/33 |
| 2005/0168829 | A1* | 8/2005 | Nurishi et al. ................ 359/668 |
| 2007/0253076 | A1 | 11/2007 | Takaura et al. |
| 2009/0303607 | A1* | 12/2009 | Inoue et al. ................... 359/668 |
| 2009/0303608 | A1* | 12/2009 | Schauss ........................ 359/674 |
| 2011/0115946 | A1 | 5/2011 | Saruwatari |
| 2012/0320347 | A1 | 12/2012 | Morikuni et al. |
| 2012/0327372 | A1* | 12/2012 | Otani et al. ..................... 353/31 |
| 2013/0010371 | A1 | 1/2013 | Otani et al. |
| 2013/0027676 | A1* | 1/2013 | Otani et al. .................... 353/97 |
| 2013/0229633 | A1 | 9/2013 | Hirata et al. |

FOREIGN PATENT DOCUMENTS

| JP | A-06-043362 | 2/1994 |
| JP | A-2005-221597 | 8/2005 |
| JP | A-2005-300928 | 10/2005 |
| JP | A-2008-511018 | 4/2008 |
| JP | A-2011-107312 | 6/2011 |
| WO | WO 2006/023276 A1 | 3/2006 |

* cited by examiner

*Primary Examiner* — Thomas K Pham
*Assistant Examiner* — Collin X Beatty
(74) *Attorney, Agent, or Firm* — Oliff PLC

(57) ABSTRACT

A light modulation device side lens group has different powers in the longitudinal direction and the lateral direction of a liquid crystal panel. Therefore, as the entire system of the optical projection system, the light modulation device side lens group has different magnification in the longitudinal and lateral directions. Therefore, it is possible to make the aspect ratio of an image of the liquid crystal panel different from the aspect ratio of an image projected on a screen. That is, conversion can be performed on an aspect ratio. At this time, a distance p between each focus or a diaphragm and the screen SC side end surface of the light modulation device side lens group satisfies the conditional expressions, so it is possible to achieve a predetermined or higher telecentricity in both states, that is, a first operating state and a second operating state.

20 Claims, 35 Drawing Sheets

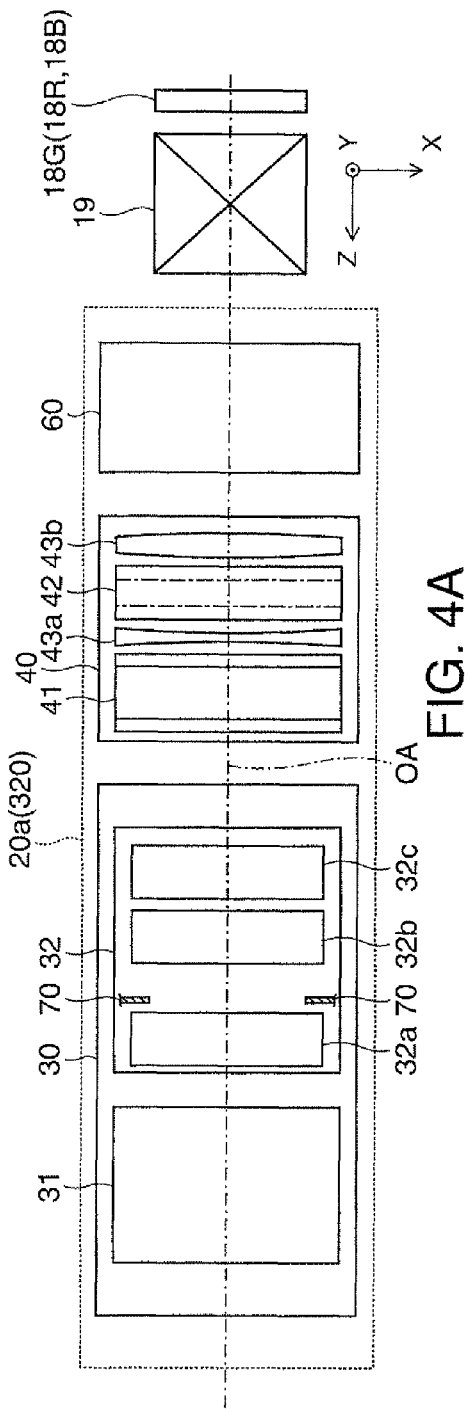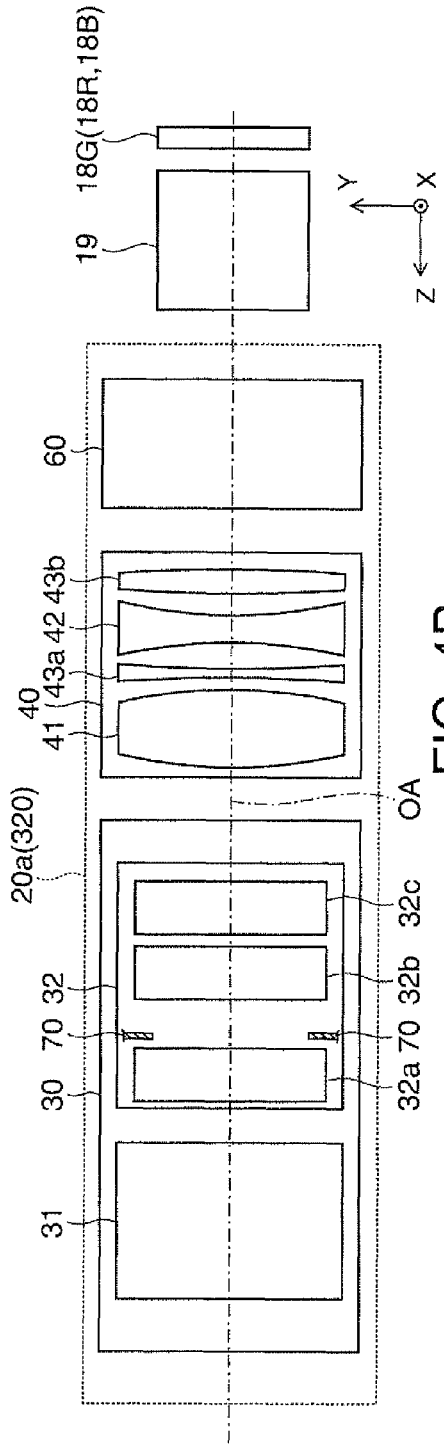

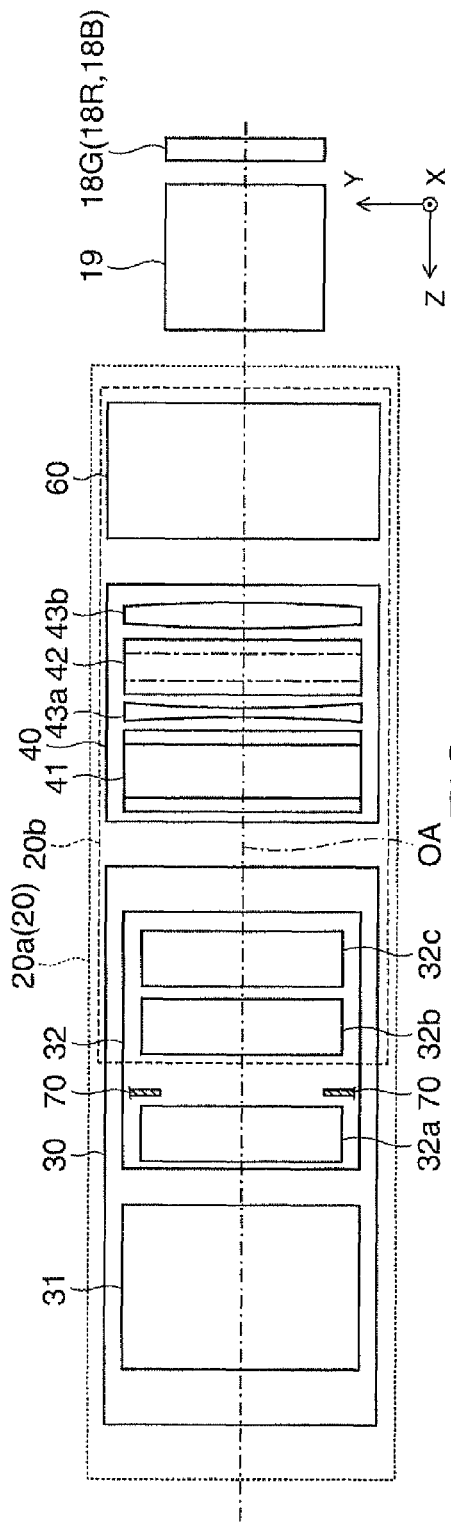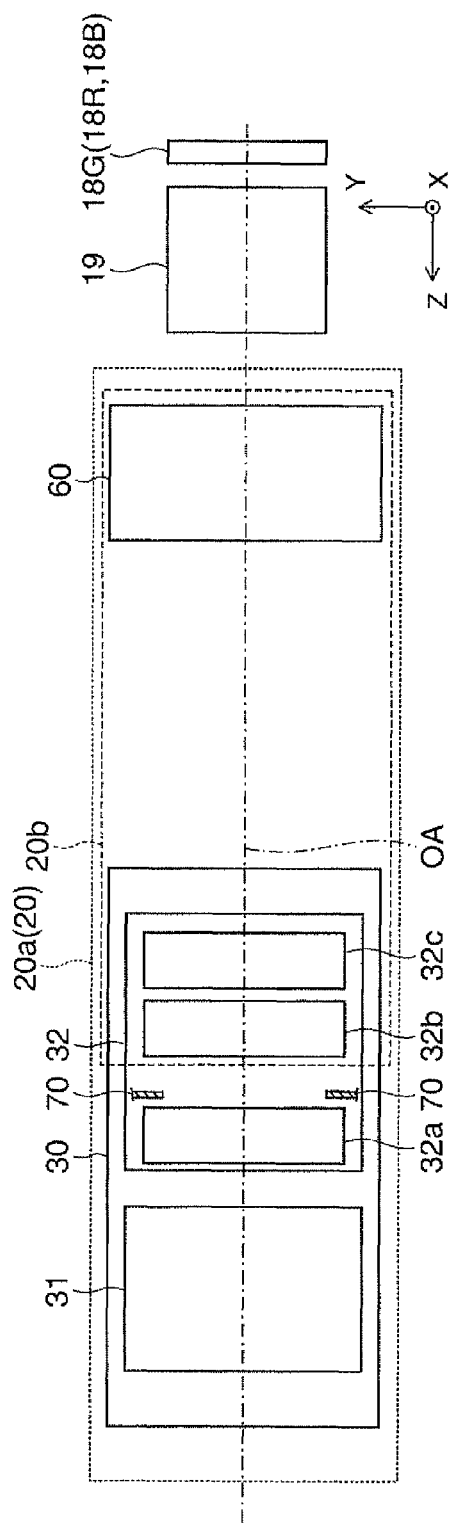

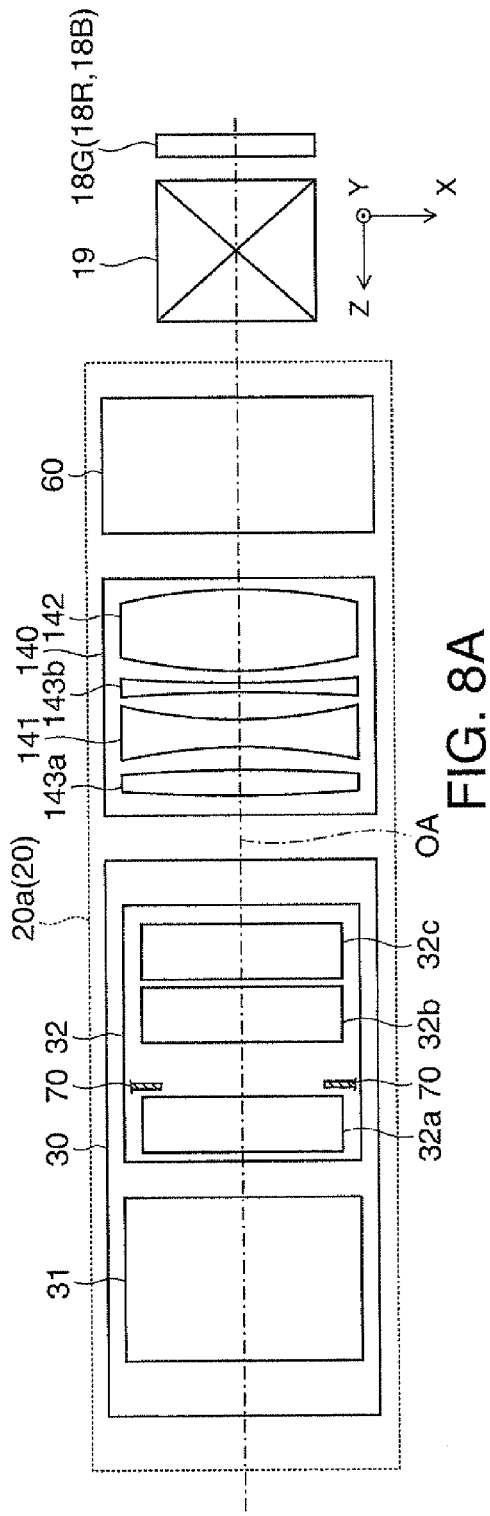
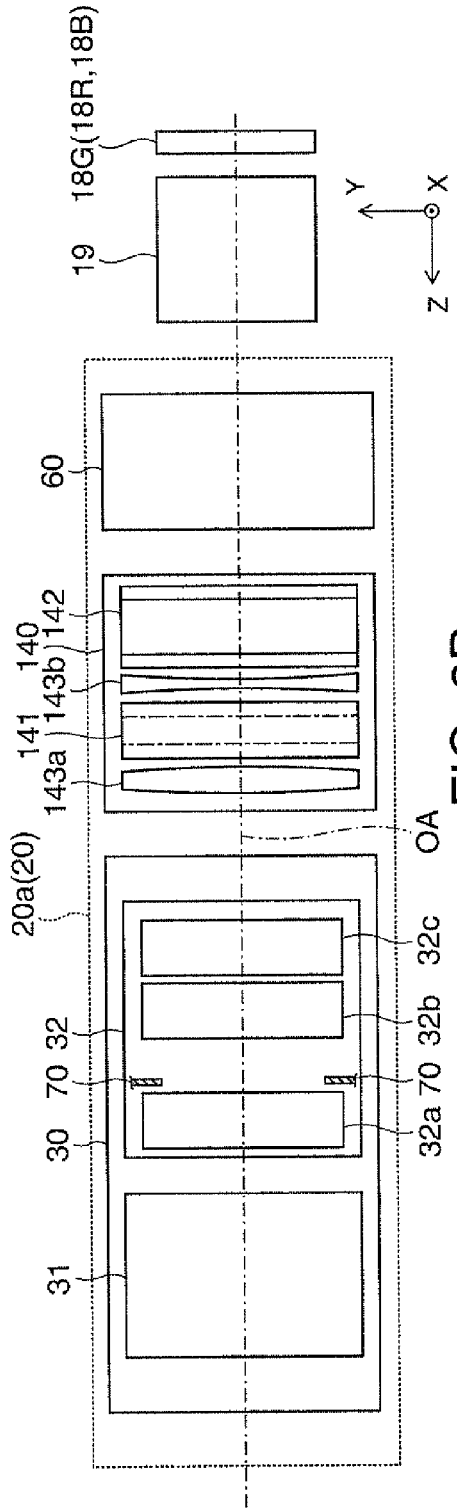
FIG. 8A
FIG. 8B

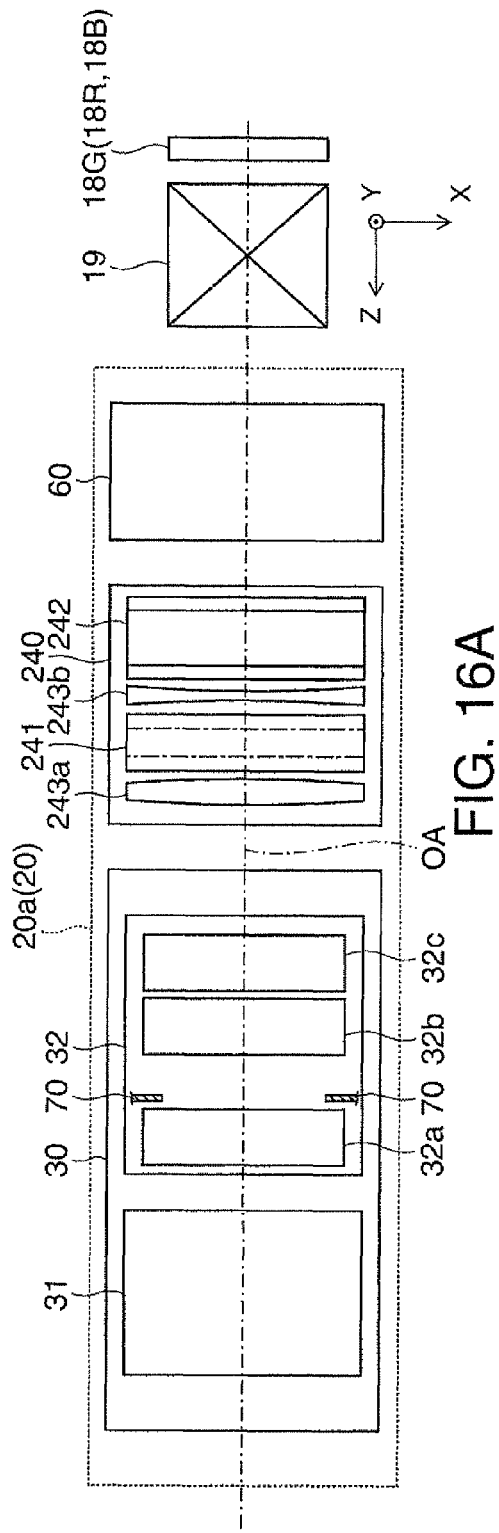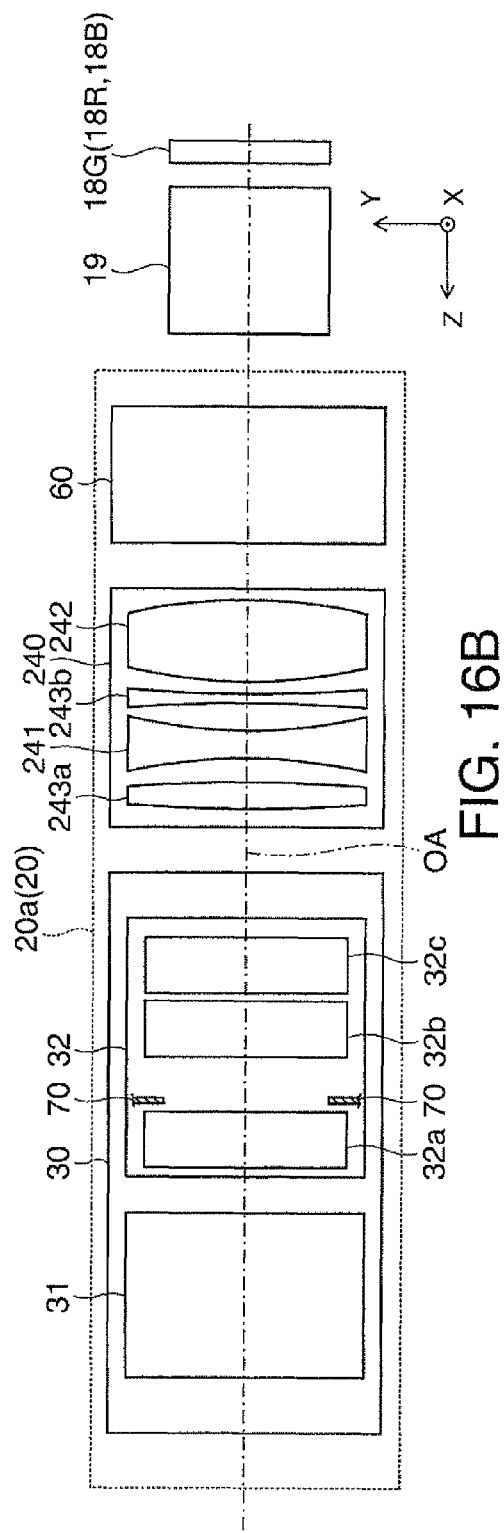

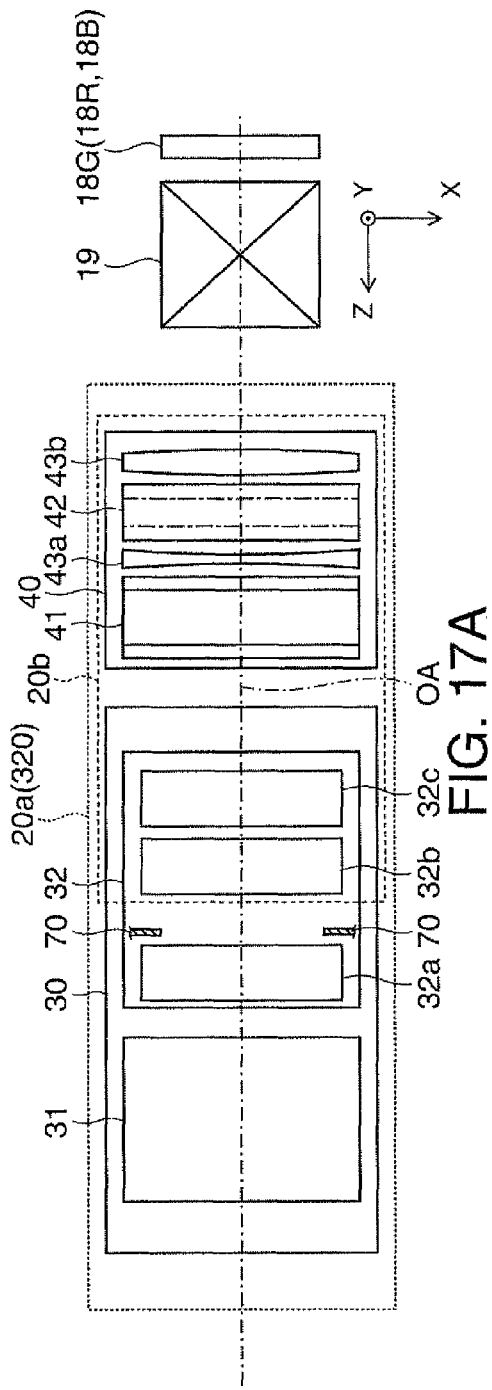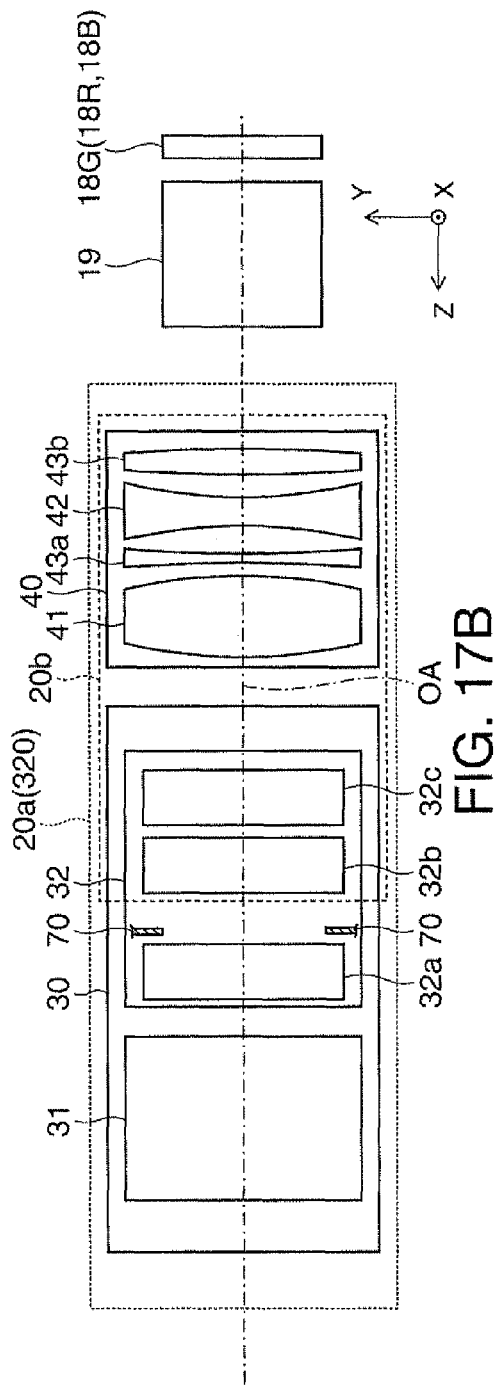

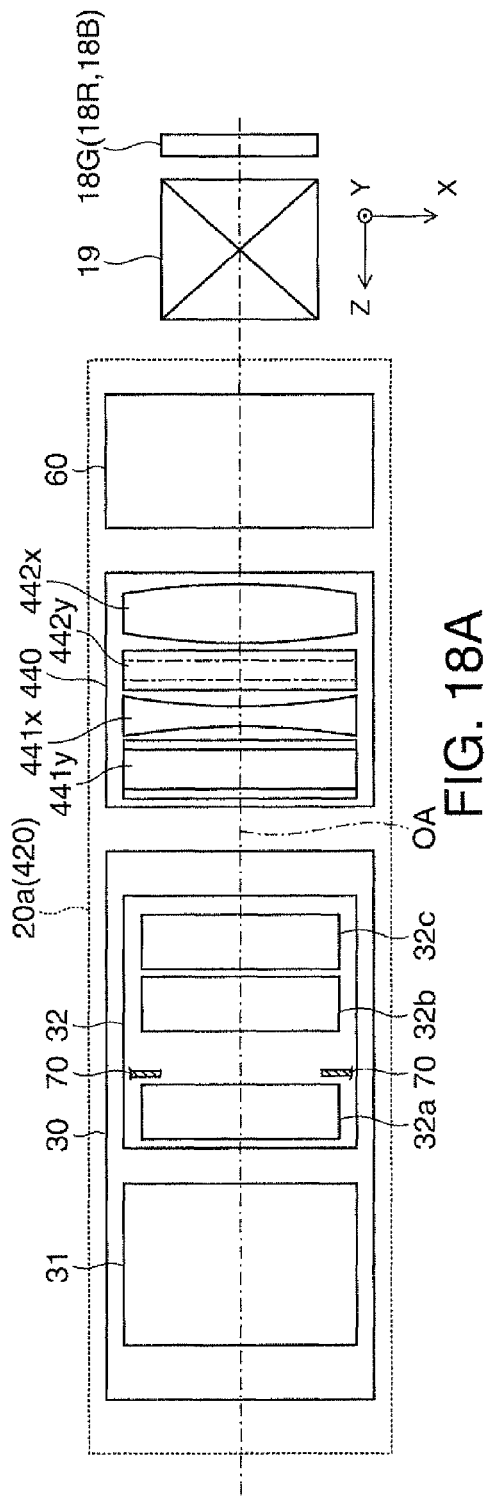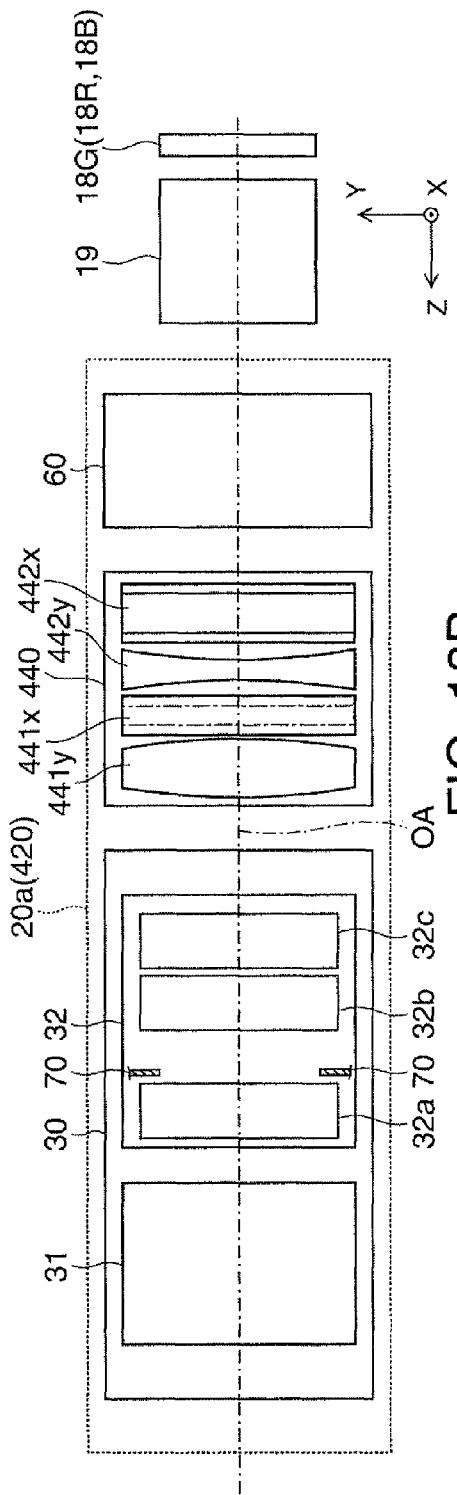

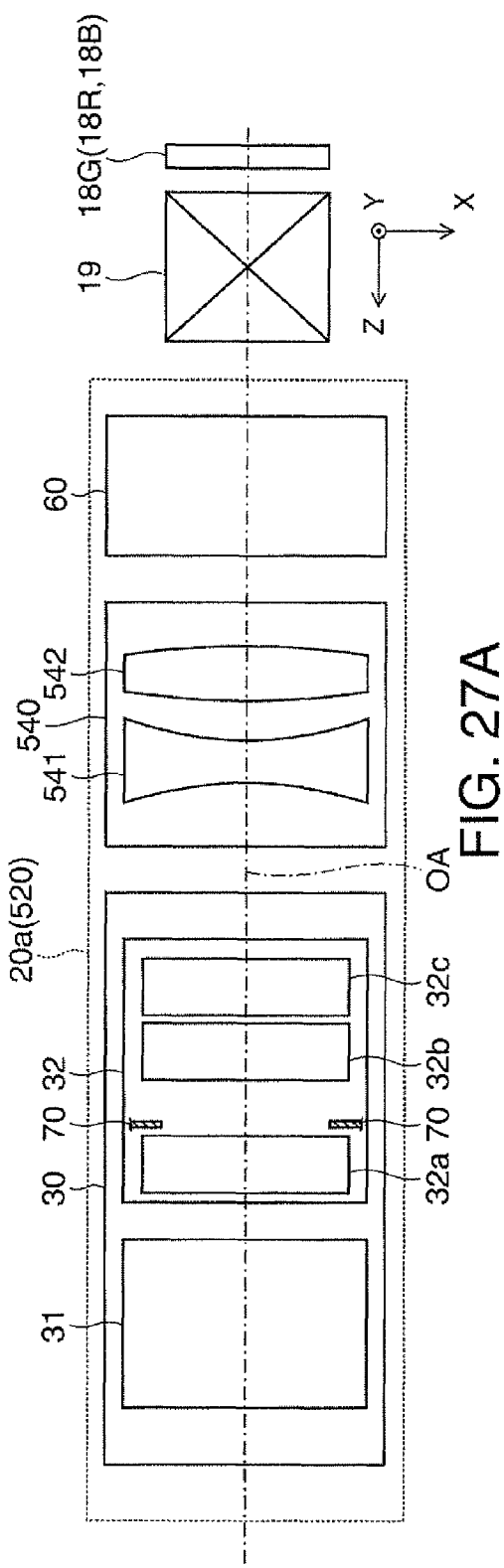
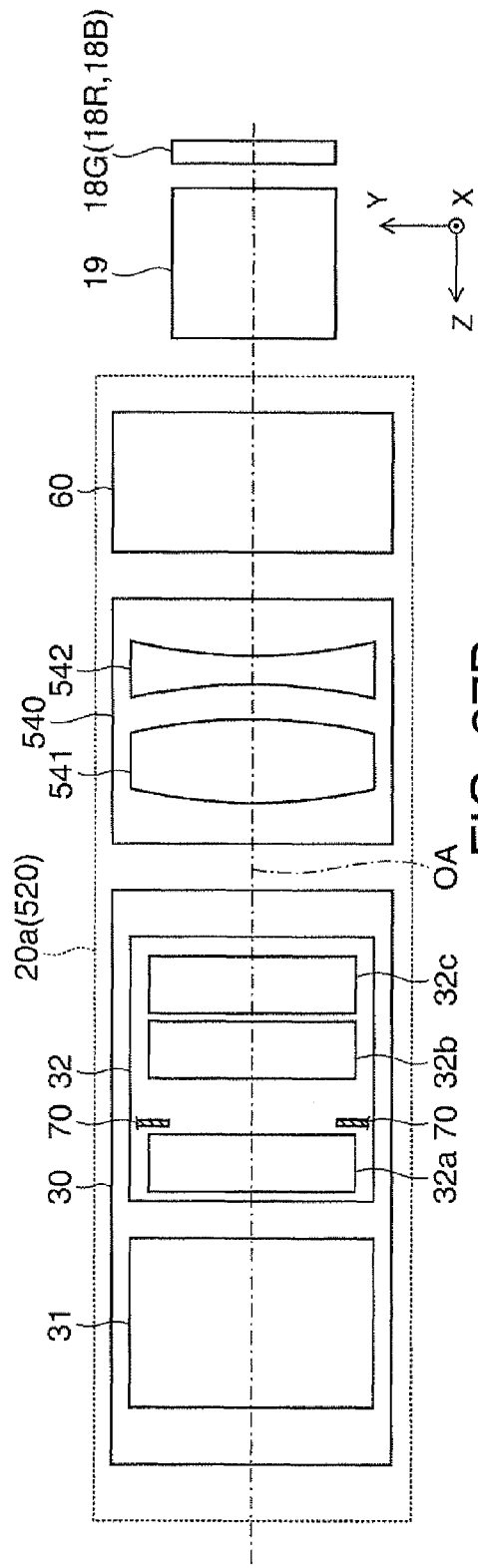
FIG. 27A
FIG. 27B

OPTICAL PROJECTION SYSTEM AND PROJECTOR INCLUDING THE SAME

BACKGROUND

1. Technical Field

The present invention relates to an optical projection system, which can perform conversion of the aspect ratio of a projected image, and a projector including the same.

2. Related Art

As a converter for aspect ratio conversion, which is used for the optical projection system of a projector, there is a front arrangement-type converter which is arranged to advance and retract in the front of an optical projection system in the related art, that is, in the front of an image side.

However, this type of converter is provided as an external optical section which is independent from the projector main body, causes an increase in the size of the projector, complicates the adjustment of the whole optical projection system including the converter, or badly degrades an image.

In addition, instead of the optical projection system of the projector, as a converter for aspect ratio conversion used in an imaging optical system, such as a camera, there is a rear arrangement-type relay system which is detachably arranged in the image side of an image forming optical system (refer to JP-A-2005-221597 and JP-A-2005-300928). This relay system includes a first group, a second group, and a third group. Among them, the intermediate second group is an anamorphic converter, and can be inserted into or retracted from between the first group and the third group.

However, the relay system or the anamorphic converter disclosed in JP-A-2005-221597 or the like is used in an imaging optical system. If the relay system or the anamorphic converter is used in an optical projection system as it is, various types of restrictions occur.

For example, in the case of the above-described rear arrangement-type relay system, the telecentricity is not considered. In such a relay system, in principal it is difficult to achieve both the telecentricity of a lateral section and the telecentricity of a longitudinal section. Therefore, if the telecentricity is precisely secured in one direction of an X section and a Y section, the telecentricity is greatly degraded in the remaining direction, so that the usage efficiency of light deteriorates or is biased according to the direction.

Further, in the imaging optical system disclosed in JP-A-2005-221597, it is fundamentally assumed that lenses can be replaced. When a rear arrangement-type relay system is not used, an image forming optical system is directly fixed to an imaging section and independently used. Therefore, in the case of maintaining the performance of the image forming optical system, there is a problem in that the length of the rear arrangement-type relay system becomes long. Meanwhile, lenses are not generally replaced in an optical projection system, so that a function as a general-purpose relay system or a general-purpose converter, in which various types of interchangeable lenses can be mounted, is not necessary.

SUMMARY

An advantage of some aspects of the invention is to provide an optical projection system, which increases the usage efficiency of light in a balanced manner, and a projector including the optical projection system.

An aspect of the invention is directed to an optical projection system which, when an image is enlarged and projected on a surface to be projected, makes the aspect ratio of an image of a light modulation device different from the aspect ratio of the image projected on the surface to be projected, the optical projection system including a diaphragm which restricts the passage of light flux; and a light modulation device side lens group which is arranged between the light modulation device and the diaphragm, configured to have different powers in a longitudinal direction and the lateral direction of the light modulation device, and configured to include an adjustment optical device group capable of advancing and retracting on an optical path. The adjustment optical device group integrally advances and retracts on the optical path, and changes a focus in the side of the surface to be projected in a lateral section and a focus in the side of the surface to be projected in the longitudinal section of a subject side lens group. When it is assumed that a distance between the focus in the side of the surface to be projected and an end surface in the side of the surface to be projected is set to "FFPx" in the lateral section of the light modulation device side lens group in a state in which the adjustment optical device group is arranged on the optical path, a distance between the focus in the side of the surface to be projected and the end surface in the side of the surface to be projected is set to "FFPy" in the longitudinal section of the light modulation device side lens group in the state in which the adjustment optical device group is arranged on the optical path, and a distance between the focus in the side of the surface to be projected and the end surface in the side of the surface to be projected is set to "FFPL" in the light modulation device side lens group in a state in which the adjustment optical device group is withdrawn from the optical path, FFPx, FFPy, and FFPL satisfy the following expressions.

$$FFPx < FFPL < FFPy \text{ if } FFPx < FFPy \quad (1)$$

$$FFPy < FFPL < FFPx \text{ if } FFPy < FFPx \quad (1)'$$

According to the above-described optical projection system, the adjustment optical device group which has different powers in the longitudinal direction and the lateral direction of the light modulation device can be advanced and retracted on the optical path. Therefore, in a first operating state in which the adjustment optical device group is on the optical path, conversion can be performed on an aspect ratio which is the ratio of width to height. Further, in a second operating state in which the adjustment optical device group is withdrawn from the optical path, the ratio of width to height can be maintained as it is without performing conversion of the ratio of width to height. However, in the first operating state and the second operating state, the focal position of the light modulation device side lens group changes. In particular, in the first operating state, the position of a focus in the lateral section of the light modulation device side lens group is different from the position of a focus in the longitudinal section. Accordingly, for example, in the second operating state in which conversion is not performed on the aspect ratio, even when the telecentricity is maintained in such a way as to appropriately set the focal position of the light modulation device side lens group with respect to the position of the diaphragm, the telecentricity is not necessarily maintained in the first operating state. In contrast, the adjustment optical device group of the optical projection system includes a focal position adjustment unit which equally changes both focal positions in the side of the surface to be projected in the lateral section and longitudinal section of the light modulation device side lens group. Therefore, the focal position adjustment unit advances and retracts on the optical path while the adjustment optical device group advances and retracts. In the first operating state in which conversion is performed on the aspect ratio and then projection is performed, the focal position adjustment unit adjusts both focal positions which are different in the longitudinal and lateral directions as a whole. With respect to the distance FFPL which indicates the focal position in the second operating state, the distance FFPx and the distance FFPy which respectively indicate both focal positions in the longitudinal section and lateral section of the light modulation device side lens group in the first operating state satisfy the above-described Conditional expressions (1) and (1)', that is, the distance FFPL can exist between the distance FFPx and the distance FFPy. Therefore, comparatively high telecentricity can be secured in a first operating state as well as comparatively high telecentricity can be maintained in the second operating state.

In a specific aspect of the invention, in the optical projection system, when it is assumed that a distance, between the diaphragm and the end surface in the side of the surface to be projected in the light modulation device side lens group, is "p" in the state in which the adjustment optical device group is arranged on the optical path, p satisfies the following expressions.

$$FFPx < p < FFPy \text{ if } FFPx < FFPy \quad (2)$$

$$FFPy < p < FFPx \text{ if } FFPy < FFPx \quad (2)'$$

In this case, the distance p, between the diaphragm and the end surface in the side of the surface to be projected in the light modulation device side lens group, satisfies the above-described Conditional expressions (2) and (2)' in the first operating state in which the adjustment optical device group is arranged on the optical path, and conversion is performed on the aspect ratio and then projection is performed, so that it is possible to secure a predetermined or more telecentricity in both longitudinal direction and lateral direction. For example, if FFPx<p<FFPy, principal rays in the longitudinal direction slope inward for the surface to be projected and principal rays in the lateral direction slope outward for the surface to be projected. However, the telecentricity is maintained as a whole. On the contrary, if FFPy<p<FFPx, principal rays in the longitudinal direction slope outward for the surface to be projected, and principal rays in the lateral direction slope inward for the surface to be projected. However, the telecentricity is maintained as a whole. In addition, even in the second operating state in which the adjustment optical device group is withdrawn from the optical path, the distance FFPL which indicates the focal position exists between the distance FFPx and the distance FFPy, so that a predetermined or more telecentricity are maintained.

In another specific aspect of the invention, in the projection optical system, the distance p, between the diaphragm and the end surface in the side of the surface to be projected in the light modulation device side lens group, is substantially equal to the distance FFPL between the focus in the side of the surface to be projected in the light modulation device side lens group and the end surface in the side of the surface to be projected in the state in which the adjustment optical device group is withdrawn from the optical path. In this case, an appropriate state can be set in order to implement the telecentricity.

In another specific aspect of the invention, in the projection optical system, if $FFPx < FFPy$, $$FFPx < p \leq (FFPy + FFPx)/2 \quad (3), \text{ and}$$

if $FFPy < FFPx$, $$FFPy < p \leq (FFPy + FFPx)/2 \quad (3)'.$$

In this case, it is possible to make the telecentricity to be comparatively high in the intermediate direction between the lateral direction and the longitudinal direction, it is possible to reduce the directional bias of telecentricity, and it is possible to project a bright image in which it is difficult to cause unevenness depending on the direction of observation.

In another specific aspect of the invention, in the optical projection system, the adjustment optical device group includes a rotationally symmetric lens group which includes at least one or more rotationally symmetric lenses. In this case, since the rotationally symmetric lens group has the equal power in both sections, that is, the longitudinal section and the lateral section, the rotationally symmetric lens group operates such that focal positions are equally moved with respect to the lateral section and the longitudinal section, and adjusts both focal positions with respect to the lateral section and longitudinal section in the first operating state, so that it is possible to satisfy the above-described Conditional expressions (1) and (1)'.

In another specific aspect of the invention, in the optical projection system, the adjustment optical device group includes at least one or more first anamorphic lens groups each having stronger power in one of the longitudinal direction and the lateral direction of the light modulation device than in a remaining direction; and at least one or more second anamorphic lens groups each having stronger power in the remaining direction than in the one direction. Here, the anamorphic lens means a lens which has different curvatures in one direction and in the remaining direction, and includes a lens which has not power in one direction like a cylindrical lens. In this case, a first anamorphic lens group cooperates with a second anamorphic lens group, which operate differently, with the result that operation is performed such that focal positions are equally moved in the lateral section and the longitudinal section as a whole, and adjustment is performed on both focal positions with respect to the lateral section and the longitudinal section in the first operating state, so that it is possible to satisfy the above-described Conditional expressions (1) and (1)'.

In another specific aspect of the invention, in the optical projection system, the adjustment optical device group includes at least one or more free-form surface lenses each having power to which positive power and negative power are combined in the longitudinal direction and the lateral direction of the light modulation device. In this case, it is possible to cause one or more free-form surface lenses to equally move the focal positions in the lateral section and longitudinal section. Therefore, it is possible to satisfy the above-described Conditional expressions (1) and (1)' by adjusting both focal positions with respect to the lateral section and the longitudinal section in the first operation state.

In another specific aspect of the invention, in the optical projection system, the focal position adjustment unit includes at least two free-form surface lenses in which positive power and negative power are interchanged in the longitudinal direction and the lateral direction of the light modulation device. In this case, since the two free-form surface lenses, which differently operate, cooperate with each other, it is possible to equally move the focal positions with respect to the lateral section and the longitudinal section as a whole.

In another specific aspect of the invention, in the optical projection system, the adjustment optical device group includes a first optical device group which has positive power in the section of the longitudinal direction of the light modulation device, a second optical device group which is arranged in the light modulation device side by the first optical device group and which has negative power, and the rotationally symmetric lens group. Further, the rotationally symmetric lens group includes a first rotationally symmetric lens which has negative power, and a second rotationally symmetric lens which is arranged closer to the light modulation device side than the first rotationally symmetric lens, and which has positive power. In this case, an image to be projected on the surface to be projected can be compressed or reduced in the longitudinal direction, and can be expanded or enlarged in the lateral direction.

In another specific aspect of the invention, in the optical projection system, the adjustment optical device group includes a first optical device group which has negative power in the section of the lateral direction of the light modulation device, a second optical device group which is arranged closer to the light modulation device side than the first optical device group and which has positive power, and the rotationally symmetric lens group. Further, the rotationally symmetric lens group includes a first rotationally symmetric lens which has positive power, and a second rotationally symmetric lens which is arranged such that the second rotationally symmetric lens is closer to the light modulation device side than the first rotationally symmetric lens and which has negative power. In this case, an image to be projected on the surface to be projected can be compressed or reduced in the longitudinal direction, and can be expanded or enlarged in the lateral direction.

In another specific aspect of the invention, in the optical projection system, the first anamorphic lens group includes, in order from the side of the surface to be projected, a first anamorphic lens which has positive power, and a second anamorphic lens which has negative power in the section of the longitudinal direction of the light modulation device. Further, the second anamorphic lens group includes, in order from the side of the surface to be projected, a third anamorphic lens which has negative power, and a fourth anamorphic lens which has positive power in the section of the lateral direction of the light modulation device. In this case, an image to be projected on the surface to be projected can be compressed or reduced in the longitudinal direction, and can be expanded or enlarged in the lateral direction.

In another specific aspect of the invention, in the optical projection system, each of the two free-form surface lenses includes, in order from the side of the surface to be projected, a first free-form surface lens which has positive power, and a second free-form surface lens which has negative power in the section of the longitudinal direction of the light modulation device. In this case, an image to be projected on the surface to be projected can be compressed or reduced in the longitudinal direction, and can be expanded or enlarged in the lateral direction.

In another specific aspect of the invention, the optical projection system substantially includes, in order from the side of the surface to be projected, a first group which performs enlargement; a second group which is the adjustment optical device group having different powers in the longitudinal direction and the lateral direction of the light modulation device, and capable of advancing and retracting on the optical path; and a third group having positive power. The second group can be advanced and retracted on a ray at a position which is close to the light modulation device. Therefore, even when the second group is inserted onto a ray, the ray of each image height passes through the second group along a path which is comparatively close to the image height, so that it is easy to control rays. Therefore, it is possible to restrain the occurrence of aberration because of the operation of advancing and retracting of the second group on the optical path, and it is possible to prevent the deterioration of image formation performance when the second group is inserted onto a ray. That is, by placing the second group, which is capable of advancing and retracting on the ray, in a position where is close to the light modulation device, it is possible to restrain the occurrence of aberration while making the second group to be compact. Therefore, performance can be improved and costs can be reduced.

In another specific aspect of the invention, the optical projection system substantially includes, in order from the side of the surface to be projected, a first group which performs enlargement; and a second group which is the adjustment optical device group having different powers in the longitudinal direction and the lateral direction of the light modulation device, and capable of advancing and retracting on the optical path. The second group can be advanced and retracted on a ray at a position which is close to the light modulation device. Therefore, even when the second group is inserted onto a ray, the ray of each image height passes through the second group along a path which is comparatively close to the image height, so that it is easy to control rays. Therefore, it is possible to restrain the occurrence of aberration because of the operation of advancing and retracting of the second group on the optical path, and it is possible to prevent the deterioration of image formation performance when the second group is inserted onto a ray. That is, by placing the second group, which is capable of advancing and retracting on the ray, on a position where is closer to the light modulation device, it is possible to restrain the occurrence of aberration while making the second group to be compact. Generally, it is difficult to manufacture a rotationally asymmetric optical device, and reduction in size is an essential condition in order to increase accuracy. In the case of the above-described optical projection system, rays less spread and the sizes of lenses are reduced in a position where is close to the light modulation device, with the result that highly precise lens processing can be expected, so that performance can be improved and costs can be reduced.

In another specific aspect of the invention, the optical projection system further includes a photosynthesis prism which is arranged in the light modulation device side of the light modulation device side lens group. In this case, it is possible to synthesize and project a plurality of colors of images formed on a plurality of light modulation devices.

Another aspect of the invention is directed to a projector including the optical projection system and the light modulation device. According to the projector, it is possible to project an image, which has an aspect ratio which is different from the aspect ratio of the image of the light modulation device, on the surface to be projected. At this time, it is possible to project a bright image in which it is difficult to cause unevenness depending on the direction of observation using a particular optical projection system.

BRIEF DESCRIPTION OF THE DRAWINGS

The invention will be described with reference to the accompanying drawings, wherein like numbers reference like devices.

FIG. 4A is a view illustrating the configuration of the lateral section of the optical projection system in the first operating state, and FIG. 4B is a view illustrating the configuration of the longitudinal section of the optical projection system in the first operating state.

FIG. 5A is a view illustrating the first operating state of the optical projection system, and FIG. 5B is a view illustrating the second operating state of the optical projection system.

FIG. 8A is a view illustrating the configuration of a lateral section in the first operating state of the optical projection system shown in FIG. 3A or the like according to a modification example, and FIG. 8B is a view illustrating the configuration of a longitudinal section thereof.

FIG. 16A is a view illustrating the configuration of the lateral section in the first operating state of the optical projection system of a projector according to a second embodiment, and FIG. 16B is a view illustrating the configuration of the longitudinal section in the first operating state of the optical projection system.

FIG. 17A is a view illustrating the configuration of the lateral section in the first operating state of the optical projection system of a projector according to a third embodiment, and FIG. 17B is a view illustrating the configuration of the longitudinal section in the first operating state of the optical projection system.

FIG. 18A is a view illustrating the configuration of the lateral section in the first operating state of the optical projection system of a projector according to a fourth embodiment, and FIG. 18B is a view illustrating the configuration of the longitudinal section in the first operating state of the optical projection system.

FIG. 27A is a view illustrating the configuration of the lateral section in the first operating state of the optical projection system of a projector according to a fifth embodiment, and FIG. 27B is a view illustrating the configuration of the longitudinal section in the first operating state of the optical projection system.

DESCRIPTION OF EXEMPLARY EMBODIMENTS

A projector and an optical projection system according to an embodiment of the invention will be described in detail with reference to the accompanying drawings.

First Embodiment

Figure 1:
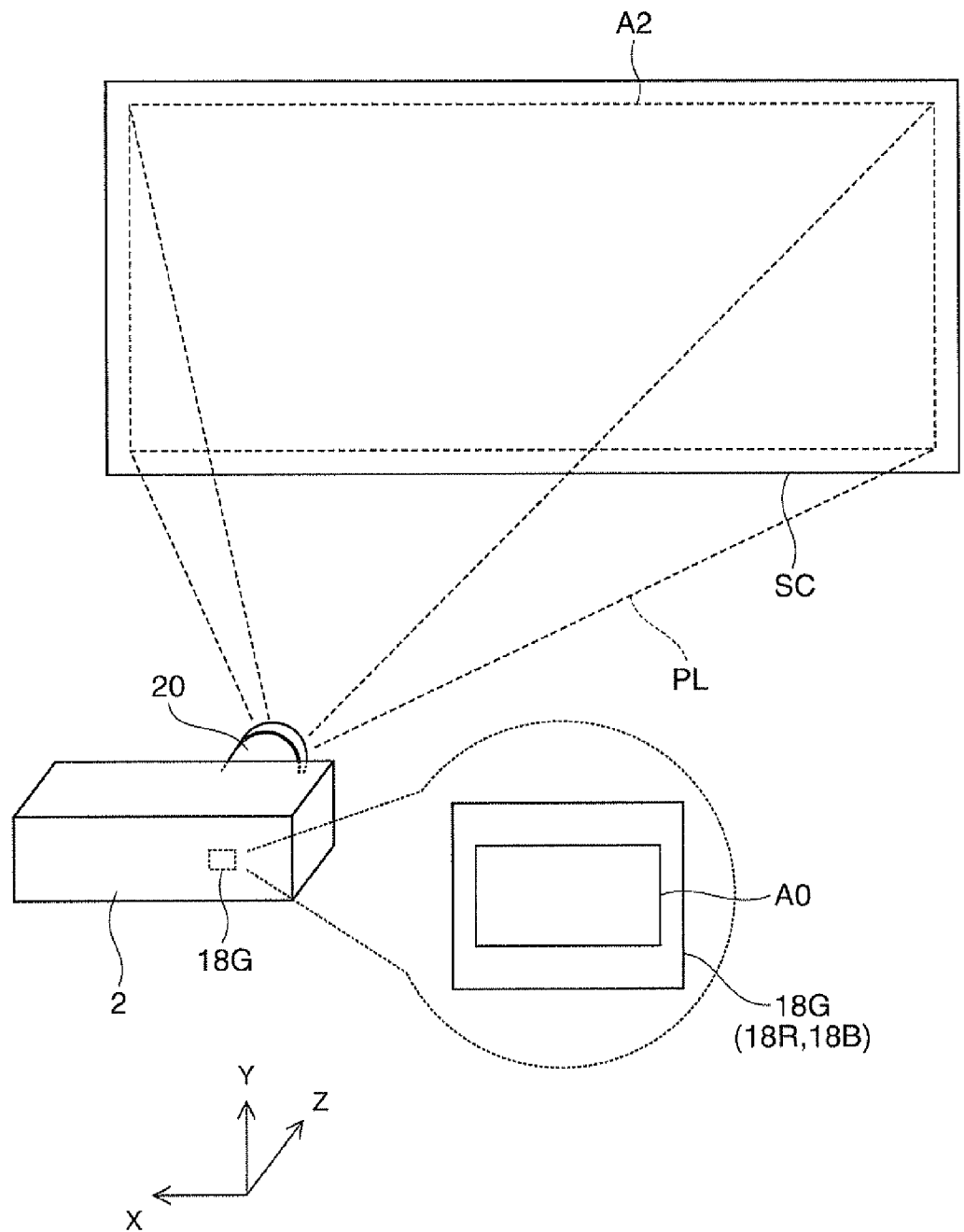
FIG. 1 is a perspective view illustrating the usage state of a projector according to a first embodiment.

As shown in FIG. 1, a projector 2 according to a first embodiment of the invention forms image light PL in response to an image signal, and projects the corresponding image light PL on a surface to be projected, such as a screen SC. When the image of a liquid crystal panel 18G (18R, 18B), which is a light modulation device embedded in the projector 2, is enlarged and then projected on the screen (the surface to be projected) SC, the optical projection system 20 of the projector 2 can make the aspect ratio AR0 of the image of the liquid crystal panel 18G (18R, 18B) to be different from the aspect ratio AR2 of an image to be projected on the screen SC. That is, although the aspect ratio AR0 of the display region A0 of the liquid crystal panel 18G can be different from the aspect ratio AR2 of the display region A2 of the screen SC, the aspect ratio AR0 of the display region A0 of the liquid crystal panel 18G came the same as the aspect ratio AR2 of the display region A2 of the screen SC. In particular, the aspect ratio AR0 of the display region A0 of the liquid crystal panel 18G is, for example, 1.78:1, and the aspect ratio AR2 of the display region A2 of the screen SC is, for example, 1.78:1, 1.85:1, 2.35:1, 2.4:1, or the like.

Figure 2:
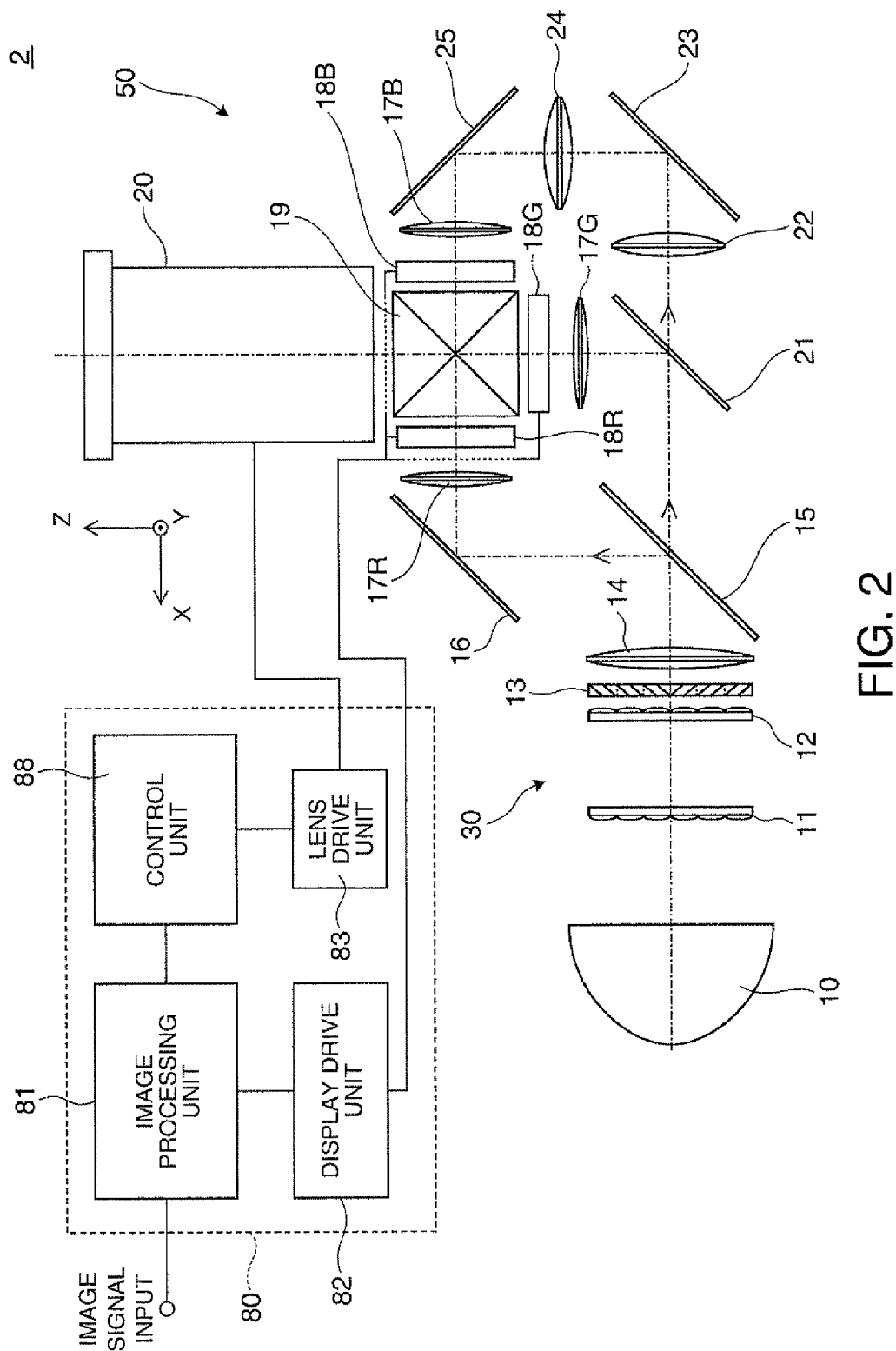
FIG. 2 is a view illustrating the schematic configuration of the projector shown in FIG. 1.

As shown in FIG. 2, the projector 2 includes an optical system section 50 which projects image light and a circuit apparatus 80 which controls the operation of the optical system section 50.

The light source 10 of the optical system section 50 is, for example, an extra high pressure mercury lamp, and emits light including R light, G light, and B light. Here, the light source 10 may be a discharge light source other than the extra high pressure mercury lamp, and may be a solid light source, such as an LED (Light Emitting Diode) or laser. Each of a first integrator lens 11 and a second integrator lens 12 includes a plurality of lens devices which are arranged in an array. The first integrator lens 11 divides light flux received from the light source 10 into a plurality of pieces of light flux. Each of the lens devices of the first integrator lens 11 performs light condensing on the light flux received from the light source 10 in the vicinity of the lens devices of the second integrator lens 12. The lens devices of the second integrator lens 12 form the image of the lens devices of the first integrator lens 11 on the liquid crystal panels 18R, 18G, and 18B in cooperation with a superimposed lens 14. With the above-described configuration, the light from the light source 10 illuminates the whole display region (display region A0 in FIG. 1) of the liquid crystal panels 18R, 18G, and 18B with substantially uniform brightness.

A polarized conversion device 13 converts light from the second integrator lens 12 into predetermined linear polarized light. The superimposed lens 14 superimposes the images of the respective lens devices of the first integrator lens 11 on the display region of the liquid crystal panels 18R, 18G, and 18B via the second integrator lens 12.

A first dichroic mirror 15 reflects the R light which is incident from the superimposed lens 14, and passes the G light and the B light. The R light reflected by the first dichroic mirror 15 is incident on the liquid crystal panel 18R, which is the light modulation device, via a reflection mirror 16 and a field lens 17R. The liquid crystal panel 18R forms an R-color image by modulating the R light in response to the image signal.

A second dichroic mirror 21 reflects the G light received from the first dichroic mirror 15, and passes the B light. The G light reflected by the second dichroic mirror 21 is incident on the liquid crystal panel 18G, which is the light modulation device, via a field lens 17G. The liquid crystal panel 18G forms a G-color image by modulating G light in response to the image signal. The B light, which passed through the second dichroic mirror 21, is incident on the liquid crystal panel 18B, which is the light modulation device, via relay lenses 22 and 24, reflection mirrors 23 and 25, and a field lens 17B. The liquid crystal panel 18B forms a B-color image by modulating the B light in response to the image signal.

A cross dichroic prism 19 is a prism for photosynthesis. The cross dichroic prism 19 synthesizes pieces of light modulated in the respective liquid crystal panels 18R, 18G, and 18B, makes the resulting light as image light, and then progresses the resulting light to the optical projection system 20.

The optical projection system 20 enlarges and projects the image light PL, which is modulated by the liquid crystal panels 18G, 18R, and 18B and then synthesized by the cross dichroic prism 19, on the screen SC in FIG. 1. At this time, the optical projection system 20 can make the aspect ratio AR2 of the image projected on the screen SC to be different from the aspect ratio AR0 of the image of the liquid crystal panels 18G, 18R, and 18B, or can make the aspect ratio AR2 to be the same as the aspect ratio AR0.

The circuit apparatus 80 includes an image processing unit 81 to which an external image signal, such as a video signal, is input, a display drive unit 82 which drives the liquid crystal panels 18G, 18R, and 18B provided in the optical system section 50 based on the output of the image processing unit 81, a lens drive unit 83 which adjusts the state of the optical projection system 20 by operating drive mechanism (not shown) provided in the optical projection system 20, and a main control unit 88 which generally controls the operation of the circuit sections 81, 82, and 83.

The image processing unit 81 converts the input external image signal into an image signal including the grayscale or the like of each color. In the case of a first operating state in which the optical projection system 20 performs conversion of the aspect ratio of an image and then projects the image, the image processing unit 81 performs conversion in advance on the aspect ratio of an image, obtained by reversing the conversion of the aspect ratio performed by the optical projection system 20, thereby preventing the image displayed on the screen SC from being expanded and contracted in the longitudinal and lateral direction. In particular, when an image is expanded by the optical projection system 20 in the lateral direction to be in the range, for example, from 1.78:1 to 2.4:1, the image is compressed in advance in the lateral direction by 0.742=1.78/2.4 times or the image is expanded in the longitudinal direction by 1.35=2.4/1.78 times. Meanwhile, in the case of a second operating state in which the optical projection system 20 does not perform conversion of the aspect ratio or the aspect ratio of the image and projects the image, the image processing unit 81 does not perform conversion of the aspect ratio of the image as described above. In addition, the image processing unit 81 can perform various types of image processes, such as distortion correction or color correction, on the external image signal.

The display drive unit 82 can operate the liquid crystal panels 18G, 18R, and 18B based on the image signal output from the image processing unit 81, and can form an image corresponding to the relevant image signal or an image corresponding to a signal, obtained by performing an image process on the image signal, on the liquid crystal panels 18G, 18R, and 18B.

The lens drive unit 83 operates under the control of the main control unit 88, and can change the projection magnification of the image on the screen SC in FIG. 1 using the optical projection system 20 by, for example, appropriately moving a partial optical device including a diaphragm included in the optical projection system 20 along an optical axis OA. Further, the lens drive unit 83 can change the aspect ratio AR2 of the image which is projected on the screen SC in FIG. 1 by advancing and retracting additional partial optical device, included in the optical projection system 20, on an optical axis OA, that is, on an optical path. The lens drive unit 83 can change the longitudinal position of the image which is projected on the screen SC in FIG. 1 by performing adjustment which causes the whole optical projection system 20 to be moved in the vertical direction which is perpendicular to the optical axis OA.

Hereinafter, the optical projection system 20 according to the embodiment will be described with reference to FIG. 3A. The optical projection system 20 includes a main body section 20a which is configured by combining a plurality of optical devices, such as lenses and drive mechanisms 61, 62, 63, and 64 which adjust the image forming state of the main body section 20a by moving a part of or the whole main body section 20a.

The main body section 20a includes a first group 30, a second group 40, a third group 60, and a diaphragm 70 in order from the side of the screen SC. In addition, the second group 40 can advance and retract on the optical path of the optical axis OA. FIG. 3A illustrates a state in which the second group 40 is inserted into the optical path. Further, Each of FIGS. 3B and 3C illustrates a display region A2 of the screen SC (refer to FIG. 1) in a first operating state in which the second group 40 is inserted or a second operating state in which the second group 40 is withdrawn.

The first group 30 includes a first lens unit 31 and a second lens unit 32. For example, the focus state of the main body section 20a can be adjusted by slightly moving at least one lens included in the first lens unit 31 manually along the optical axis OA. Further, the second lens unit 32 includes first, second, and third lens groups 32a, 32b, and 32c as shown in FIG. 4A. Each of the lens groups 32a, 32b, and 32c includes one or more lenses. The main body section 20a can change the projection magnification by moving the lens groups 32a, 32b, and 32c or at least one lens which is included in the lens groups 32a, 32b, and 32c along the optical axis OA using a zoom drive mechanism 61 shown in FIG. 3A.

The second group 40 is an adjustment optical device group which has focal distances which are different from each other in the lateral direction (X direction) and the longitudinal direction (Y direction). As a result, all the system of the optical projection system 20 including the first group 30 has focal distances which are different from each other in the longitudinal direction and the lateral direction. That is, the magnification in the longitudinal direction is different from the magnification in the lateral direction due to the main body section 20a, thereby projecting an image, having the aspect ratio AR2 which is different from the aspect ratio AR0 of the image displayed on the liquid crystal panel 18G (18R, 18B), on the screen SC. The second group 40 includes one or more optical devices for adjustment, which have a rotationally asymmetric surface with respect to the optical axis OA. In particular, with regard to the section of the longitudinal direction (Y direction) shown in FIG. 45, the second group 40 includes a first optical device group 41 having positive power and a second optical device group 42 having negative power in order from the screen SC. In addition, the first optical device group 41 and the second optical device group 42 do not have power with regard to the section of the lateral direction (X direction) shown in FIG. 4A. In addition, the positive power of the first optical device group 41 and the negative power of the second optical device group 42 are power of substantially equivalent strength while the positive is opposite to the negative. Therefore, the entire of first and second optical device groups 41 and 42 have a feature as the optical device of a substantially afocal system.

Further, the second group 40 includes one or more focal position adjustment units which have a rotationally symmetric surface with respect to the optical axis OA. In particular, as shown in FIGS. 4A and 4B, the second group 40 includes a first rotationally symmetric lens 43a having negative power and a second rotationally symmetric lens 43b having positive power in order from the screen SC. That is, the first and second rotationally symmetric lenses 43a and 43b correspond to a rotationally symmetric lens group which adjusts the focal position for a lateral section and a longitudinal section, and have the same power for the X direction and the Y direction, that is, both the longitudinal section and the lateral section. It will now be described in detail. First, the focal position, which is identical in the X direction and the Y direction in the second operating state in which the second group 40, that is, the rotationally symmetric lenses 43a and 43b are withdrawn, differs in the x direction and the Y direction in the first operating state because the second group 40, that is, the first and second optical device groups 41 and 42 are inserted. At this time, the first and second rotationally symmetric lenses 43a and 43b are inserted together with the optical device groups 41 and 42, so that each focal position is changed along the optical axis OA in the same way, thereby adjusting the corresponding focal position in the first operating state. In particular, the rotationally symmetric lenses 43a and 43b are operated to equally move each of the focal positions in the X direction and the Y direction based on the symmetry thereof. In addition, the positive power of the first rotationally symmetric lens 43a and the negative power of the second rotationally symmetric lens 43b are power of substantially equivalent strength while the positive is opposite to the negative.

Further, as shown in FIG. 5A, by using the first operating state in which the second group 40 is arranged on the optical path, an image to be formed on the liquid crystal panel 18G (18R, 18B) can be compressed in the longitudinal direction and the image can be projected on the screen SC at an aspect ratio (for example, 2.4:1) which is enlarged in the lateral direction. Meanwhile, as shown in FIG. 5B, by using the second operating state in which the second group 40 is withdrawn from the optical path, the image can be projected on the screen SC at the aspect ratio (for example, 1.78:1) of the image to be formed on the liquid crystal panel 18G (18R, 18B). In this case, if the display region A2 of the second operating state in which the second group 40 is not provided is regarded as an original display region AA as shown in FIG. 3C, the original display region AA is compressed in the longitudinal direction and enlarged in the lateral direction in the first operating state into which the second group 40 is inserted, so that the display region A2, the lateral length of which is longer than that of the display region AA, is formed as shown in FIG. 3B. In addition, the first optical device group 41 and the second optical device group 42 which are included in the second group 40 can be moved in the direction of the optical axis OA using the second anamorphic drive mechanism 63. By adjusting the distance therebetween, the aspect ratio of the image to be projected on the screen SC can be continuously increased and decreased.

Figure 3A:
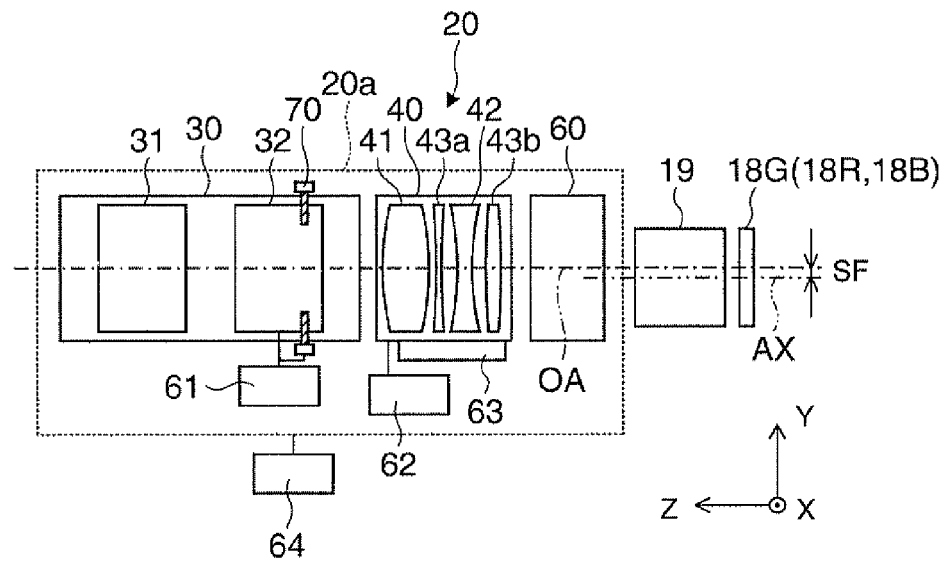
FIG. 3A is a view illustrating the configuration of the optical projection system of the projector shown in FIG. 1.
Figure 3B:
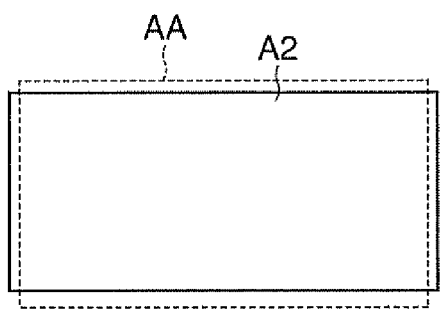
FIG. 3B is a view illustrating the display region of a surface to be projected in a first operating state.
Figure 3C:
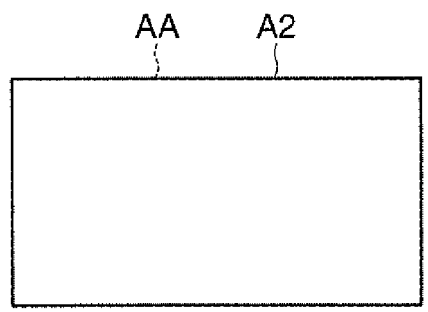
FIG. 3C is a view illustrating the display region of a surface to be projected in a second operating state.

Further, as shown in FIG. 3A, in the optical projection system 20, by adjusting the amount of shift by moving the whole main body section 20a in the direction which is perpendicular to the optical axis OA using the entire system drive mechanism 64, the amount of deviation can be increased and decreased from the optical axis OA of the image to be projected on the screen SC. That is, by moving the optical axis OA of the main body section 20a by only an appropriate amount of shift SF with respect to the central axis AX of the liquid crystal panel 18G while maintaining the state of the optical axis OA of the main body section 20a to be parallel to the central axis AX of the liquid crystal panel 18G, the image can be projected on a position which is separated from the optical axis OA, for example, in the upper direction (+Y direction), and the projection position of the image can be vertically moved in the longitudinal direction by adjusting the amount of shift SF. In addition, the amount of shift SF, which is the amount of deviation based on the central axis AX of the liquid crystal panel 18G of the optical axis OA of the main body section 20a, is not necessarily variable, and can be fixed to, for example, a value which is not 0. Further, the whole main body section 20a can be appropriately moved in the direction along the optical axis OA using the entire system drive mechanism 64.

The third group 60 includes one or more rotationally symmetric lens having power in the lateral direction and in the longitudinal direction. Since the third group 60 has positive power, the third group 60 can restrain the spread of light which is emitted from the light modulation device. Therefore, the third group 60 can restrain the angle of light which is incident on the second group 40, and can restrain aberration which occurs in the second group 40. As a result, the third group 60 can restrain entire aberration. Therefore, the third group 60 includes a plurality of lenses as correction optical devices, and lenses having positive power from among the plurality of lenses include aspherical surfaces as necessary.

The diaphragm 70 is arranged in the vicinity of, for example, any of the lenses included in the second lens unit 32 of the first group 30. In the example shown in FIG. 4A, the diaphragm 70 is arranged between the first and second lens groups 32a and 32b of the second lens unit 32. The diaphragm 70 has a function of adjusting the state of image light by partially shading light flux which passes through the first group 30, that is, image light. In particular, the diaphragm 70 causes the section of light flux which passes through the first group 30 to have a predetermined size and shape at a corresponding position of the optical axis OA. Therefore, by controlling the image light emitted from the liquid crystal panel 18G (18R, 18B), the emission angle and direction of the principal ray of the light flux can be adjusted. Further, the diaphragm 70 moves along the optical axis OA in association with the zoom operation of the second lens unit 32 of the first group 30 using the zoom drive mechanism 61 in any one of the first operating state and the second operating state. That is, by moving the diaphragm 70 along the optical axis OA, the zoom drive mechanism 61 can zoom the emission state of the image light emitted from the liquid crystal panel 18G (18R, 18B), that is, can cause the emission state to be the appropriate state based on projection magnification.

The first anamorphic drive mechanism 62, the second anamorphic drive mechanism 63, and the entire system drive mechanism 64 which correspond to the above-described zoom drive mechanism 61 and the advance and retract drive mechanism include a motor, a mechanical transmission mechanism, a sensor, or the like, and operate in response to a drive signal from the lens drive unit 83 shown in FIG. 2. These drive mechanisms 61, 62, 63, and 64 do not only independently operate but also compositely operate in response to the drive signal from the lens drive unit 83. For example, by operating the entire system drive mechanism 64 in accordance with the operation of the zoom drive mechanism 61, a phenomenon that an image shifts when the image is zoomed can be restrained.

Here, the function of the optical projection system 20 shown in FIG. 3A or the like will be described in further detail. In the case of the optical projection system 20, the second group 40 can advance and retract along the optical axis OA at a position where is comparatively near to the liquid crystal panel 18G (18R, 18B) and the ray of each image height passes through the second group 40 along a path which is comparatively near to the image height, so that the ray can be easily controlled. Therefore, the occurrence of aberration attributable to the operation that the second group 40 advances and retracts along the optical axis OA can be restrained. Generally, it is difficult to manufacture a rotationally asymmetric optical device, and it is necessary to miniaturize the second group 40 in order to achieve accuracy. At this point, as the second group 40 is closer to the liquid crystal panel 18G (18R, 18B), the ray is less spread, and the first optical device group 41 and the second optical device group 42 which are included in the second group 40 can be miniaturized. Therefore, it is expected that a highly precise lens process is performed on the optical device groups 41 and 42, the performance of the optical projection system 20 is improved and the cost thereof can be reduced. Further, the optical projection system 20 includes the third group 60 which is the closest to the liquid crystal panel 18G (18R, 18B), so that aberration can be effectively and reasonably corrected using the comparatively simple optical system. With such third group 60, it is possible to further remarkably attempt to improve performance. In particular, it is possible to restrain the spread of light flux within the second group 40 using the third group 60, and it is possible to prevent the diameter of the second group 40 from increasing. Further, the substantially afocal system is used for the anamorphic type second group 40, so that it is possible to secure accuracy while lowering the request for the accuracy of the position of lenses included in the second group 40.

Figure 6A:
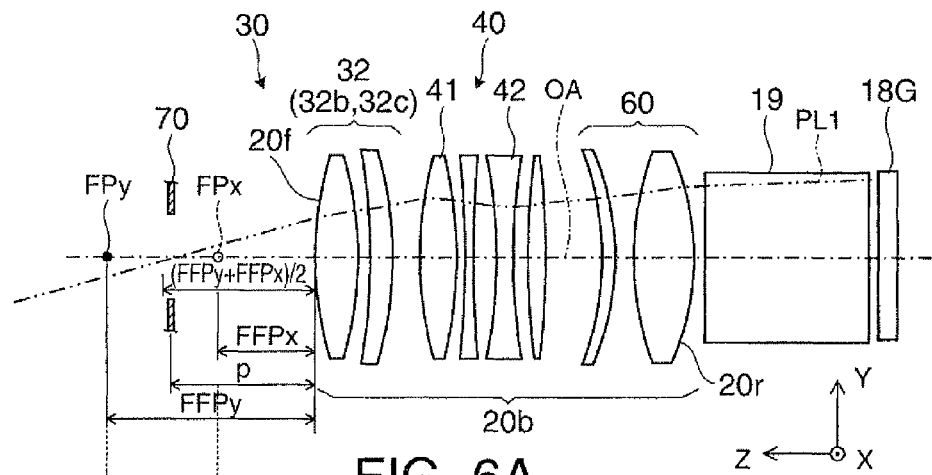
FIGS. 6A and 6B are longitudinal section and lateral section views each illustrating a focal position and a diaphragm position in the first operating state.
Figure 6B:
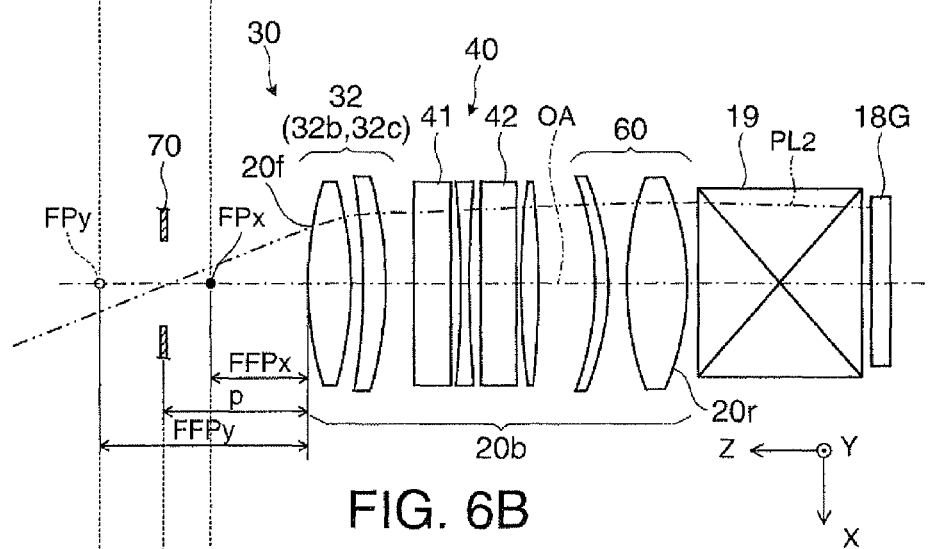
Figure 6C:
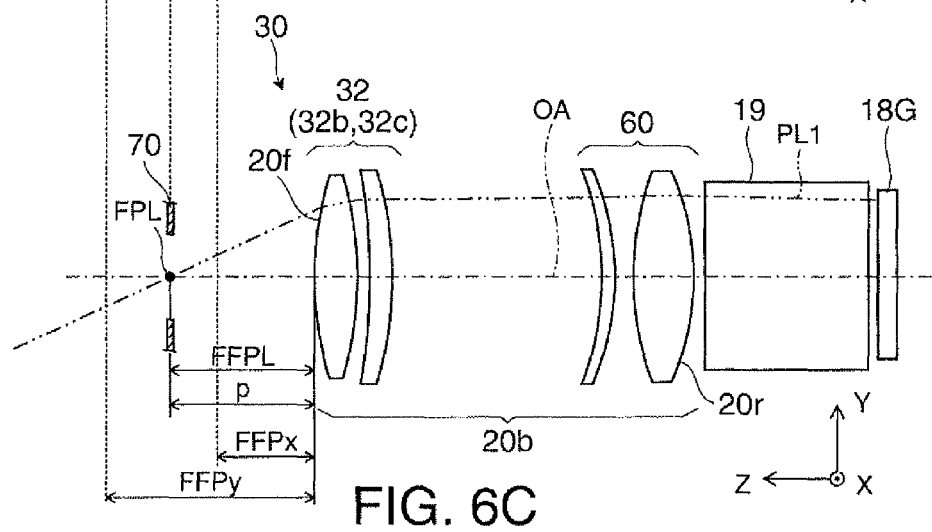
FIG. 6C is a lateral section view illustrating a focal position and a diaphragm position in the second operating state.

FIGS. 6A and 6B are views illustrating the focal position of the optical projection system 20 and the arrangement of the diaphragm 70 in the first operating state in which the second group 40 is arranged on the optical path. FIG. 6C is a view illustrating the focal position of the optical projection system 20 and the arrangement of the diaphragm 70 in the second operating state in which the second group 40 is withdrawn from the optical path. Here, in the optical projection system 20, a light modulation device side lens group 20b, which is arranged from the liquid crystal panel 18G (18R, 18B) to the diaphragm 70 as a section which affects the telecentricity of a subject side will be considered. In this case, the light modulation device side lens group 20b includes the second and third lens groups 32b and 32c of the second lens unit 32 of the first group 30, the second group 40, and the third group 60. That is, in the subject side of the diaphragm 70, the third lens group 32c of the first group 30, the second group 40, and the third group 60 are arranged in the first operating state. Further, in the second operating state, the second group 40 is withdrawn therefrom. Further, in the cases shown in FIGS. 6A to 6C, the position of the diaphragm 70 is not changed or changed little in the first operating state and the second operating state.

First, in the longitudinal section of the light modulation device side lens group 20b, that is, in the YZ section, in the first operating state shown in FIG. 6A, it is assumed that the distance between the screen SC side focus FPy of the light modulation device side lens group 20b and the screen SC side end surface 20f of the light modulation device side lens group 20b is set to FFPy. Further, in the lateral section of the light modulation device side lens group 20b, that is, in the XZ section, in the first operating state shown in FIG. 6B, it is assumed that the distance between the screen SC side focus FPx of the light modulation device side lens group 20b and the screen SC side end surface 20f of the light modulation device side lens group 20*b* is FFPx. Meanwhile, in the longitudinal section of the light modulation device side lens group 20*b*, that is, in the YZ section, in the second operating state shown in FIG. 6C, it is assumed that the distance between the screen SC side focus FPL of the light modulation device side lens group 20*b* and the screen SC side end surface 20*f* of the light modulation device side lens group 20*b* is FFPL. In addition, in the lateral section, that is, XZ section, in the second operating state, the second group 40 is withdrawn and the focus in the lateral section, that is, XZ section, is equivalent to the focus FPL of the longitudinal section, so that the graphic display and description thereof are omitted.

From among the distances FFPx, FFPy, and FFPL shown in FIGS. 6A to 6C, setting is made such that the distance FFPL shown in FIG. 6C is substantially equivalent to the distance p between the diaphragm 70 and the end surface in the side of the surface to be projected of the light modulation device side lens group 20*b*. That is, the distance FFPL is as follows.

$$FFPL \approx p$$

In this case, in the second operating state, it is possible to reduce the directional bias of telecentricity. In addition, when accurately FFPL=p, that is, when the position of the focus FPL with respect to the direction along the optical axis OA is equivalent to the position of the diaphragm 70, it is appropriate to implement the telecentricity. However, it is actually necessary to consider the aberration of the lens, and, as far as possible, it is preferable that the value of FFPL be close to p.

In contrast, the operations of first and second optical device groups 41 and 42 of the second group 40 largely affect the distances FFPx and FFPy shown in shown in FIGS. 6A and 6B, as described above. Therefore, generally, the distances FFPx and FFPy may not correspond to the distance p with respect to the diaphragm 70 or the distance FFPL related to the focus FPL in the second operating state. However, in the first embodiment, the second group 40 includes the first and second rotationally symmetric lenses 43*a* and 43*b*, which are the focal position adjustment units, in addition to the first and second optical device groups 41 and 42. As previously described, since the rotationally symmetric lenses 43*a* and 43*b* have the same power in the X direction and the Y direction, that is, both longitudinal section and the lateral section, the rotationally symmetric lenses 43*a* and 43*b* operate to equally move focal positions with respect to the lateral section and the longitudinal section. Therefore, the positions of the respective focuses FFPx and FFPy of the lateral section and the longitudinal section can be appropriately adjusted, and the focuses FFPx and FFPy satisfy the following expression.

$$FFPx < FFPL < FFPy \tag{1}$$

In addition, in the case where FFPy<FFPx, adjustment can be performed as follows.

$$FFPy < FFPL < FFPx \tag{1)'}$$

That is, in any case of the above conditions (1) and (1)', the distance FFPL is between the distance FFPx and the distance FFPy.

Further, in this case, if FFPx<FFPy in the first operating state shown in FIGS. 6A and 6B, the distance p is as follows.

$$FFPx < p < FFPy \tag{2}$$

Further, if FFPy<FFPx, the distance p is as follows.

$$FFPy < p < FFPx \tag{2)'}$$

Here, the optical projection system 20 illustrated in FIGS. 6A and 6B has the focus FPx of the lateral section which is closer to the end surface 20*f* than the focus FPy of the longitudinal section, so that FFPx<FFPy, thereby having relatively large magnification power in the lateral direction and increasing the aspect ratio of the image. In this case, setting is made such that the distance p is included in the range of Condition (2), thereby being greater than the lower limit FFPx and being lower than the upper limit FFPy.

It can be seen that the above Conditions (2) and (2)' define the arrangement range of the diaphragm 70 in order to excellently maintain the telecentricity of the optical projection system 20 in the first operating state while the direction of a field angle is considered. When the diaphragm 70 is arranged in the ranges of Conditions (2) and (2)', it is possible to secure the usage efficiency of light by improving the telecentricity. Therefore, it is possible to improve the performance of the projector 2. For example, when the focal distance in the Y direction is longer than the focal distance in the X direction in the whole projection lens, generally FFPx<FFPy. Therefore, the light flux, corresponding to the greatest field angle of the light flux up to the liquid crystal panel 18G (18R, 18B) side end surface 20*r* of the light modulation device side lens group 20*b*, is not parallel to the optical axis OA and has an inclination. In particular, the principal ray PL1 corresponding to the image at the periphery of the longitudinal section slopes inward of the screen SC, and the principal ray PL2 corresponding to the image at the periphery of the lateral section slopes outward of the screen SC. As a result, the optical projection system 20 is not telecentric to any direction in a strict sense but improves the telecentricity in a balanced manner with regard to the longitudinal direction and the lateral direction. In addition, if the diaphragm 70 is arranged in the side of the screen SC while exceeding the upper limit of Condition (2), all the principal rays corresponding to the images at the periphery of the lateral section and the longitudinal section slope outward of the screen SC to be separated from the optical axis OA, so that the telecentricity of the optical projection system 20 is greatly destroyed. In contrast, if the diaphragm 70 is arranged in the side of the screen SC while exceeding the lower limit of Condition (2), all the principal rays corresponding to the images at the periphery of the lateral section and the longitudinal section slope inward of the screen SC to be close to the optical axis OA, so that the telecentricity of the optical projection system 20 is greatly destroyed.

The preferable arrangement of the diaphragm 70 is in the range from the intermediate position between the focus FPy of the longitudinal section of the light modulation device side lens group 20*b* and the focus FPx of the lateral section of the light modulation device side lens group 20*b* to the focal position of the end surface 20*f* side or the subject side. That is, in the case where FFPx<FFPy, the distance p is set in the range of following Condition (3).

$$FFPx < p \leq (FFPy + FFPx)/2 \tag{3}$$

Further, in the case where FFPy<FFPx, the distance p is set to a value included in the range of the following Condition (3)'.

$$FFPy < p \leq (FFPy + FFPx)/2 \tag{3)'}$$

Here, in the optical projection system 20 illustrated in FIGS. 6A and 6B, FFPx<FFPy, so that the aspect ratio of an image having relatively large magnification power in the lateral direction is increased. In this case, the distance p is set in the range of Condition (3). The distance p is greater than the lower limit FFPx and lower than the upper limit (FFPy+FFPx)/2. Therefore, it is possible to comparatively improve the telecentricity in the intermediate direction of the lateral direction and the longitudinal direction, it is possible to reduce the directional bias of telecentricity, and it is possible to raise light efficiency. In addition, above described Conditions (3) and (3)' can be satisfied using the first and second rotationally symmetric lenses 43a and 43b which are the focal position adjustment units.

Figure 7A:
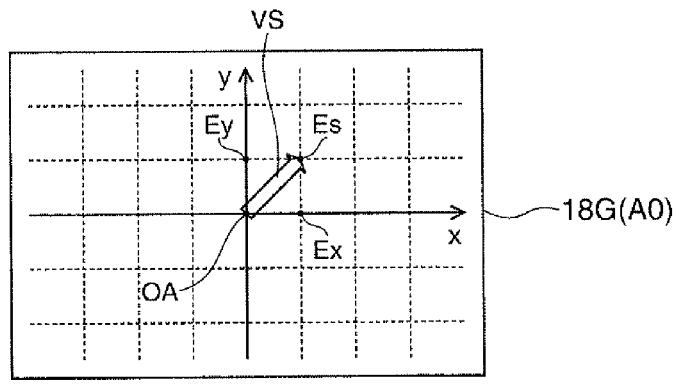
FIG. 7A is a view illustrating the position of a liquid crystal panel on the display region.

Hereinafter, the coordinates of the display region A0 of the liquid crystal panel 18G will be considered with reference to FIG. 7A. Here, an x axis corresponding to the lateral X direction and y axis corresponding to the longitudinal Y direction are determined based on the optical axis OA. When the emission angle of the principal rays from the liquid crystal panel 18G is considered in the optical projection system 20 having a vertically and horizontally asymmetric anamorphic type lens system, it has been known that it is not sufficient to consider only a horizontal axis position along an x axis and a vertical axis position along a y axis, and it is necessary to consider a position in the oblique direction. That is, the emission angle (principal ray angle) of the principal ray is considered in the direction shown using oblique vector VS in the drawing. Here, it is assumed that the horizontal axis position along the x axis and the principal ray angle from the horizontal axis position have an approximately substantially line shape, and the vertical axis position along the y axis and the principal ray angle from the vertical axis position have an approximately substantially line shape. In the same manner, an oblique position Es which is parallel to the vector VS and the principal ray angle from the oblique position Es can be handled to have a substantially line shape.

Figure 7B:
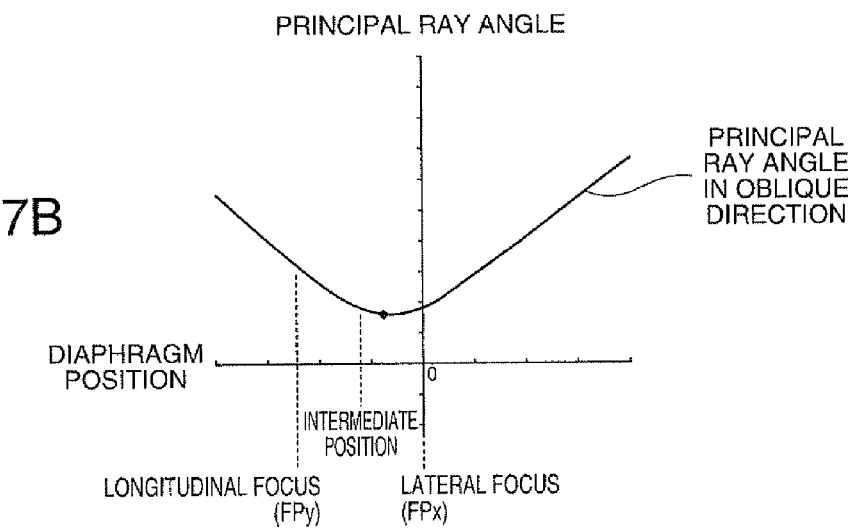
FIG. 7B is a view illustrating the relationship between a principal ray angle and a diaphragm position in the oblique section of the liquid crystal panel.

FIG. 7B illustrates an example of a result of simulation in which the principal ray angle of the oblique position Es of the apex of the vector VS is calculated while changing the position of the diaphragm 70.

As is clear from a chart, the minimum value of the principal ray angle exists between the focus FPy of the longitudinal section of the light modulation device side lens group 20b and the focus FPx of the lateral section. That is, when the position of the diaphragm 70 is set between the focus FPy of the longitudinal section and the focus FPx of the lateral section, it can be seen that the increase in the principal ray angle can be restrained as a whole. In other words, it is preferable that the distance p ranging from the end surface 20f of the light modulation device side lens group 20b to the diaphragm 70 be set between the distance FFPx and the distance FFPy. That is, it is preferable that the distance p be set within the range of the above Condition (2).

Further, if observed more finely, the minimum value of the principal ray angle exists between the intermediate position of the focus FPy of the longitudinal section and the focus FPx of the lateral section and the focus FPx of the lateral section. That is, when the position of the diaphragm 70 is set between the intermediate position of a pair of focuses FPy and FPx and the focus FPx of the lateral section, it can be considered that the increase in the principal ray angle is restrained as a whole. In other words, it can be considered that it is preferable that the distance p from the end surface 20f of the light modulation device side lens group 20b to the diaphragm 70 be equal to or less than the average of the distance FFPx and the distance FFPy and equal to or greater than the distance FFPx. That is, it is preferable that the distance p be set within the range of the above Condition (3).

Figure 7C:
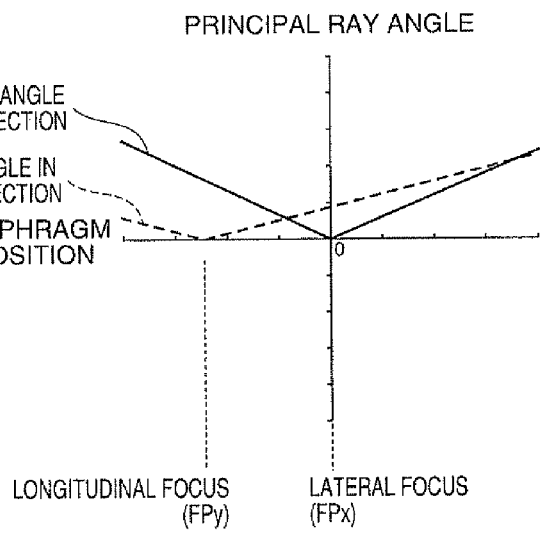
FIG. 7C is a view illustrating the relationship between a principal ray angle and a diaphragm position in the crosswise section of the liquid crystal panel.

FIG. 7C illustrates an example of a result of simulation in which the principal ray angle of a position Ex along the lateral x axis and a position Ey along the longitudinal y axis is calculated while changing the position of the diaphragm 70. As can be seen from a chart, when the diaphragm 70 is arranged at the focus FPx of the lateral section in the horizontal axis position Ex, the principal ray angle is 0. Meanwhile, when the diaphragm 70 is arranged at the focus FPy of the longitudinal section in the vertical axis position Ey, the principal ray angle is 0.

As described above, the field angle is considered in the first operating state, so that the optical projection system 20 according to the first embodiment is substantially telecentric in the subject side in both the first operating state into which the anamorphic optical system is inserted and the second operating state from which the anamorphic optical system is withdrawn. That is, rays from the liquid crystal panel 18G (18R, 18B) are nearly parallel to the optical axis OA in the longitudinal section, the lateral section, and the oblique section. Therefore, it is possible to relatively simply combine the liquid crystal panel 18G (18R, 18B) and the optical projection system 20 with high accuracy, so that the assembly thereof is good. Further, if light exiting from the liquid crystal panel 18G (18R, 18B) is integrated with optical projection system 20 in a substantially telecentric state when projection is performed using movement in such a way that the optical projection system 20 is moved in the direction perpendicular to the optical axis OA, it is easy to secure the amount of peripheral light, thereby contributing to the improvement of image quality.

Further, in the case of the optical projection system 20 according to the first embodiment, in the second operating state as shown in FIG. 5B, the first group 30 and the third group 60 are fixedly installed on the optical path and the second group 40 is advanced and retracted on the optical path. This point is greatly different from the case where the rear arrangement-type relay system (refer to JP-A-2005-221597 (Japanese Patent Application No. 2004-027496)) in the related art is applied to a projection system. That is, when the rear arrangement-type relay system is detached from the rear arrangement-type relay system in the related art, the optical projection system approaches the imaging device as much as a portion approximate to the rear arrangement-type relay system. Meanwhile, in the case of the optical projection system 20 according to the first embodiment, even when the second group 40 is detached and withdrawn from the optical path, it is seldom necessary to change the position of the first group 30 or the third group 60. That is, in the case of crosswise magnification conversion which causes the second group 40 to be advanced and retracted on the optical path, it is not necessary to greatly move the first group 30 or the third group 60, and it is possible to reduce the load of a mechanical mechanism. In addition, when the rear arrangement-type relay system in the related art is applied to a projection system, the crosswise magnification conversion can be performed by advancing and retracting the second group 40 which is a part of the rear arrangement-type relay system on the optical path. However, even when the second group is advanced and retracted on the optical path for the crosswise magnification conversion, the main optical system is not greatly moved. Further, the rear arrangement-type relay system in the related art is fixed to the mount of the main optical system instead of the main optical system which can be independently used. Therefore, in the case of the rear arrangement-type relay system in the related art, there are problems in that the optical burden thereof increases, the length thereof increases in the optical axis direction, and the number of constituent lenses increases. However, according to the optical projection system 20 of the first embodiment, it is not necessary to cause the second group 40 to function as a relay lens, and it is possible to shorten the total length thereof and to reduce the number of constituent lenses. Further, unlike the rear arrangement-type relay system in the related art, in the case of the optical projection system 20 of the first embodiment, not only a part but also the whole second group 40 is advanced and retracted while being independent of the first group 30 and the third group 60. Therefore, when the second group 40 is advanced and retracted or detached, effect, such as eccentric or the like, to the first group 30 and the third group 60 can be reduced, and, further, comparatively independent arrangement can be realized in mechanical manner. When the optical projection system 20 is assembled, if the assembly accuracy between the separate first group 30 and third group 60 is considered while regarding the second group 40 as a unit, the improvement of assembly can be expected.

In the optical projection system 20, the optical axis OA of the main body section 20*a* can be moved by an appropriate amount of shift SF while the optical axis OA of the main body section 20*a* is maintained to be parallel to the central axis AX of the liquid crystal panel 18G, so that it is possible to perform projection using movement, and it is easy to prevent audiences and the image light PL from interfering with each other, and installation thereof is improved. In the state in which the main body section 20*a* of the optical projection system 20 shifts with respect to the liquid crystal panel 18G as described above, if zooming, in which the second lens unit 32 is operated and then projection magnification is changed, is performed by the zoom drive mechanism 61, the absolute amount of shift of the image light PL increases. Therefore, it is possible to improve the operability and installation property of the projector 2 by correcting the increase in the amount of shift attributable to zooming using the operation of the entire system drive mechanism 64. At this time, under the control of the main control unit 88, operability is further improved by automating the operation in such a way as to operate the zoom drive mechanism 61 together with the entire system drive mechanism 64.

In the case of the optical projection system 20 of the first embodiment, one side or both sides of each of the optical device groups 41 and 42 which construct the second group 40 is a cylindrical lens surface which is a kind of an anamorphic lens. When compared to another anamorphic lens, a free-form surface lens, or the like, the cylindrical lens can be expected as highly accurate because the cylindrical lens is comparatively easily processed, and the cost thereof can be reduced. Further, the sensitivity eccentricity of the plane section side is low and assembly property is improved, so that high performance can be expected as a result. That is, by constructing the second group 40 using the cylindrical lens, cost can be reduced while the accuracy of the optical projection system 20 is secured.

The one side or both sides of each of the optical device groups 41 and 42 which construct the second group 40 is not limited to the cylindrical lens surface, and another anamorphic lens (for example, toric or toroidal lens) can be used.

In the above description, the one side or both sides of each of the cylindrical-type or anamorphic lens-type optical device groups 41 and 42 which construct the second group 40 can have an aspherical surface type, in detail, a shape expressed using the following polynomial expression h with respect to the longitudinal X section or the lateral Y section, as an example of the free-form surface.

$$h = \frac{cy^2}{1 + \sqrt{1 - (1+k)c^2y^2}} + A_2y^2 + A_4y^4 + A_6y^6 + A_8y^8 + A_{10}y^{10} + \ldots$$

In the expression, y is the height of an image (image height) from the optical axis OA, c is the curvature of a spherical surface as the standard, k is a conic constant, and each of $A_2$, $A_4$, $A_6$, $A_8$, $A_{10}$, ... is a predetermined correction term.

Further, another free-form surface can be used as the one side or both sides of each of the optical device groups 41 and 42 which construct the second group 40. Since curvatures can be controlled in both sections of the Y direction and the X direction by using various types of free-form surface lenses, astigmatic aberration can be reduced and high performance can be realized. Further, by using an aspherical surface, various types of aberrations can be reduced and high performance can be realized. Further, by using a free-form surface, it is easy to optimize the image forming state in the intermediate oblique direction, other than the longitudinal and lateral directions of the liquid crystal panel 18G (18R, 18B), in the image circle surface on the screen SC or on the liquid crystal panel 18G (18R, 18B), and it is possible to realize high performance.

The second group 40 is not limited to two optical device groups 41 and 42, and can be configured with three or more optical device groups. At this time, it is preferable that color aberration should not occur because of the second group 40. Therefore, it is preferable that the following relationship be realized.

$$\Sigma(\phi i \times v i) \approx 0$$

where $\phi i$: the refractive index of each lens included in the second group 40

$vi$: the Abbe number of each lens included in the second group 40

FIGS. 8A and 8B are views illustrating the modification example of the optical projection system 20 shown in FIGS. 4A and 4B. The second group 140 has focal distances which are different from each other in the longitudinal direction (Y direction) and in the lateral direction (X direction). As a result, all the system of the optical projection system 20 including the first group 30 has focal distances which are different from each other in the longitudinal direction and the lateral direction. In this case, with regard to the section of the lateral direction (X direction), the second group 140 includes a first optical device group 141 having negative power, and a second optical device group 142 having positive power in order from the screen SC. Further, as a rotationally symmetric lens group, the second group 140 includes a first rotationally symmetric lens 143*a* having positive power, and a second rotationally symmetric lens 143*b* having negative power in order from the screen SC. The rotationally symmetric lenses 143*a* and 143*b* have the same power with respect to both sides, that is, the longitudinal section and the lateral section. As shown in FIG. 8B, when the second group 140 is withdrawn from the optical path, an image can be projected on the screen SC at an aspect ratio (for example, 1.78:1) as the image formed on the liquid crystal panel 18G (18R, 18B). Further, as shown in FIG. 8A, an image can be projected on the screen SC at an aspect ratio (for example, 2.4:1) compressed in the longitudinal direction by arranging the second group 40 on the optical path, and enlarging an image to be formed on the liquid crystal panel 18G (18R, 18B) in the lateral direction. Further, by moving the first optical device group 141 and the second optical device group 142, which are included in the second group 140, in the direction of the optical axis OA using the second anamorphic drive mechanism 63 shown in FIG. 3A and adjusting the distance therebetween, the aspect ratio of an image to be projected on the screen SC can be continuously increased or reduced.

As described above, according to the optical projection system 20 of the embodiment, the light modulation device side lens group 20*b* has powers which are different from each other in the longitudinal direction and the lateral direction of the liquid crystal panel 18G (18R, 18B). Therefore, even the entire system of the optical projection system 20 has focal distances which are different from each other in the longitudinal and lateral directions, and magnifications which are different from each other in the longitudinal and lateral direction. Therefore, the aspect ratio of the image on the liquid crystal panel 18G (18R, 18B) can be different from the aspect ratio of the image to be projected on the screen SC. That is, conversion can be performed on the aspect ratio, which is a ratio of a width and height, by the optical projection system 20. At this time, in the second operating state in which the second group 40 is withdrawn from the optical path, high telecentricity is secured. Further, in the first operating state in which the second group 40 is arranged on the optical path, the Conditional expressions (1) and (1)' are satisfied by entirely adjusting both focal positions, which are different from each other in the longitudinal and lateral directions, using the first and second rotationally symmetric lenses 43a and 43b, which are focal position adjustment units. Further, in the relationship of the distance p between the diaphragm 70 and the screen SC side end surface 20f of the light modulation device side lens group 20b, the Conditional expressions (2) and (2)' are satisfied. Therefore, it is possible to secure a predetermined telecentricity or more in both sides, that is, the longitudinal direction and the lateral direction.

Example 1

Figure 9:
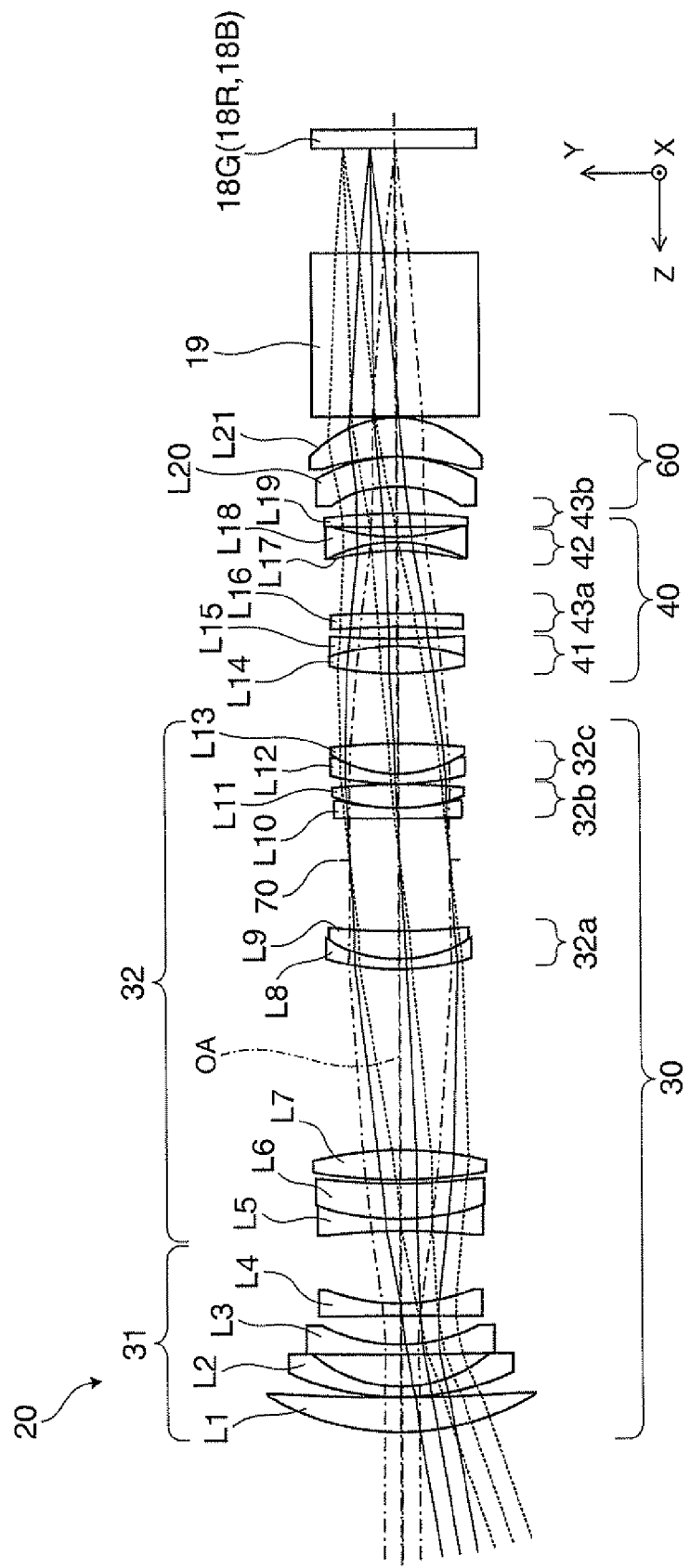
FIG. 9 is a view illustrating a longitudinal section in the first operating state of an optical system according to an Example 1 of the first embodiment.
Figure 10:
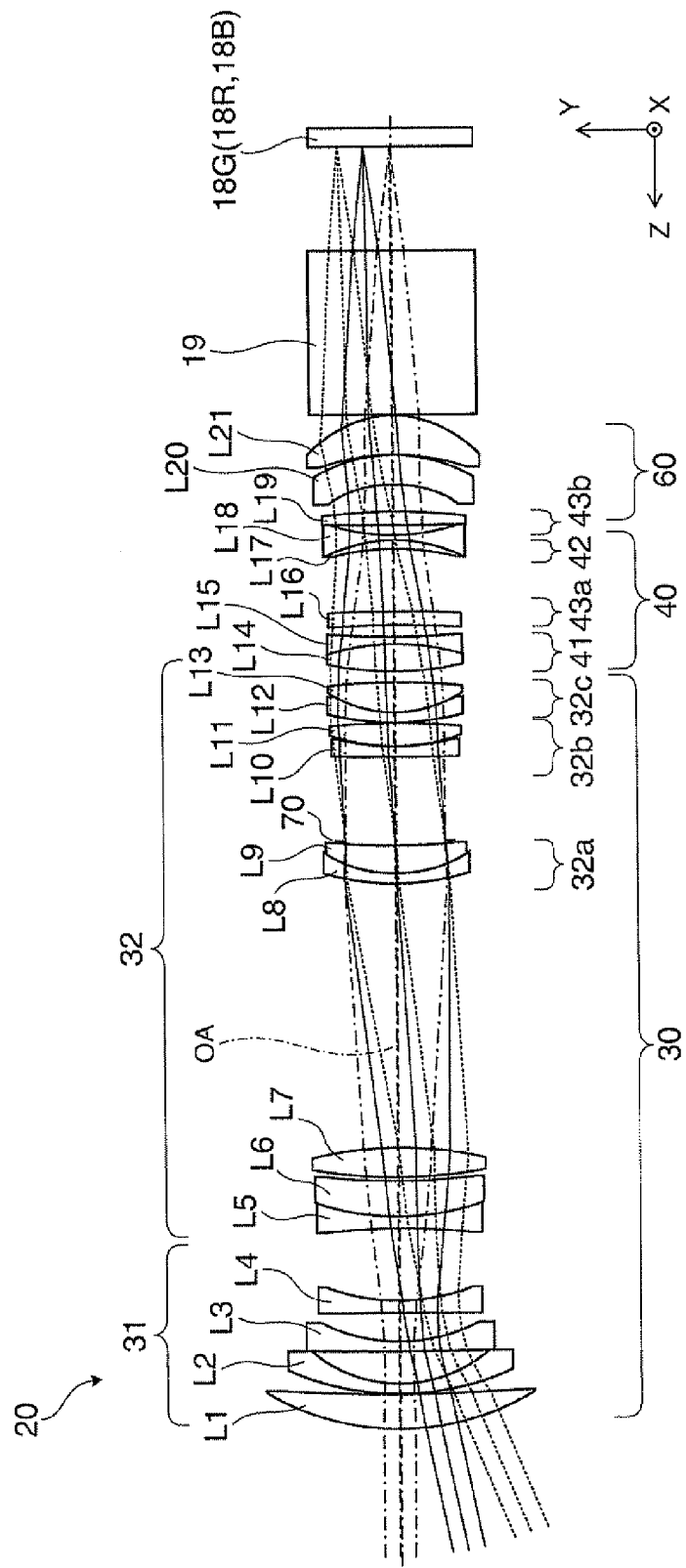
FIG. 10 is a view illustrating the longitudinal section in the case in which the optical system shown in FIG. 9 is a wide end.
Figure 11:
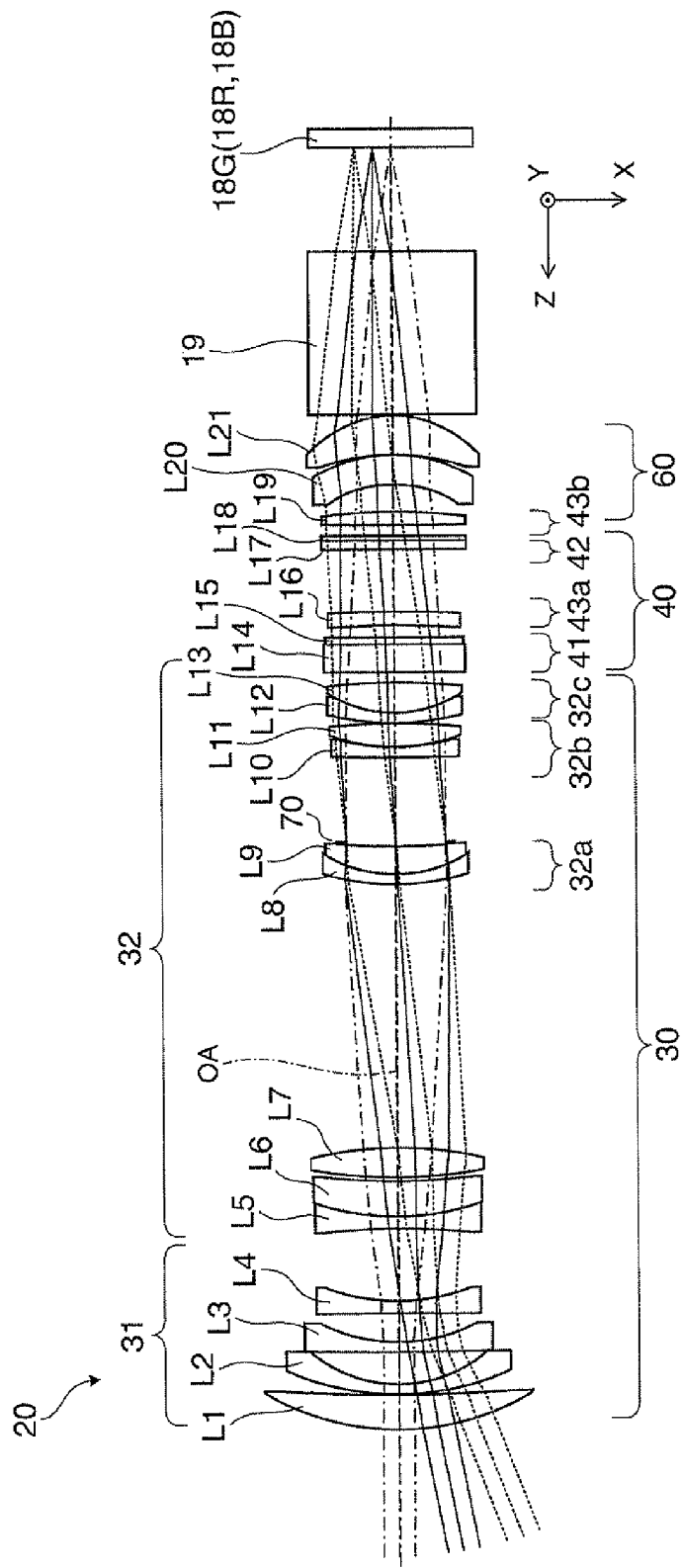
FIG. 11 is a view illustrating the lateral section in the case in which the optical system shown in FIG. 9 is a wide end.

FIGS. 9 to 11 are views illustrating a detailed Example 1 of the optical projection system 20 of the first embodiment, and illustrate the optical projection system 20 in the first operating state. FIG. 9 illustrates the state of a "tele end", in which magnification power is comparatively low, with respect to the longitudinal section. FIG. 10 illustrates the state of a "wide end", in which magnification power is comparatively high, with respect to the longitudinal section. FIG. 11 illustrates the state of the "wide end", in which magnification power is comparatively high, with respect to the lateral section.

The optical projection system 20 includes lenses L1 to L21. The first group 30 is configured to include the lenses L1 to L13, the second group 40 is configured to include the lenses L14 to L19, and the third group 60 is configured to include the lenses L20 and L21. The lenses L1 to L13 included in the first group 30 are lenses having rotationally symmetric spherical surfaces around the optical axis OA. In the second group 40, the cemented lenses L14 and L15 function as the first optical device 41, and the cemented lenses L17 and L18 function as the second optical device 42. Further, in the second group 40, the lens L16 and lens L19 respectively function as the first and second rotationally symmetric lenses 43a and 43b. Therefore, first, the cemented lenses L14 and L15 are cylindrical lenses which have positive power with respect to the longitudinal Y direction but do not have power with respect to the lateral X direction. Further, the cemented lenses L17 and L18 are cylindrical lenses which have negative power with respect to the longitudinal Y direction but do not have power with respect to the lateral X direction. Further, the lens L16 is a rotationally symmetric concave lens which has negative power, and the lens L19 is a rotationally symmetric convex lens which has positive power. The lens L20 included in the third group 60 is a negative meniscus lens, and the lens L21 is a positive meniscus lens. In addition, in the first group 30, the first lens group 32a including the lenses L8 and L9, the second lens group 32b including the lenses L10 and L11, and the third lens group 32c including the lenses L12 and L13 are displaced along the optical axis OA when projection magnification is changed, that is, when zooming is performed. In addition, the lens L20 is an aspherical surface lens. In particular, the configuration expressed in the above-described polynomial expression h is applied to an aspherical surface expression in the same manner. That is, the configuration is specified by applying an appropriate number to the following expression.

$$h = \frac{cy^2}{1+\sqrt{1-(1+k)c^2y^2}} + A_2 y^2 + A_4 y^4 + A_6 y^6 + A_8 y^8 + A_{10} y^{10} + \ldots$$

Figure 12:
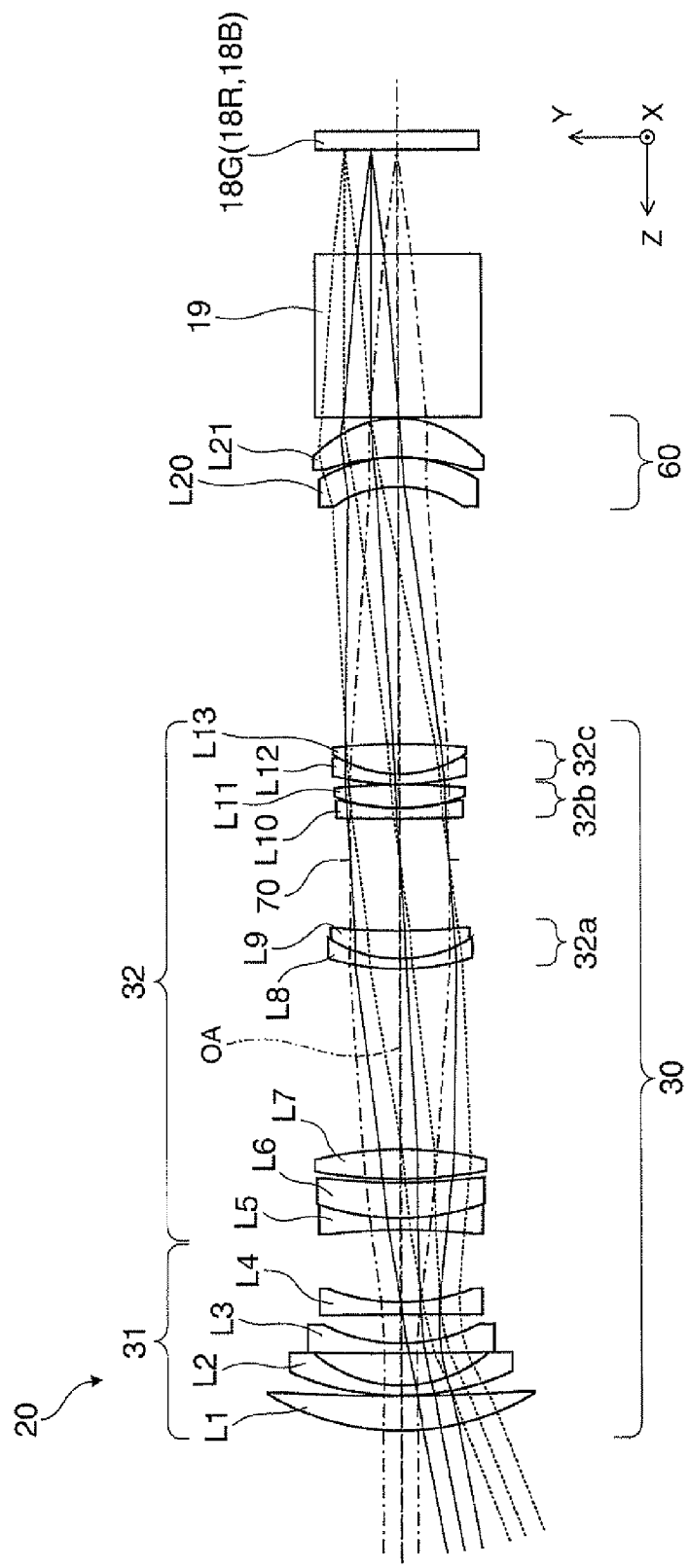
FIG. 12 is a view illustrating a longitudinal section in the second operating state of the optical system according to the Example 1 of the first embodiment.
Figure 13:
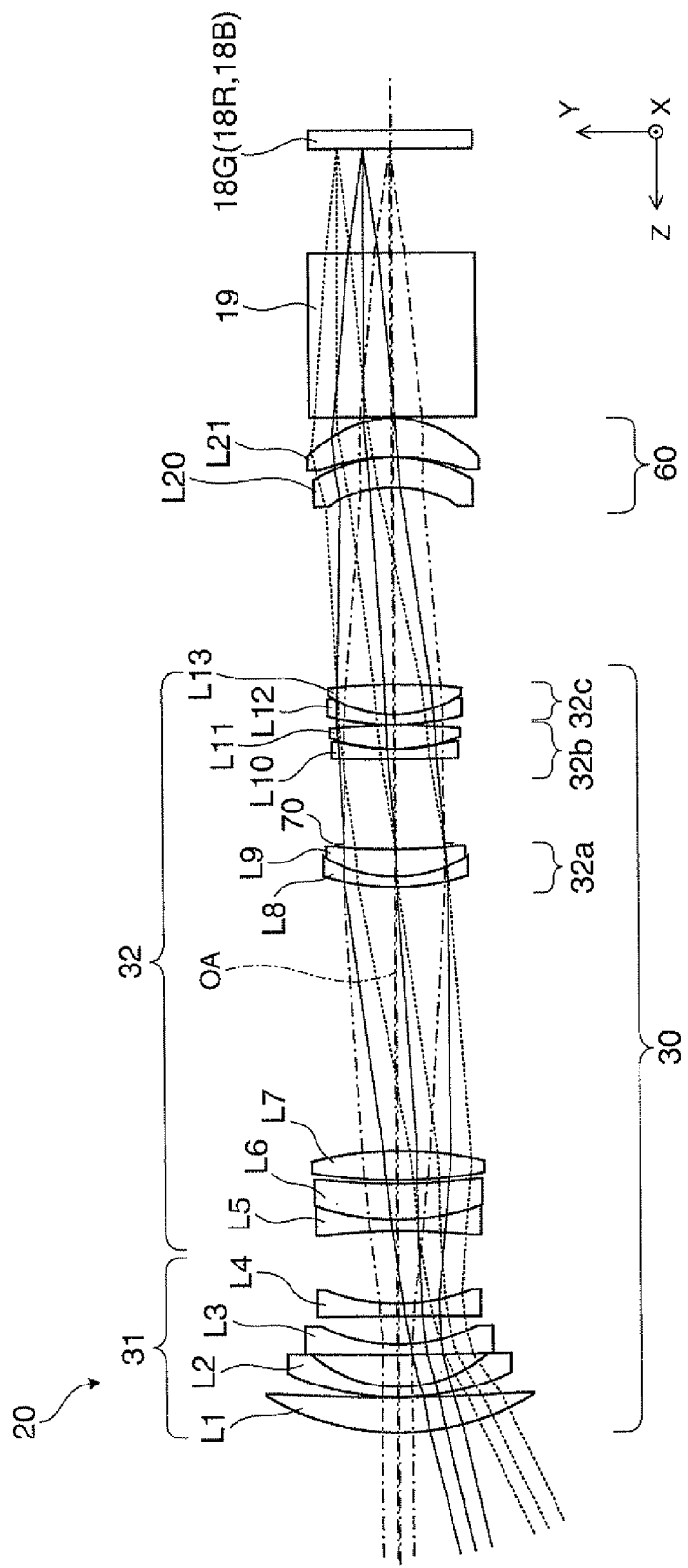
FIG. 13 is a view illustrating the longitudinal section in the case in which the optical system shown in FIG. 12 is a wide end.

Further, FIGS. 12 to 13 are views illustrating a detailed Example 1 of the optical projection system 20 of the first embodiment, and illustrate the optical projection system 20 in the second operating state. FIG. 12 illustrates the state of a "tele end", in which magnification power is comparatively low. FIG. 13 illustrates the state of a "wide end" in which magnification power is comparatively high.

In the case of the second operating state, as shown in the drawings, the optical projection system 20 has a state from which the second group 40 is withdrawn.

In the following Table 1 and Table 2, the lens data or the like of the Example 1 is displayed. Table 1 relates to the optical projection system 20 in the first operating state, and Table 2 relates to the optical projection system 20 in the second operating state. In the top column of Table 1 and Table 2, "surface number" is a number assigned to the surface of each lens respectively from the image surface side. Further, "R" indicates a Y curvature radius or an X curvature radius, and "D" indicates lens thickness or air space between one of the lens surfaces and the other surface. Further, "Nd" indicates the refractive index of the "d" line of a lens material, and "vd" indicates the Abbe number of the "d" line of a lens material. In addition, in the case of Example 1, all surfaces, other than the surface of lens L20, are spherical surfaces or cylindrical surfaces. Further, with respect to the lens L20, which is the aspherical surface lens, the values at the bottom of Table 1 and Table 2 are applied to the above-described polynomial expression h.

TABLE 1

| | Anamorphic mode | | | |
| --- | --- | --- | --- | --- |
| Surface No. | R | D | Nd | vd |
| 1 | 57.267 | 7.59 | 1.556973 | 49.9231 |
| 2 | 440.215 | 0.11 | | |
| 3 | 60.175 | 2.20 | 1.532237 | 73.5867 |
| 4 | 29.297 | 7.03 | | |
| 5 | 3674.199 | 2.20 | 1.846660 | 23.7779 |
| 6 | 36.404 | 6.36 | | |
| 7 | −962.592 | 2.77 | 1.559709 | 68.9292 |
| 8 | 44.905 | 15.79 | | |

TABLE 1-continued

| | | | | |
|---|---|---|---|---|
| 9 | −150.198 | 2.73 | 1.696797 | 55.5322 |
| 10 | 55.639 | 7.81 | 1.697542 | 30.3002 |
| 11 | 158.867 | 0.78 | | |
| 12 | 95.225 | 6.56 | 1.704003 | 29.8732 |
| 13 | −78.126 | Variable | | |
| 14 | 55.161 | 2.20 | 1.771084 | 43.1258 |
| 15 | 29.723 | 6.05 | 1.672393 | 32.1744 |
| 16 | 149.947 | variable | | |
| Diaphragm | Infinite | Variable | | |
| 18 | 708.448 | 2.20 | 1.808793 | 31.9168 |
| 19 | 52.013 | 0.10 | | |
| 20 | 44.209 | 5.10 | 1.500097 | 80.7289 |
| 21 | −185.810 | 0.10 | | |
| 22 | 60.364 | 2.20 | 1.808025 | 30.7098 |
| 23 | 28.456 | 6.63 | 1.544292 | 71.4093 |
| 24 | −165.744 | variable | | |
| 25 | 75.567 | 6.02 | 1.818568 | 43.7246 |
| 26 | −54.099 | 1.60 | 1.727671 | 33.2772 |
| 27 | 169.532 | 2.62 | | |
| 28 | −221.317 | 3.00 | 1.837216 | 36.7065 |
| 29 | −611.050 | 13.82 | | |
| 30 | −62.044 | 1.89 | 1.840922 | 30.2152 |
| 31 | −37.121 | 1.10 | 1.512311 | 69.3525 |
| 32 | 47.371 | 2.22 | | |
| 33 | 544.194 | 3.00 | 1.500532 | 80.6164 |
| 34 | −149.616 | 6.00 | | |
| *35 | −36.161 | 6.50 | 1.491755 | 57.4711 |
| *36 | −38.427 | 0.10 | | |
| 37 | −51.840 | 8.60 | 1.517354 | 66.2196 |
| 38 | −26.090 | 0.19 | | |
| 39 | Infinite | 36.00 | 1.516330 | 64.142 |
| 40 | infinite | | | |

Aspherical coefficient

| Surface No. | K | A4 | A6 | A8 | A10 | A12 |
|---|---|---|---|---|---|---|
| 35 | 1.029 | −1.693E−05 | −4.793E−09 | −4.679E−11 | 1.763E−13 | −6.342E−16 |
| 36 | −5.499 | −1.634E−05 | 1.691E−08 | −8.367E−12 | −5.980E−16 | 3.529E−19 |

*Aspherical surface
*25 to 27, 30 to 32 surfaces are cylindrical lenses
The curvature in the X direction is 0

TABLE 2

Normal mode

| Surface No. | R | D | Nd | vd |
|---|---|---|---|---|
| 1 | 57.267 | 7.59 | 1.556973 | 49.9231 |
| 2 | 440.215 | 0.11 | | |
| 3 | 60.175 | 2.20 | 1.532237 | 73.5867 |
| 4 | 29.297 | 7.03 | | |
| 5 | 3674.199 | 2.20 | 1.846660 | 23.7779 |
| 6 | 36.404 | 6.36 | | |
| 7 | −962.592 | 2.77 | 1.559709 | 68.9292 |
| 8 | 44.905 | 15.79 | | |
| 9 | −150.198 | 2.73 | 1.696797 | 55.5322 |
| 10 | 55.639 | 7.81 | 1.697542 | 30.3002 |
| 11 | 158.867 | 0.78 | | |
| 12 | 95.225 | 6.56 | 1.704003 | 29.8732 |
| 13 | −78.126 | Variable | | |
| 14 | 55.161 | 2.20 | 1.771084 | 43.1258 |
| 15 | 29.723 | 6.05 | 1.672393 | 32.1744 |
| 16 | 149.947 | Variable | | |
| Diaphragm | Infinite | variable | | |
| 18 | 708.448 | 2.20 | 1.808793 | 31.9168 |
| 19 | 52.013 | 0.10 | | |
| 20 | 44.209 | 5.10 | 1.500097 | 80.7289 |
| 21 | −185.810 | 0.10 | | |
| 22 | 60.364 | 2.20 | 1.808025 | 30.7098 |
| 23 | 28.456 | 6.63 | 1.544292 | 71.4093 |
| 24 | −165.744 | variable | | |
| *25 | −36.161 | 6.50 | 1.491755 | 57.4711 |
| *26 | −38.427 | 0.10 | | |
| 27 | −51.840 | 8.60 | 1.517354 | 66.2196 |
| 28 | −26.090 | 0.19 | | |

TABLE 2-continued

| 29 | Infinite | 36.00 | 1.516330 | 64.142 |
|---|---|---|---|---|
| 30 | infinite | | | |

Aspherical Coefficient

| Surface No | K | A4 | A6 | A8 | A10 | A12 |
|---|---|---|---|---|---|---|
| 25 | 1.029 | −1.693E−05 | −4.793E−09 | −4.679E−11 | 1.763E−13 | −6.342E−16 |
| 26 | −5.499 | −1.634E−05 | 1.691E−08 | −8.367E−12 | −5.980E−16 | 3.529E−19 |

*Aspherical surface

As shown in FIGS. 9 to 13, because each of the lens groups 32a, 32b, and 32c included in the second lens unit 32, and the diaphragm 70 are separately moved along the direction of the optical axis OA, the zooming operation is separately performed in the first and second operating states.

Figure 14A:
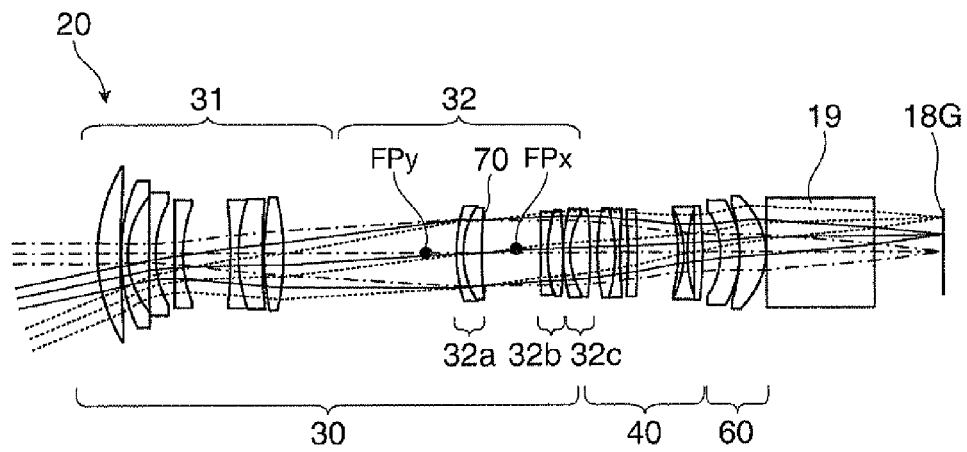
FIGS. 14A to 14C are views illustrating the zooming operation of the optical system in the first operating state of the Example 1.
Figure 14B:
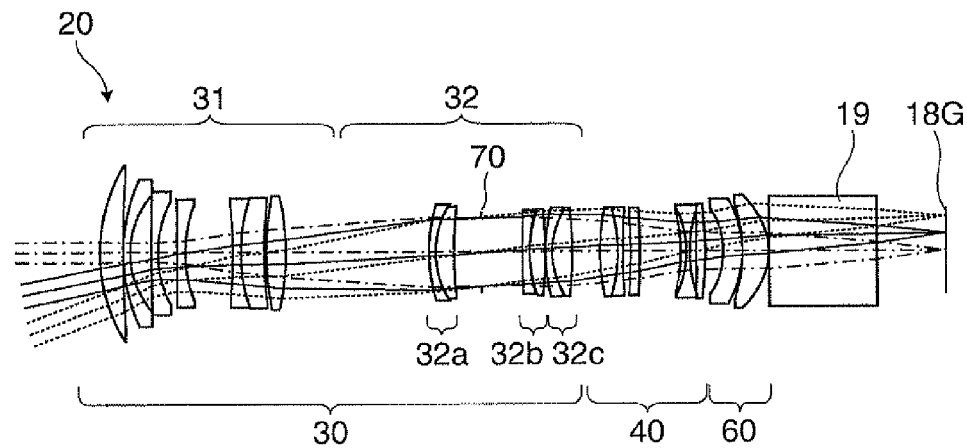
Figure 14C:
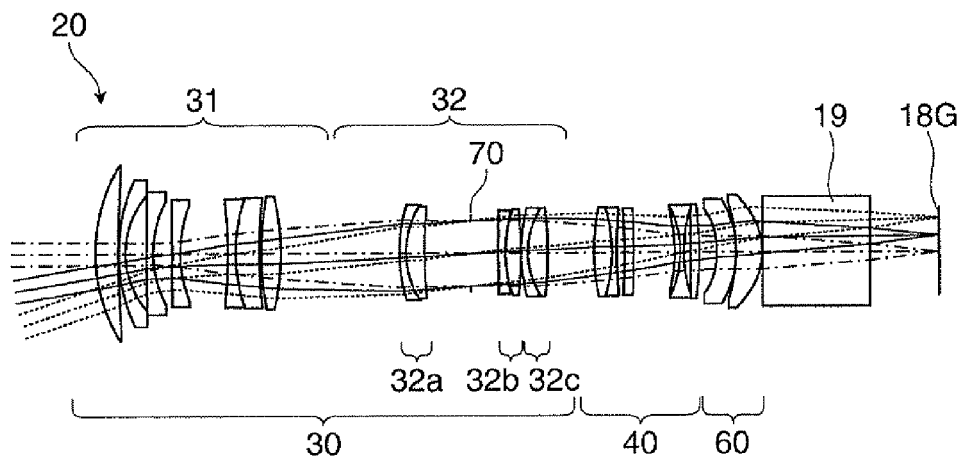
Figure 15A:
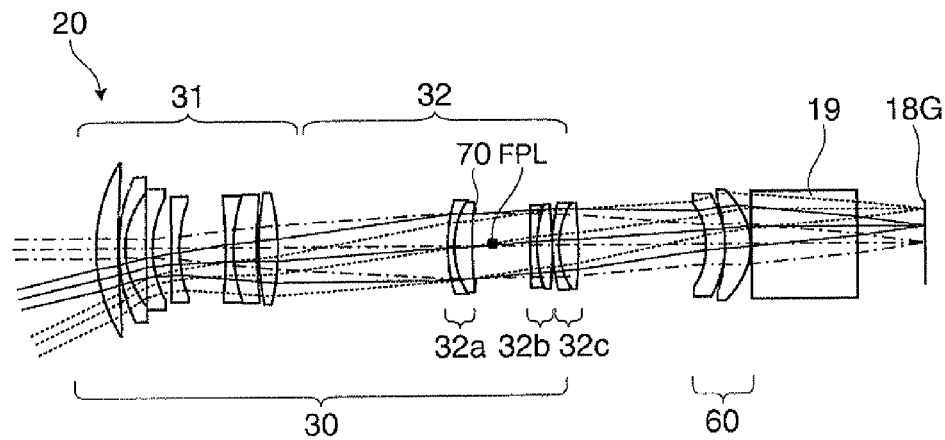
FIGS. 15A to 15C are views illustrating the zooming operation of the optical system in the second operating state of the Example 1.
Figure 15B:
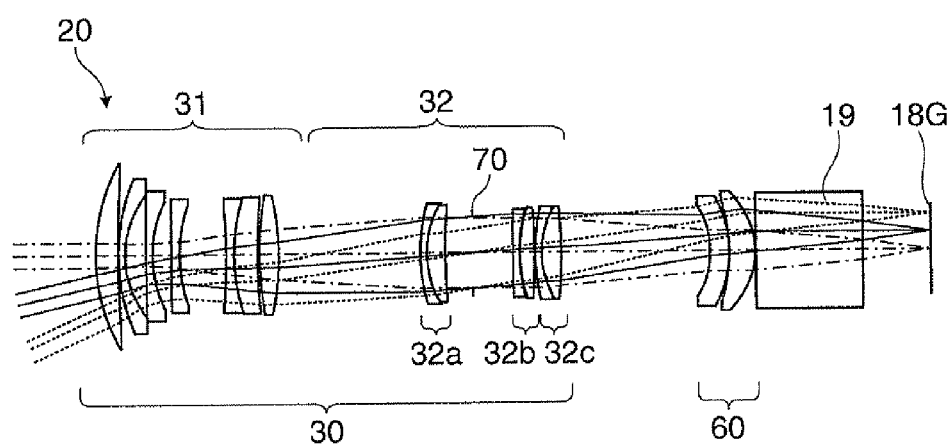
Figure 15C:
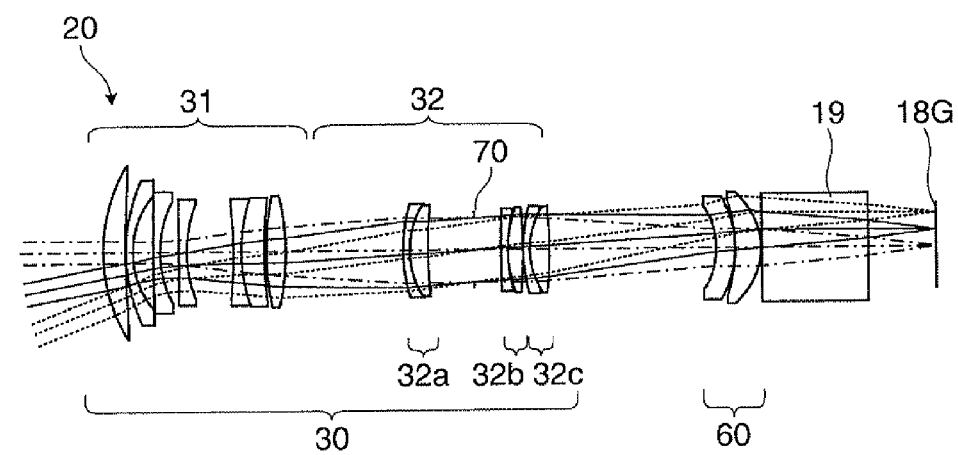

FIGS. 14A to 14C illustrate the zooming operation in the first operating state, and FIGS. 15A to 15C illustrate the zooming operation in the second operating state. FIG. 14A illustrates the state of FIG. 10 of the first operating state, and the case of a "wide end" in which a magnification power is large. Further, FIG. 14B illustrates the case of an "intermediate" state, and FIG. 14C illustrates the state of FIG. 9 and illustrates the case of a "tele end" in which a magnification power is small. In the same manner, FIG. 15A illustrates the case of a "wide end" in the second operating state, FIG. 15B illustrates the case of the "intermediate" state, and FIG. 15C illustrates the case of "tele end". As shown in the drawings, in association with the zooming operation, the position of the diaphragm 70 is changed. However, the diaphragm 70 is located between the focus FPy of the longitudinal section and the focus FPx of the lateral section, and arranged closer to the subject side, that is, a focus FPx side, than the intermediate position between the focus FPy of the longitudinal section and the focus FPx of the lateral section.

In the top columns of Table 3 below and Table 4, the positions of each of the lens groups 32a, 32b, and 32c of the second lens unit 32 and the diaphragm 70, obtained when the zooming operations shown in FIGS. 14A to 14C and FIGS. 15A to 15C are performed, are displayed. In particular, the image side surface of the lens L8 of the lens group 32a is a thirteenth surface, the image side surface of the lens L10 of the lens group 32b is a sixteenth surface, and the image side surface of the lens L12 of the lens group 32c is a twenty-fourth surface.

TABLE 3

| Surface No. | Wide | Middle | Tele |
|---|---|---|---|
| Variable portion | | | |
| 13 | 57.847 | 48.272 | 39.693 |
| 16 | 1.000 | 8.685 | 15.547 |
| Diaphragm | 18.524 | 14.136 | 9.130 |
| 24 | 2.408 | 8.685 | 15.408 |
| Focal distance | | | |
| fx | 21.300 | 23.400 | 25.600 |
| fy | 28.160 | 30.932 | 33.837 |
| Fno | | | |
| Fx | 3.01 | 3.12 | 3.25 |
| Fy | 3.98 | 4.13 | 4.30 |

TABLE 4

| Surface No. | Wide | Middle | Tele |
|---|---|---|---|
| Variable portion | | | |
| 13 | 57.847 | 48.272 | 39.693 |
| 16 | 1.000 | 8.685 | 15.547 |
| Diaphragm | 18.524 | 14.136 | 9.130 |
| 24 | 43.678 | 49.955 | 56.678 |
| Focal distance | | | |
| f | 24.489 | 26.903 | 29.432 |
| Fno | | | |
| F | 3.46 | 3.59 | 3.74 |

In addition, the intermediate columns of Table 3 and Table 4 indicate the focal distances between the x direction and Y direction of the optical projection system 20 when the zooming operation is performed. Further, the bottom columns of Table 3 and Table 4 indicate the brightness (F value) in the X direction and Y direction of the optical projection system 20 when the zooming operation is performed.

Second Embodiment

Hereinafter, an optical projection system or the like according to a second embodiment will be described. In addition, the second embodiment is the modification example of the optical projection system or the like according to the first embodiment, and portions and items which are not especially described are the same as the case of the first embodiment.

FIGS. 16A and 16B are views illustrating an optical projection system 20 according to the second embodiment. With respect to the section of the longitudinal direction (Y direction), a second group 240 of the optical projection system 20 includes a first optical device group 241 having negative power, and a second optical device group 242 having positive power in order from the screen SC. In this case, an image can be projected on the screen SC at an aspect ratio obtained by enlarging an image to be formed on the liquid crystal panel 18G (18R, 18B) in the longitudinal direction and compressing in the lateral direction.

Further, the second group 240 includes, in order from the screen SC, a first rotationally symmetric lens 243a having negative power and a second rotationally symmetric lens 243b having positive power as focal position adjustment units. The first and second rotationally symmetric lenses 243a and 243b move focal positions, which are different from each other in the X direction and the Y direction, in the same manner using the first and second optical device groups 241 and 242, thereby adjusting the corresponding focal positions.

In the case of the optical projection system 20 shown in FIG. 16A or the like, generally, the focus FPy of the longitudinal section is closer to the liquid crystal panel 18G (18R, 18B) than the focus FPx of the lateral section, so that FFPy<FFPx. In this case, the distance FFPL in the second operating state is set in the range of Condition (1)'.

$$FFPy < FFPL < FFPx \quad (1)'$$

Therefore, the distance FFPL is greater than the lower limit FFPy and lower than the upper limit FFPx. Further, the distance p is set in the range of Condition (2)'.

$$FFPy < p < FFPx \quad (2)'$$

Therefore, the distance p is greater than the lower limit FFPy and lower than the upper limit FFPx. Therefore, it is possible to make telecentricity to be high in any of the first operating state and the second operating state.

Further, in the case of the optical projection system 20 shown in FIG. 16A or the like, the distance p is set within the range of Condition (3)'.

$$FFPy < p \le (FFPy + FFPx)/2 \quad (3)'$$

Therefore, the distance p is greater than the lower limit FFPy and lower than the upper limit (FFPy+FFPx)/2. Therefore, it is possible to make telecentricity comparatively high in the intermediate direction of the lateral direction and the longitudinal direction.

Third Embodiment

Hereinafter, an optical projection system or the like according to a third embodiment will be described. In addition, the third embodiment is the modification example of the optical projection system or the like according to the first embodiment, and portions and items which are not especially described are the same as the case of the first embodiment.

FIGS. 17A and 17B are views illustrating the optical projection system 320 according to the third embodiment. The optical projection system 320 includes a first group 30 and a second group 40. The optical projection system 320 does not include a third group 60 as in the optical projection system 20 according to the first embodiment. In this case, by adjusting first and second rotationally symmetric lenses 43a and 43b which are the focal position adjustment units of the second group 40, the position of the diaphragm 70 in the first operating state is the distance between the focus of a lateral section and the focus of a longitudinal section based on the screen SC side end surface of a light modulation device side lens group 20b. The distance p from the screen SC side end surface of the light modulation device side lens group 20b to a diaphragm 70 is between the distance FFPy and the distance FFPx. Further, in the case of the optical projection system 320, the position of the diaphragm 70 is set to a range from the intermediate position, between the focus of the longitudinal section of the light modulation device side lens group 20b and the focus of the lateral section, to the focal position in the side of a liquid crystal panel 18G (18R, 18B).

The second group 40 shown in FIG. 17A or the like can have the same configuration as a second group 140 shown in FIG. 8A or the like. Further, the second group 40 shown in FIG. 17A can have the same configuration as the second group 240 shown in FIG. 16A or the like.

In the optical projection system 320 according to the third embodiment, a lens group having positive power can be added to the second group 40.

Fourth Embodiment

Hereinafter, an optical projection system or the like according to a fourth embodiment will be described. In addition, the fourth embodiment is the modification example of the optical projection system or the like according to the first embodiment, and portions and items which are not especially described are the same as the case of the first embodiment.

FIGS. 18A and 18B are views illustrating an optical projection system 420 according to the fourth embodiment. The second group 440 of the optical projection system 420 includes, in order from the screen SC with respect to the section of longitudinal direction (Y direction), a first longitudinal direction optical device group 441y which has positive power, a first lateral direction optical device group 441x which does not have power, a second longitudinal direction optical device group 442y which has negative power, and a second lateral direction optical device group 442x which does not have power. Here, the first and second longitudinal direction optical device groups 441y and 442y do not have power with respect to the section of the lateral direction (X direction) shown in FIG. 18A. Meanwhile, the first lateral direction optical device group 441x has negative power with respect to the section of the lateral direction (X direction) shown in FIG. 18A, and the second lateral direction optical device group 442x has positive power. As an example, any of each of the optical device groups 441y, 442y, 441x, and 442x may include a cylindrical lens. That is, the longitudinal direction optical device groups 441y and 442y correspond to a first anamorphic lens group which has stronger positive or negative power in the longitudinal direction (Y direction) than the lateral direction (X direction), and the lateral direction optical device groups 441x and 442x correspond to a second anamorphic lens group which has stronger positive or negative power in the lateral direction (X direction) than the longitudinal direction (Y direction).

In this case, for example, an image formed on the liquid crystal panel 18G (18R, 18B) can be projected on a screen SC at an aspect ratio in which the image is reduced in the longitudinal direction and enlarged in the lateral direction. That is, the first and second longitudinal direction optical device groups 441y and 442y of the second group 440 have different power in the longitudinal direction and the lateral direction, thereby performing conversion of the aspect ratio of the image. That is, the first and second longitudinal direction optical device groups 441y and 442y function as first and second optical device groups which principally function as the second group 440. Further, the first and second longitudinal direction optical device groups 441y and 442y and the first and second lateral direction optical device groups 441x and 442x equally move a focal position related to each section in the first operating state in cooperation with each other, thereby functioning as the focal position adjustment units.

Figure 19A:
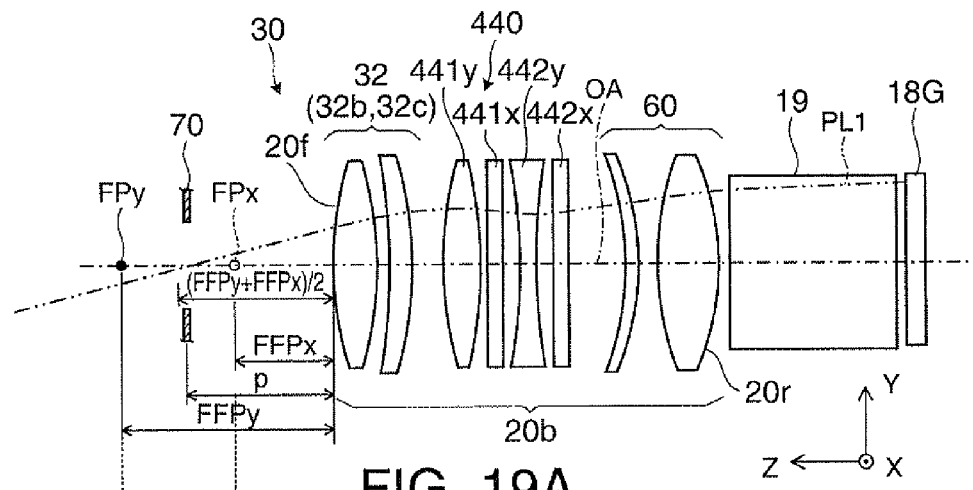
FIGS. 19A and 19B are longitudinal section and lateral section views illustrating a focal position and a diaphragm position in the first operating state.
Figure 19B:
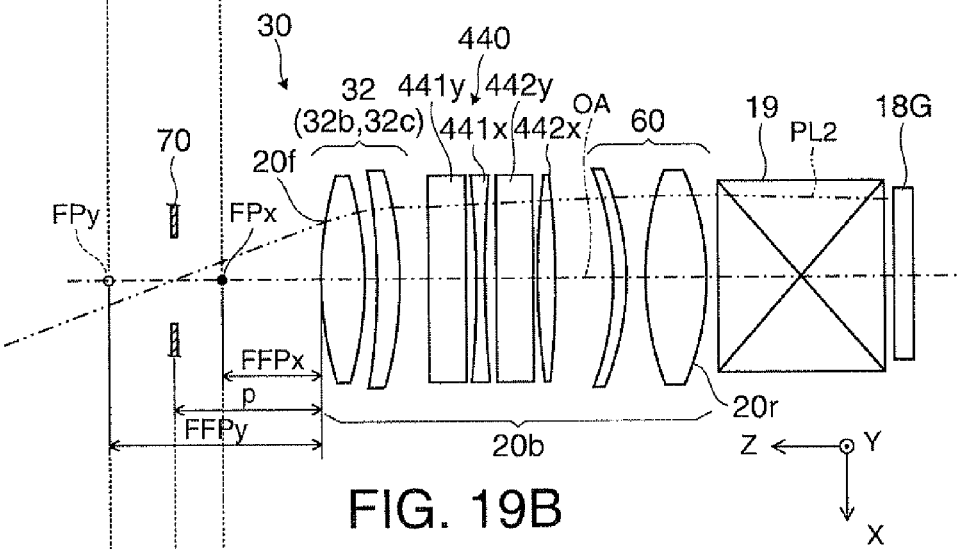
Figure 19C:
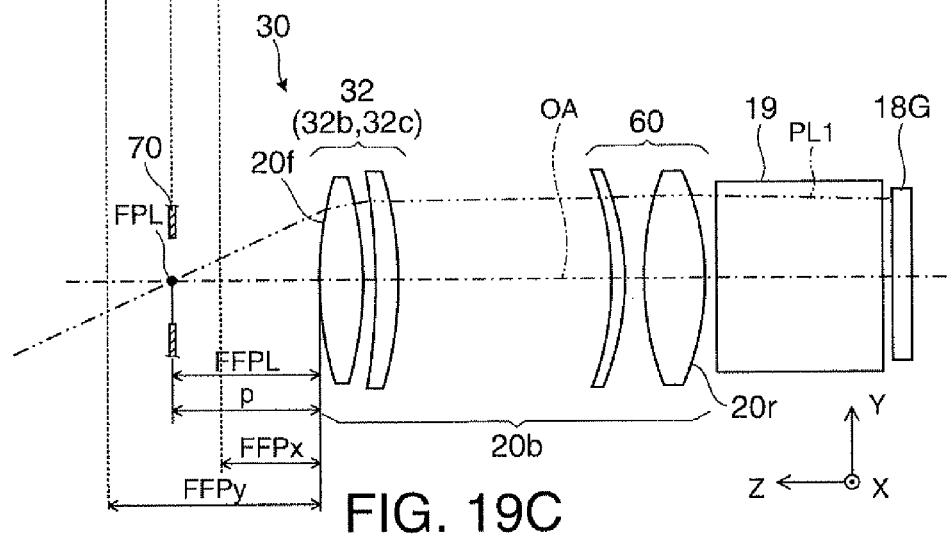
FIG. 19C is a lateral section view illustrating a focal position and a diaphragm position in the second operating state.

FIGS. 19A and 19B are views illustrating the arrangement of the focal position and diaphragm 70 of the optical projection system 420 in the first operating state in which a second group 440 is arranged on the optical path, and FIG. 19C is a view illustrating the arrangement of the focal position and diaphragm 70 of the optical projection system 420 in the second operating state in which a second group 440 is withdrawn from the optical path.

From among distances FFPx, FFPy, and FFPL shown in FIGS. 19A to 19C, the distance FFPL shown in FIG. 19C is as follows.

$$FFPL \approx p$$

Further, it is possible to reduce the directional bias of telecentricity in the second operating state.

Further, based on the adjustment performed by each of the optical device groups 441y, 442y, 441x, and 442x which are focal position adjustment units, the distances FFPx and FFPy shown in FIGS. 19A and 19B satisfy the following expression.

$$FFPx < FFPL < FFPy \quad (1)$$

Further, in this case, the distance p can be as follows.

$$FFPx < p < FFPy \quad (2)$$

Further, the distance p can be as follows.

$$FFPx < p \leq (FFPy + FFPx)/2 \quad (3)$$

Example 2

Figure 20:
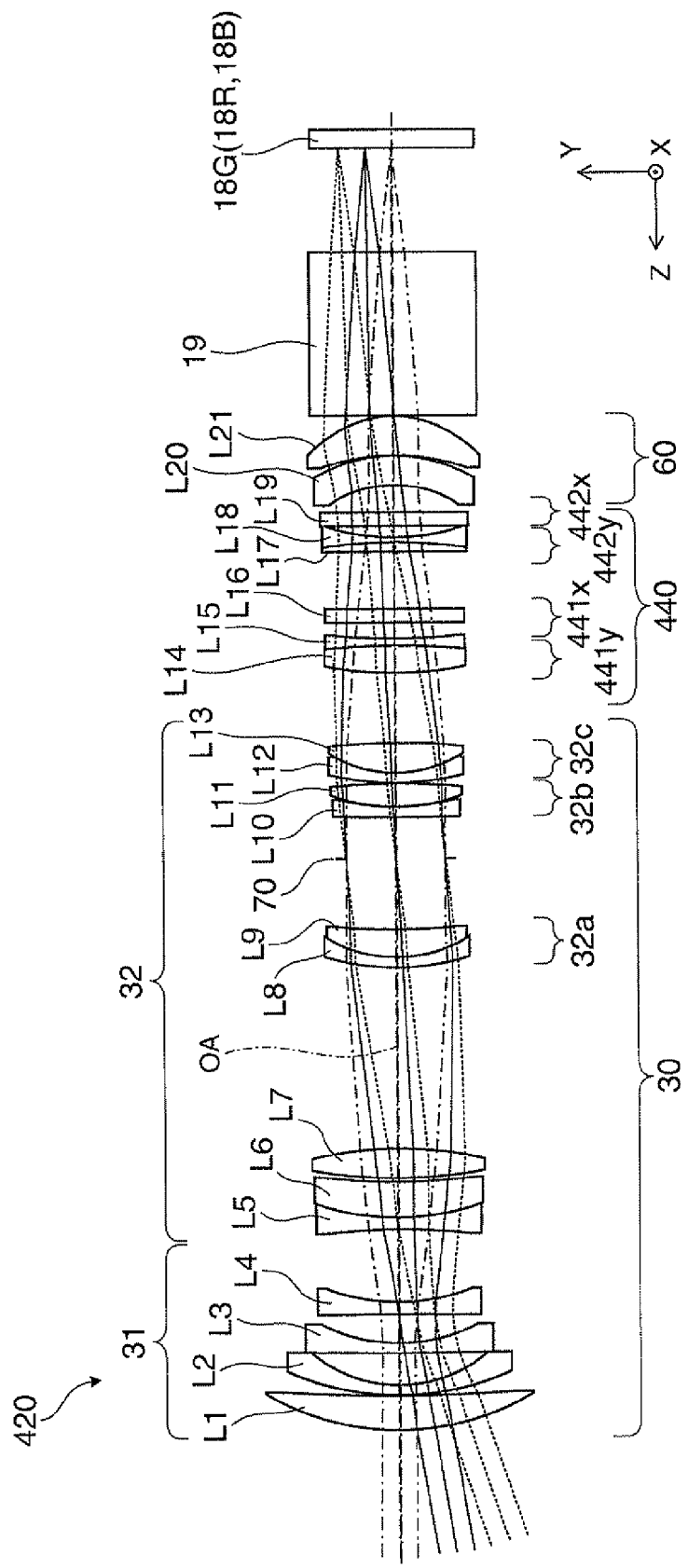
FIG. 20 is a view illustrating a longitudinal section in the first operating state of the optical system according to the Example 2 of the fourth embodiment.
Figure 21:
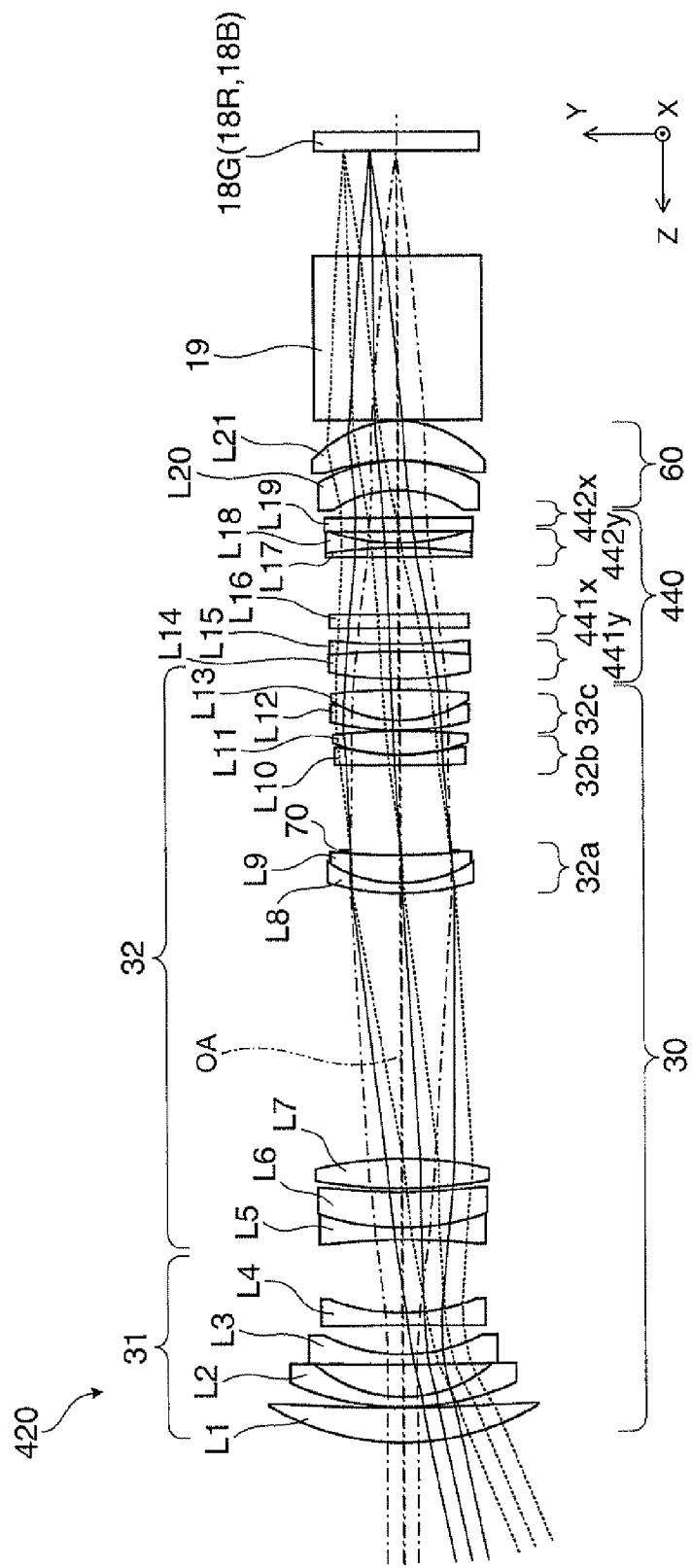
FIG. 21 is a view illustrating the longitudinal section in the case in which the optical system shown in FIG. 20 is a wide end.
Figure 22:
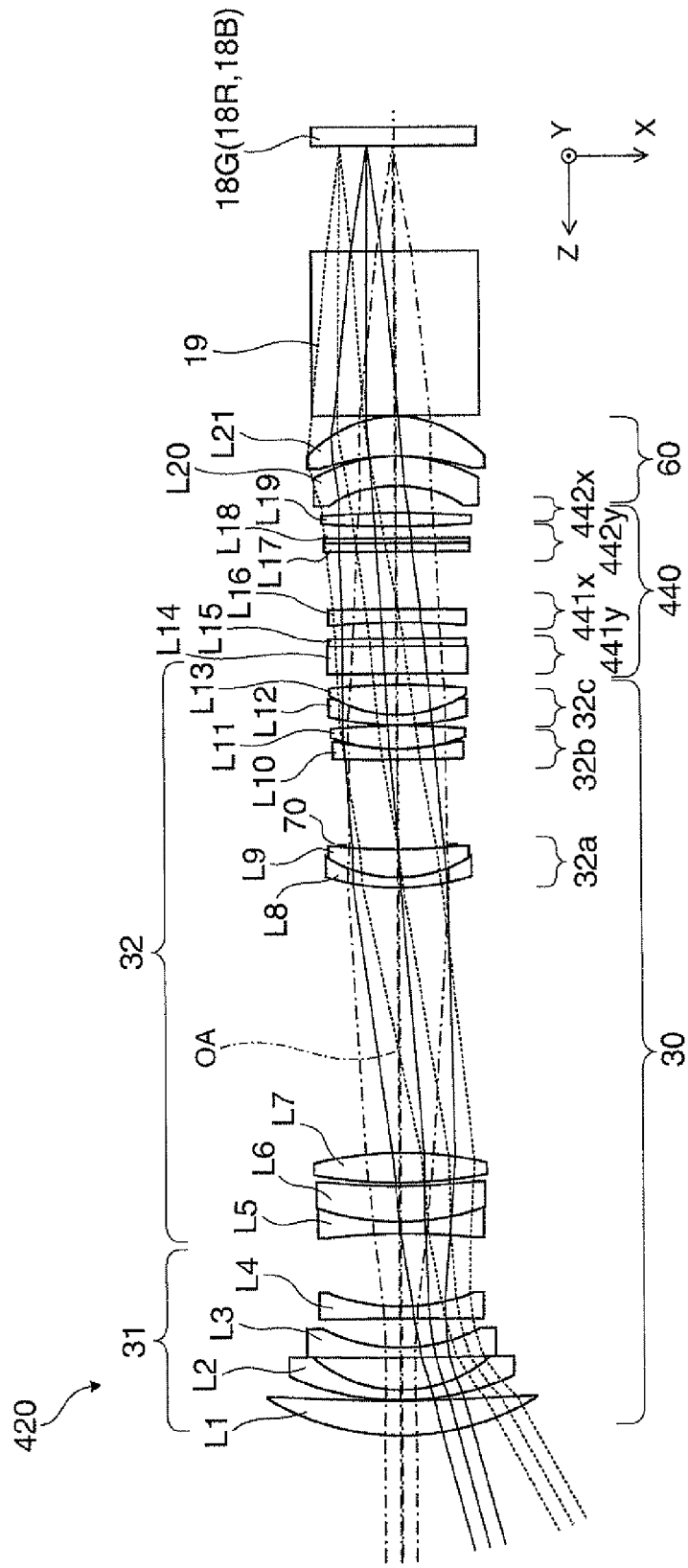
FIG. 22 is a view illustrating the lateral section in the case in which the optical system shown in FIG. 20 is a wide end.

FIGS. 20 to 22 are views illustrating the detailed embodiment 2 of the optical projection system 420 according to the fourth embodiment. FIGS. 20 to 22 illustrate the optical projection system 420 in the first operating state. FIG. 20 illustrates the "tele end" state in which a magnification power is comparatively low with respect to the longitudinal section, and FIG. 21 illustrates the "wide end" state in which a magnification power is comparatively high with respect to the longitudinal section. FIG. 22 illustrates the "wide end" state in which a magnification power is comparatively high with respect to the lateral section.

The optical projection system 420 includes lenses L1 to L21. From among those, a first group 30 includes the lenses L1 to L13, a second group 440 includes the lens L14 to L19, and a third group 60 includes the lens L20 and L21. The lenses L1 to L13 included in the first group 30 are lenses each having a rotationally symmetric spherical surface around the optical axis OA. In the second group 440, the cemented lenses L14 and L15 function as a first longitudinal direction optical device 441y, and the cemented lenses L17 and L18 function as a second longitudinal direction optical device 442y. Further, in the second group 440, the lens L16 functions as a first lateral direction optical device 441x, and the lens L19 functions as a second lateral direction optical device 442x. Therefore, first, the cemented lenses L14 and L15 correspond to a cylindrical lens which has positive power with respect to the longitudinal Y direction but does not have power with respect to the lateral X direction. Further, the cemented lenses L17 and 118 correspond to a cylindrical lens which has negative power with respect to the longitudinal Y direction but does not have power in the lateral X direction. In contrast, the lens 116 is a cylindrical lens which has negative power with respect to the lateral X direction but does not have power with respect to the longitudinal Y direction. Further, the lens L19 is a cylindrical lens which has positive power with respect to the lateral X direction but does not have power with respect to the longitudinal Y direction. The lens L20 included in the third group 60 is a negative meniscus lens, and the lens L21 is a positive meniscus lens. In addition, in the first group 30, the first lens group 32a including the lenses L8 and L9, the second lens group 32b including the lenses L10 and L11, and the third lens group 32c including the lenses L12 and L13 are displaced along the optical axis OA when projection magnification is changed, that is, when zooming is performed. In addition, the lens L20 is an aspherical surface lens. In particular, the configuration expressed in the above-described polynomial expression h is applied to an aspherical surface expression in the same manner. That is, the configuration is specified by applying an appropriate number to the following expression.

$$h = \frac{cy^2}{1 + \sqrt{1 - (1+k)c^2 y^2}} + A_2 y^2 + A_4 y^4 + A_6 y^6 + A_8 y^8 + A_{10} y^{10} + \ldots$$

Figure 23:
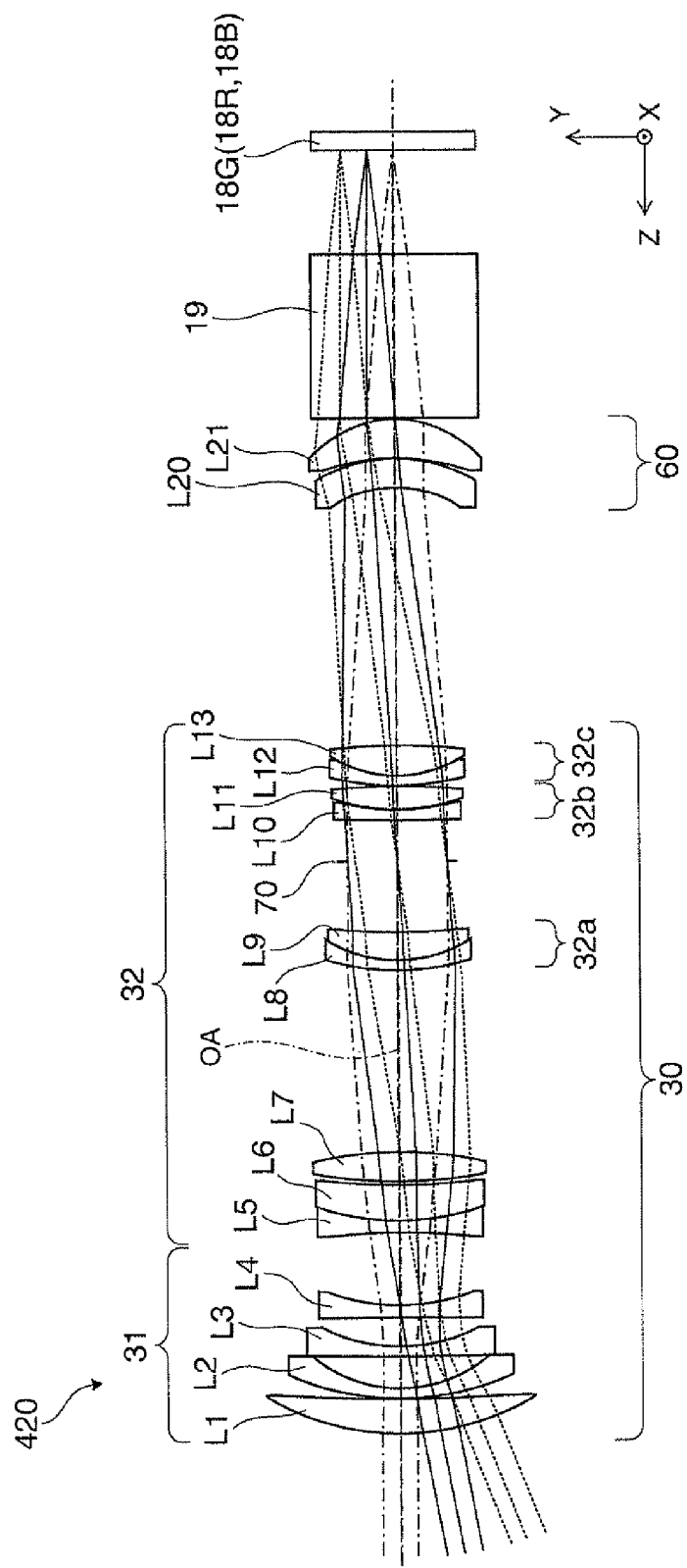
FIG. 23 is a view illustrating the longitudinal section in the second operating state of the optical system according to the Example 2 of the fourth embodiment.
Figure 24:
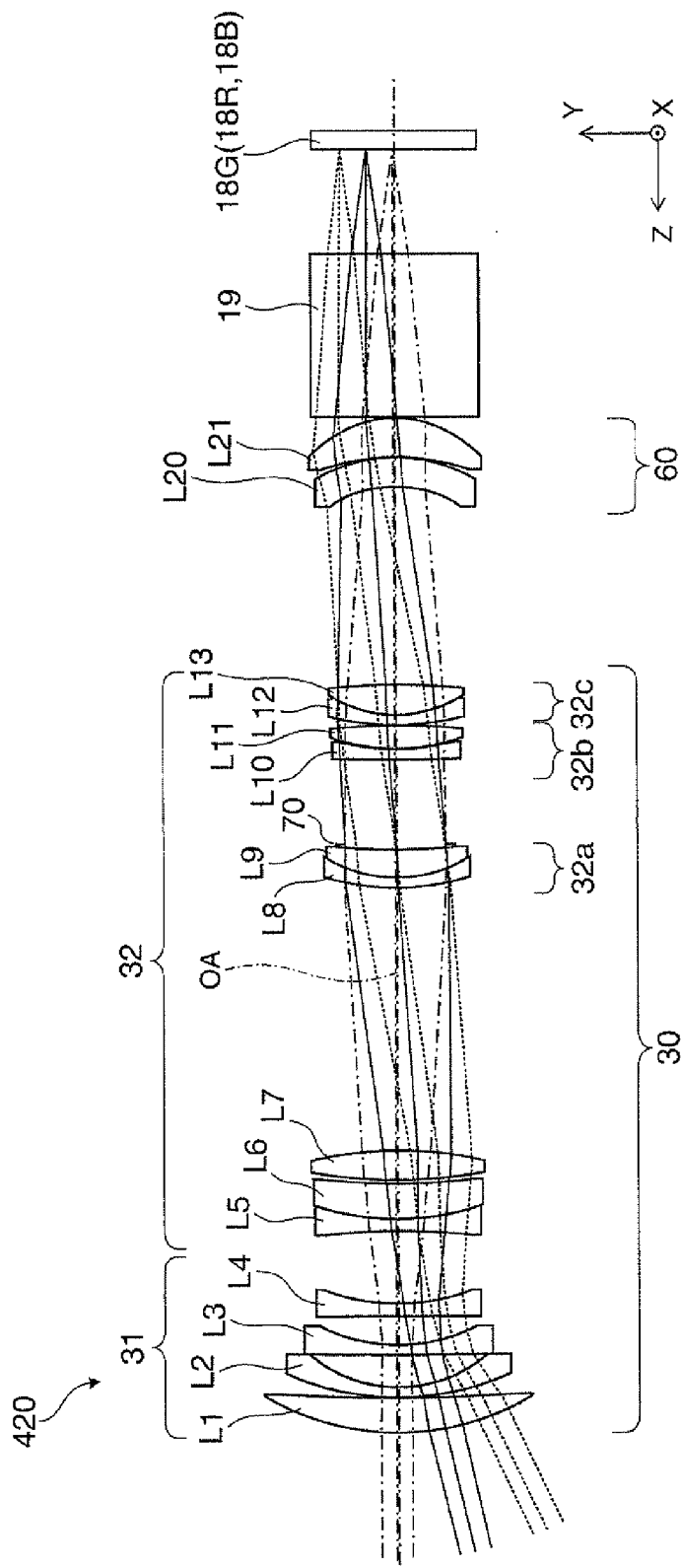
FIG. 24 is a view illustrating the longitudinal section in the case in which the optical system shown in FIG. 23 is a wide end.

Further, FIGS. 23 to 24 are views illustrating a detailed Example 2 of the optical projection system 20 of the first embodiment, and illustrate the optical projection system 420 in the second operating state. FIG. 23 illustrates the state of a "tele end", in which magnification power is comparatively low. FIG. 24 illustrates the state of a "wide end" in which magnification power is comparatively high.

In the following Table 5 and Table 6, the lens data or the like of the Example 2 is displayed. Table 5 relates to the optical projection system 420 in the first operating state, and Table 6 relates to the optical projection system 420 in the second operating state. In the top column of Table 5 and Table 6, "surface number" is a number assigned to the surface of each lens in order from an image surface side. Further, "Ry(R1)" and "Rx(R2)" indicate a Y curvature radius or an X curvature radius, and "D" indicates lens thickness or air space between one of the lens surfaces and the remaining surface. Further, "Nd" indicates the refractive index of the "d" line of a lens material, and "vd" indicates the Abbe number of the "d" line of a lens material. In addition, in the case of Example 1, all surfaces, other than the surface of lens L20, are spherical surfaces or cylindrical surfaces. Further, with respect to the lens L20, which is the aspherical surface lens, the values at the bottom of Table 5 and Table 6 are applied to the above-described polynomial expression h.

TABLE 5

| Anamorphic mode | | | | | |
|---|---|---|---|---|---|
| Surface No. | Ry | Rx | D | Nd | vd |
| 1 | 57.267 | 57.267 | 7.59 | 1.556973 | 49.9231 |
| 2 | 440.215 | 440.215 | 0.11 | | |
| 3 | 60.175 | 60.175 | 2.20 | 1.532237 | 73.5867 |
| 4 | 29.297 | 29.297 | 7.03 | | |
| 5 | 3674.199 | 3674.199 | 2.20 | 1.846660 | 23.7779 |
| 6 | 36.404 | 36.404 | 6.36 | | |
| 7 | −962.592 | −962.592 | 2.77 | 1.559709 | 68.9292 |
| 8 | 44.905 | 44.905 | 15.79 | | |
| 9 | −150.198 | −150.198 | 2.73 | 1.696797 | 55.5322 |
| 10 | 55.639 | 55.639 | 7.81 | 1.697542 | 30.3002 |
| 11 | 158.867 | 158.867 | 0.78 | | |
| 12 | 95.225 | 95.225 | 6.56 | 1.704003 | 29.8732 |
| 13 | −78.126 | −78.126 | Variable | | |
| 14 | 55.161 | 55.161 | 2.20 | 1.771084 | 43.1258 |
| 15 | 29.723 | 29.723 | 6.05 | 1.672393 | 32.1744 |
| 16 | 149.947 | 149.947 | Variable | | |
| Diaphragm | Infinite | Infinite | Variable | | |

TABLE 5-continued

| | | | | | |
|---|---|---|---|---|---|
| 18 | 708.448 | 708.448 | 2.20 | 1.808793 | 31.9168 |
| 19 | 52.013 | 52.013 | 0.10 | | |
| 20 | 44.209 | 44.209 | 5.10 | 1.500097 | 80.7289 |
| 21 | −185.810 | −185.810 | 0.10 | | |
| 22 | 60.364 | 60.364 | 2.20 | 1.808025 | 30.7098 |
| 23 | 28.456 | 28.456 | 6.63 | 1.544292 | 71.4093 |
| 24 | −165.744 | −165.744 | Variable | | |
| 25 | 78.923 | Infinite | 6.02 | 1.818568 | 43.7246 |
| 26 | −191.462 | Infinite | 1.60 | 1.727671 | 33.2772 |
| 27 | 130.217 | Infinite | 3.54 | | |
| 28 | Infinite | −226.530 | 3.00 | 1.837216 | 36.7065 |
| 29 | Infinite | −832.935 | 12.62 | | |
| 30 | −582.334 | Infinite | 1.89 | 1.840922 | 30.2152 |
| 31 | −146.804 | Infinite | 1.10 | 1.512311 | 69.3525 |
| 32 | 46.087 | Infinite | 2.50 | | |
| 33 | Infinite | 214.163 | 3.00 | 1.500532 | 80.6164 |
| 34 | Infinite | −227.871 | 6.00 | | |
| *35 | −36.161 | 6.500 | 6.50 | 1.491755 | 57.4711 |
| *36 | −38.427 | 0.100 | 0.10 | | |
| 37 | −51.840 | 8.598 | 8.60 | 1.517354 | 66.2196 |
| 38 | −26.090 | 0.186 | 0.19 | | |
| 39 | Infinite | Infinite | 36.00 | 1.516330 | 64.142 |
| 40 | Infinite | Infinite | | | |

| Aspherical Coefficient | | | | | | |
|---|---|---|---|---|---|---|
| Surface No. | K | A4 | A6 | A8 | A10 | A12 |
| 35 | 1.029 | −1.693E−05 | −4.793E−09 | −4.679E−11 | 1.763E−13 | −6.342E−16 |
| 36 | −5.499 | −1.634E−05 | 1.691E−08 | −8.367E−12 | −5.980E−16 | 3.529E−19 |

*Aspherical surface
*25 to 27, 30 to 32 surfaces are cylindrical lenses

TABLE 6

| Normal mode | | | | |
|---|---|---|---|---|
| Surface No. | R | D | Nd | νd |
| 1 | 57.267 | 7.59 | 1.556973 | 49.9231 |
| 2 | 440.215 | 0.11 | | |
| 3 | 60.175 | 2.20 | 1.532237 | 73.5867 |
| 4 | 29.297 | 7.03 | | |
| 5 | 3674.199 | 2.20 | 1.846660 | 23.7779 |
| 6 | 36.404 | 6.36 | | |
| 7 | −962.592 | 2.77 | 1.559709 | 68.9292 |
| 8 | 44.905 | 15.79 | | |
| 9 | −150.198 | 2.73 | 1.696797 | 55.5322 |
| 10 | 55.639 | 7.81 | 1.697542 | 30.3002 |
| 11 | 158.867 | 0.78 | | |
| 12 | 95.225 | 6.56 | 1.704003 | 29.8732 |
| 13 | −78.126 | Variable | | |
| 14 | 55.161 | 2.20 | 1.771084 | 43.1258 |
| 15 | 29.723 | 6.05 | 1.672393 | 32.1744 |
| 16 | 149.947 | Variable | | |
| Diaphragm | Infinite | Variable | | |
| 18 | 708.448 | 2.20 | 1.808793 | 31.9168 |
| 19 | 52.013 | 0.10 | | |
| 20 | 44.209 | 5.10 | 1.500097 | 80.7289 |
| 21 | −185.810 | 0.10 | | |
| 22 | 60.364 | 2.20 | 1.808025 | 30.7098 |
| 23 | 28.456 | 6.63 | 1.544292 | 71.4093 |
| 24 | −165.744 | Variable | | |
| *25 | −36.161 | 6.50 | 1.491755 | 57.4711 |
| *26 | −38.427 | 0.10 | | |
| 27 | −51.840 | 8.60 | 1.517354 | 66.2196 |
| 28 | −26.090 | 0.19 | | |
| 29 | Infinite | 36.00 | 1.516330 | 64.142 |
| 30 | Infinite | | | |

| Aspherical Coefficient | | | | | | |
|---|---|---|---|---|---|---|
| Surface No. | K | A4 | A6 | A8 | A10 | A12 |
| 25 | 1.029 | −1.693E−05 | −4.793E−09 | −4.679E−11 | 1.763E−13 | −6.342E−16 |
| 26 | −5.499 | −1.634E−05 | 1.691E−08 | −8.367E−12 | −5.980E−16 | 3.529E−19 |

*Aspherical surface

As shown in FIGS. 20 to 24, because each of the lens groups 32a, 32b, and 32c included in the second lens unit 32, and the diaphragm 70 are separately moved along the direction of the optical axis OA, the zooming operation is separately performed in the first and second operating states.

Figure 25A:
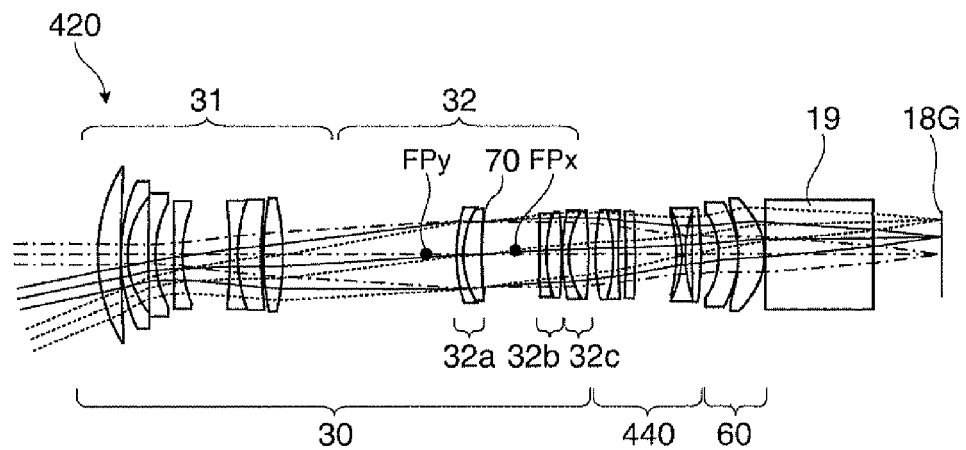
FIGS. 25A to 25C are views illustrating the zooming operation of the optical system in the first operating state of the Example 2.
Figure 25B:
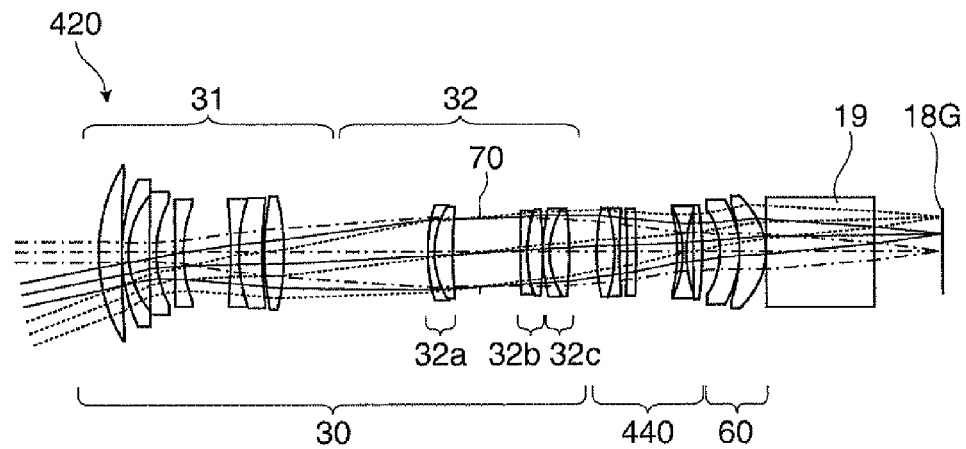
Figure 25C:
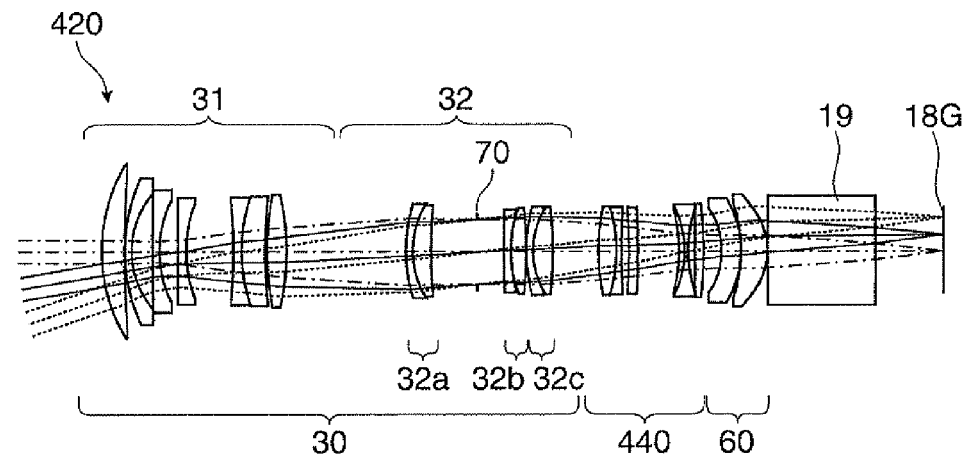
Figure 26A:
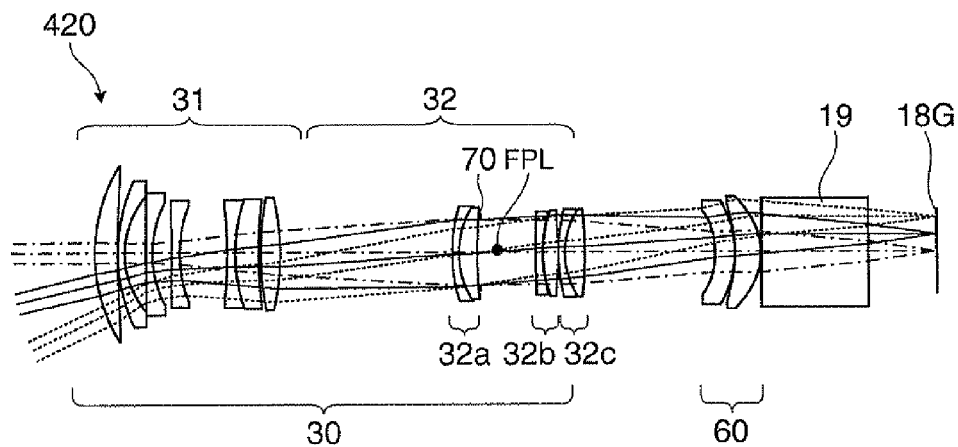
FIGS. 26A to 26C are views illustrating the zooming operation of the optical system in the second operating state of the Example 2.
Figure 26B:
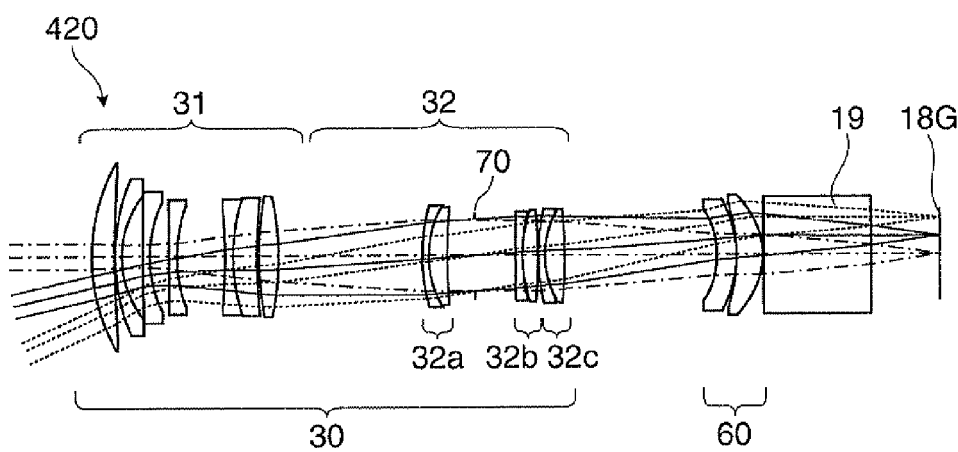
Figure 26C:
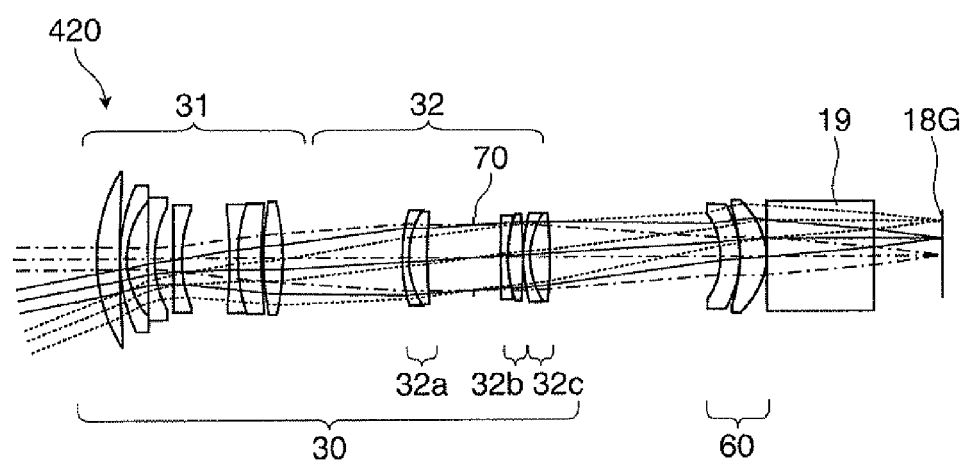

FIGS. 25A to 25C illustrate the zooming operation in the first operating state, and FIGS. 26A to 26C illustrate the zooming operation in the second operating state. FIG. 25A illustrates the state of FIG. 21 of the first operating state, and the case of a "wide end" in which a magnification power is large. Further, FIG. 25B illustrates the case of an "intermediate" state, and FIG. 25C illustrates the state of FIG. 20 and illustrates the case of a "tele end" in which a magnification power is small. In the same manner, FIG. 26A illustrates the case of a "wide end" in the second operating state, FIG. 26B illustrates the case of the "intermediate" state, and FIG. 26C illustrates the case of "tele end". As shown in the drawings, in association with the zooming operation, the position of the diaphragm 70 is changed. However, the diaphragm 70 is located between the focus FPy of the longitudinal section and the focus FPx of the lateral section, and arranged closer to the subject side, that is, a focus FPx side, than the intermediate position between the focus FPy of the longitudinal section and the focus FPx of the lateral section.

In the top columns of the below Table 7 and Table 8, the positions of each lens groups 32a, 32b, and 32c of the second lens unit 32 and the diaphragm 70, obtained when the zooming operations shown in FIGS. 25A to 25C and FIGS. 26A to 26C are performed, are displayed. In particular, the image side surface of the lens L8 of the lens group 32a is a thirteenth surface, the image side surface of the lens L10 of the lens group 32b is a sixteenth surface, and the image side surface of the lens L12 of the lens group 32c is a twenty-fourth surface.

TABLE 7

| Surface No | Wide | Middle | Tele |
|---|---|---|---|
| Variable portion | | | |
| 13 | 57.847 | 48.272 | 39.693 |
| 16 | 1.000 | 8.685 | 15.547 |
| Diaphragm | 18.524 | 14.136 | 9.130 |
| 24 | 2.408 | 8.685 | 15.408 |
| Focal distance | | | |
| fx | 21.300 | 23.400 | 25.600 |
| fy | 28.160 | 30.931 | 33.836 |
| Fno | | | |
| Fx | 3.07 | 3.17 | 3.28 |
| Fy | 4.06 | 4.19 | 4.33 |

TABLE 8

| Surface No. | Wide | Middle | Tele |
|---|---|---|---|
| Variable portion | | | |
| 13 | 57.847 | 48.272 | 39.693 |
| 16 | 1.000 | 8.685 | 15.547 |
| Diaphragm | 18.524 | 14.136 | 9.130 |
| 24 | 43.678 | 49.955 | 56.678 |
| Focal distance | | | |
| f | 24.489 | 26.903 | 29.432 |
| Fno | | | |
| F | 3.43 | 3.54 | 3.66 |

In addition, the intermediate columns of Table 7 and Table 8 indicate the focal distances between the x direction and Y direction of the optical projection system 420 when the zooming operation is performed. Further, the bottom columns of Table 7 and Table 8 indicate the brightness (F value) in the X direction and Y direction of the optical projection system 420 when the zooming operation is performed.

In addition, in the above-description according to the fourth embodiment, the reduction in the longitudinal direction and the expansion in the lateral direction are performed together using the optical device groups 441y, 442y, 441x, and 442x. However, the first and second longitudinal direction optical device groups 441y and 442y may function as the first and second optical device groups which principally function as the second group 440, and may perform conversion of an aspect ratio by reducing an image in the longitudinal direction. Further, the first and second lateral direction optical device groups 441x and 442x may principally function as the second group 440, and may perform conversion of an aspect ratio by expanding the image in the lateral direction.

Fifth Embodiment

Hereinafter, an optical projection system or the like according to a fifth embodiment will be described. In addition, the fifth embodiment is the modification example of the optical projection system or the like according to the first embodiment, and portions and items which are not especially described are the same as the case of the first embodiment.

FIGS. 27A and 27B are views illustrating an optical projection system 520 according to the fifth embodiment. The second group 540 of the optical projection system 520 includes, in order from the screen SC, a first optical device group 541 which has positive power with respect to the section of longitudinal direction (Y direction) and negative power with respect to the section of the lateral direction (X direction), and a second optical device group 542 which has negative power with respect to the section of the longitudinal direction (Y direction) and positive power with respect to the section of the lateral direction (X direction). That is, the first and second optical device groups 541 and 542 are free-form surface lenses which have power with which positive and negative powers are combined in the longitudinal direction and the lateral direction. Further, the first optical device group 541 and the second optical device group 542 have positive power and negative power which are changed to each other with respect to the longitudinal direction and the lateral direction, so that the whole second group 540 has the combination of lenses whose power is changed to positive power or negative power with respect to the longitudinal direction and the lateral direction.

In this case, for example, an image formed on the liquid crystal panel 18G (18R, 18B) can be projected on a screen SC at an aspect ratio in which the image is reduced in the longitudinal direction and enlarged in the lateral direction. That is, the first and second optical device groups 541 and 542 of the second group 540 have different power in the longitudinal direction and the lateral direction with respect to the longitudinal section shown in FIG. 27B, thereby performing conversion of the aspect ratio of the image. That is, the first and second optical device groups 541 and 542 principally function as the second group 440. Further, first optical device group 541 and the second optical device group 542 equally move a focal position related to each section in the first operating state in cooperation with each other, thereby functioning as the focal position adjustment units.

Figure 28A:
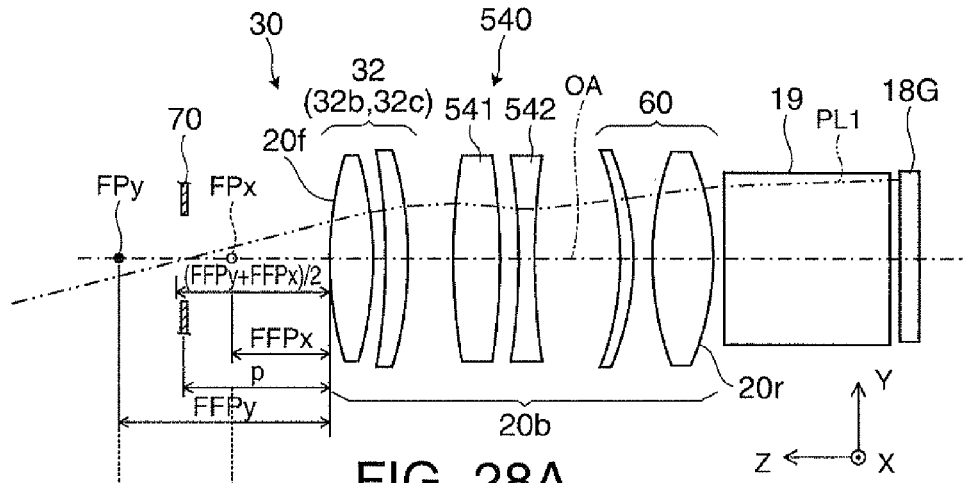
FIGS. 28A and 28B are longitudinal section and lateral section views illustrating a focal position and a diaphragm position in the first operating state.
Figure 28B:
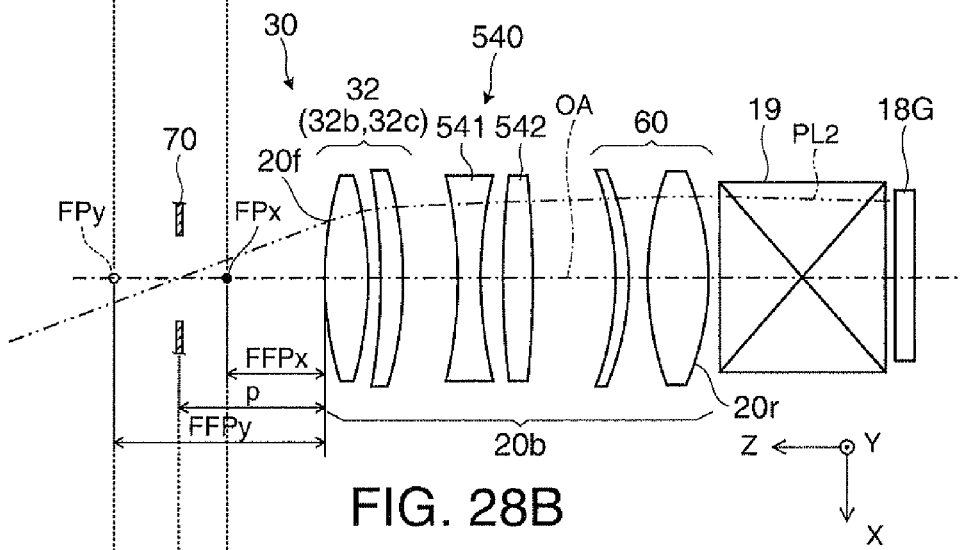
Figure 28C:
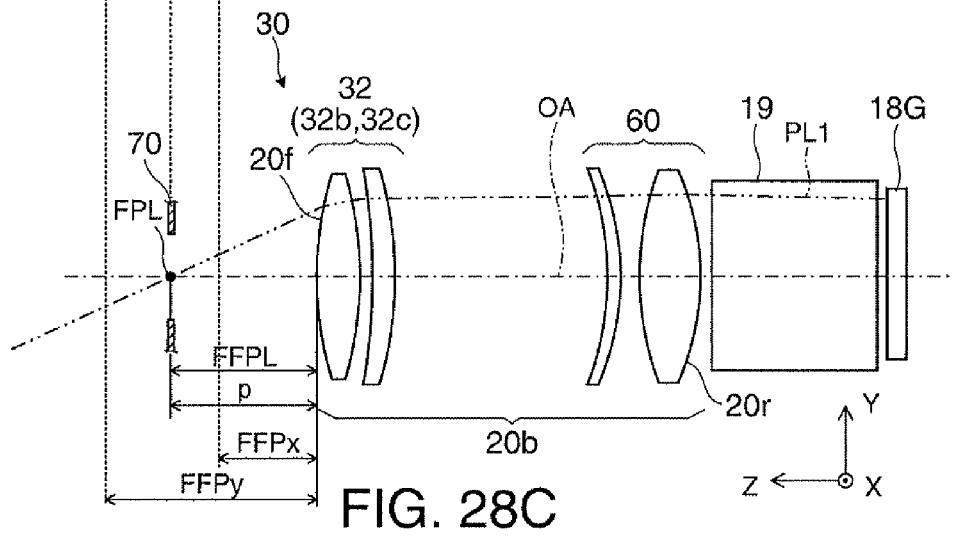
FIG. 28C is a lateral section view illustrating a focal position and a diaphragm position in the second operating state.

FIGS. 28A and 28B are views illustrating the arrangement of the focal position and diaphragm 70 of the optical projection system 520 in the first operating state in which a second group 540 is arranged on the optical path, and FIG. 28C is a view illustrating the arrangement of the focal position and diaphragm 70 of the optical projection system 520 in the second operating state in which a second group 540 is withdrawn from the optical path.

From among distances FFPx, FFPy, and FFPL shown in FIGS. 28A to 28C, the distance FFPL shown in FIG. 28C is as follows.

$$FFPL \approx p$$

Further, it is possible to reduce the directional bias of telecentricity in the second operating state. Further, based on the adjustment performed by each of the optical device groups 541 and 542 which are focal position adjustment units, the distances FFPx and FFPy shown in FIGS. 28A and 28B satisfy the following expression.

$$FFPx < FFPL < FFPy \quad (1)$$

Further, in this case, the distance p can be as follows.

$$FFPx < p < FFPy \quad (2)$$

Further, the distance p can be as follows.

$$FFPx < p \leq (FFPy + FFPx)/2 \quad (3)$$

Example 3

Figure 29:
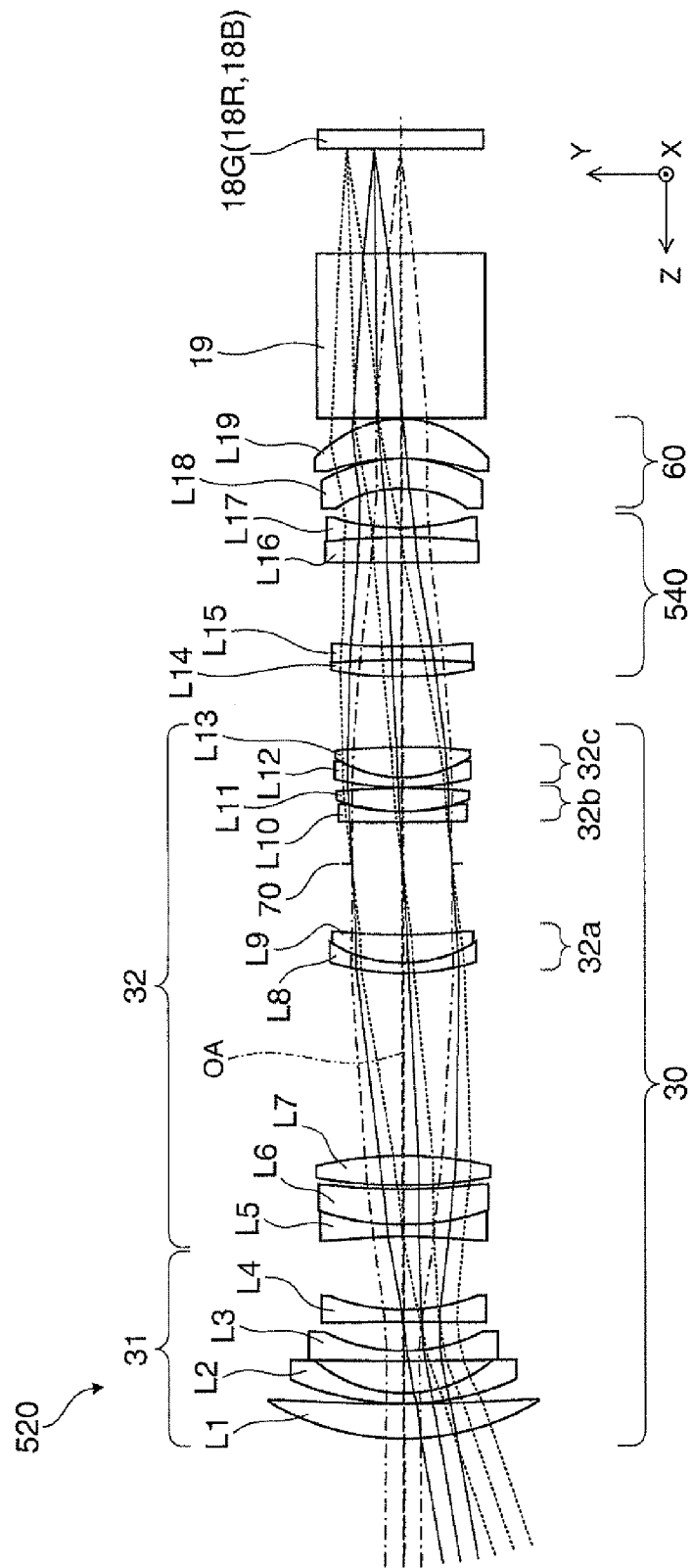
FIG. 29 is a view illustrating the longitudinal section in the first operating state of the optical system according to an Example 3 of the fifth embodiment.
Figure 30:
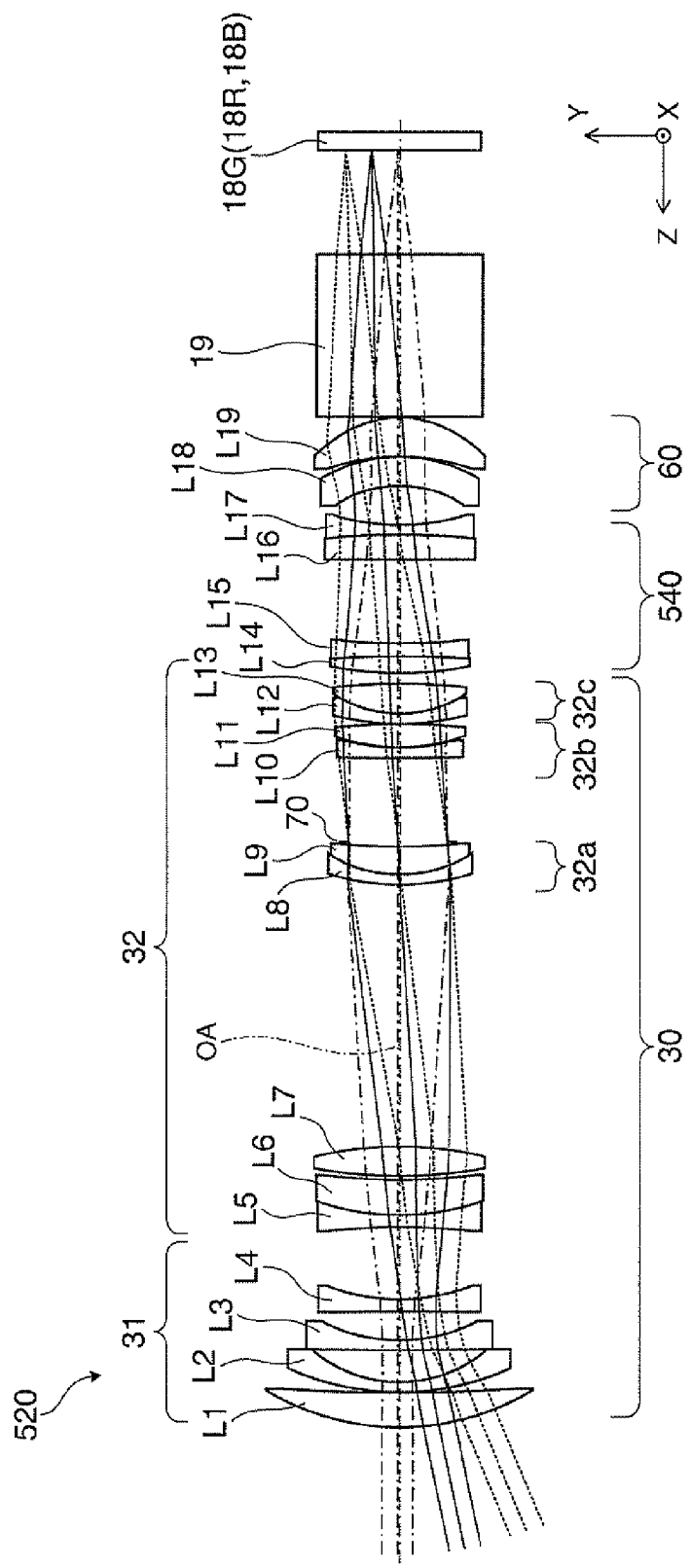
FIG. 30 is a view illustrating the longitudinal section in the case in which the optical system shown in FIG. 29 is a wide end.
Figure 31:
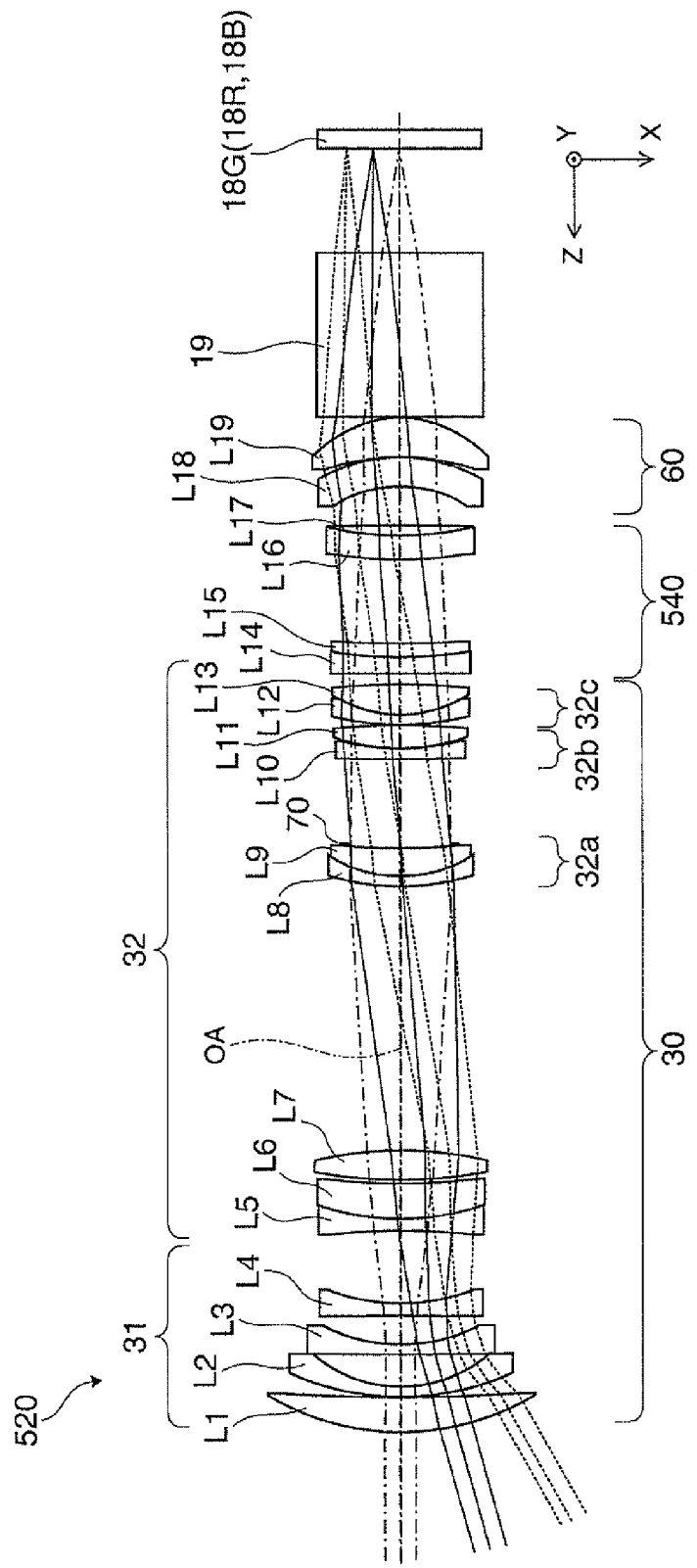
FIG. 31 is a view illustrating the lateral section in the case in which the optical system shown in FIG. 29 is a wide end.

FIGS. 29 to 31 are views illustrating the detailed embodiment 3 of the optical projection system 520 according to the fifth embodiment. FIGS. 29 to 31 illustrate the optical projection system 520 in the first operating state. FIG. 29 illustrates the "tele end" state in which a magnification power is comparatively low with respect to the longitudinal section, and FIG. 30 illustrates the "wide end" state in which a magnification power is comparatively high with respect to the longitudinal section. FIG. 31 illustrates the "wide end" state in which a magnification power is comparatively high with respect to the lateral section.

The optical projection system 520 includes lenses L1 to L19. From among those, a first group 30 includes the lenses L1 to L13, a second group 540 includes the lens L14 to L17, and a third group 60 includes the lens L18 and L19. The lenses L1 to L13 included in the first group 30 are lenses each having a rotationally symmetric spherical surface around the optical axis OA. In the second group 540, the cemented lenses L14 and L15 function as a first optical device 541, and the cemented lenses L16 and L17 function as a second optical device 542. Therefore, first, the cemented lenses L14 and L15 correspond to a free-form surface lens which has positive power with respect to the longitudinal Y direction and has negative power with respect to the lateral X direction, as a whole. Further, the cemented lenses L16 and L17 correspond to a free-form surface lens which has negative power with respect to the longitudinal Y direction and has positive power with respect to the lateral X direction as a whole. The lens L18 included in the third group 60 is a negative meniscus lens, and the lens L19 is a positive meniscus lens. In addition, in the first group 30, the first lens group 32a including the lenses L8 and L9, the second lens group 32b including the lenses L10 and L11, and the third lens group 32c including the lenses L12 and L13 are displaced along the optical axis OA when projection magnification is changed, that is, when zooming is performed. In addition, the lens L18 is an aspherical surface lens. In particular, the configuration expressed in the above-described polynomial expression h is applied to an aspherical surface expression in the same manner. That is, the configuration is specified by applying an appropriate number to the following expression.

$$h = \frac{cy^2}{1 + \sqrt{1 - (1+k)c^2 y^2}} + A_2 y^2 + A_4 y^4 + A_6 y^6 + A_8 y^8 + A_{10} y^{10} + \ldots$$

Figure 32:
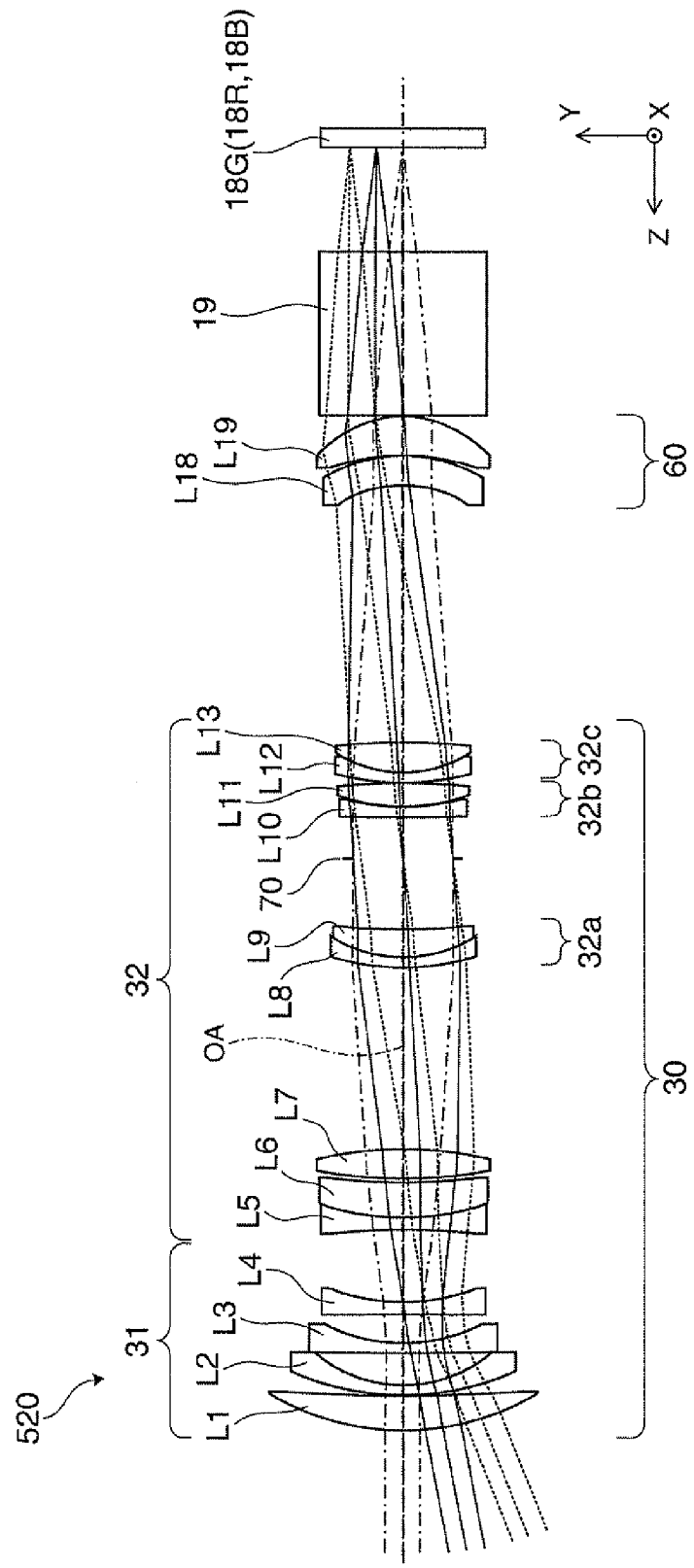
FIG. 32 is a view illustrating the longitudinal section in the second operating state of the optical system according to the Example 3 of the fifth embodiment.
Figure 33:
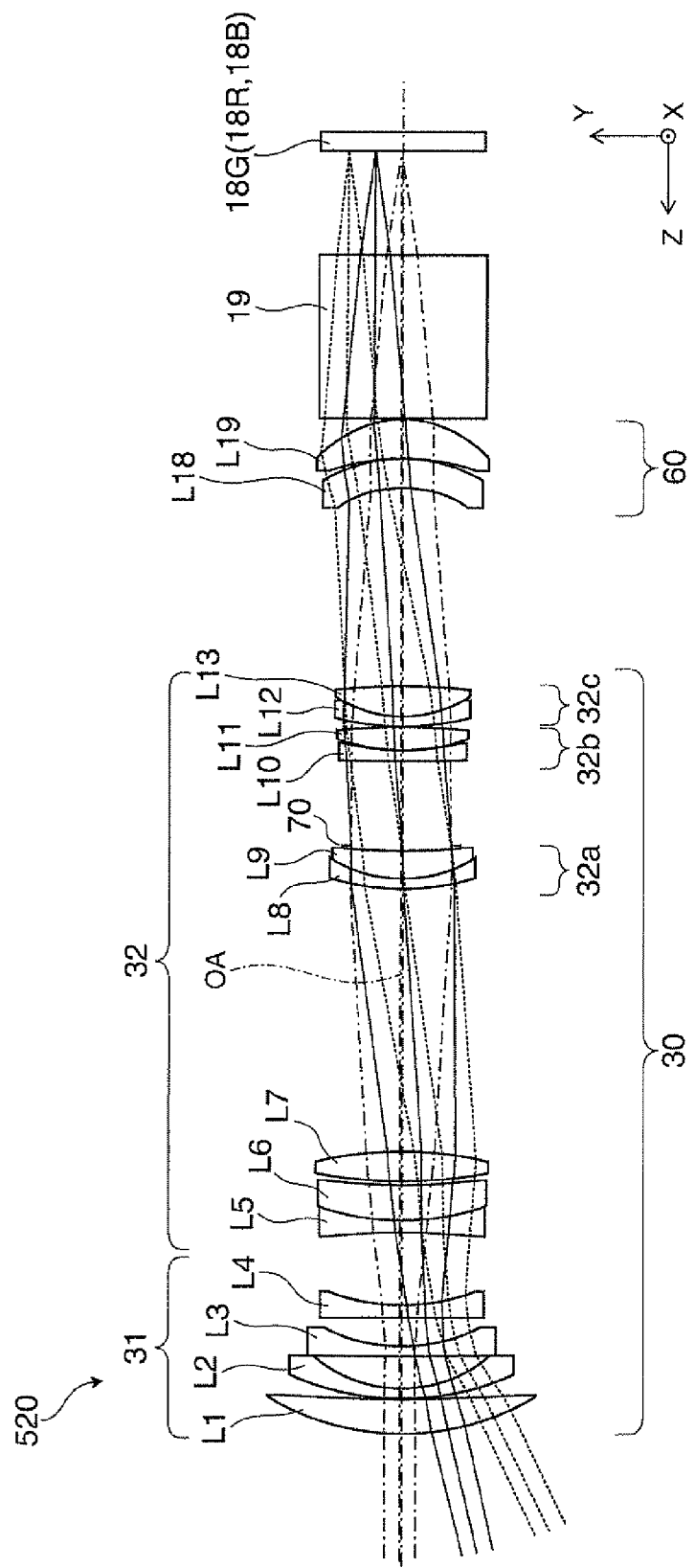
FIG. 33 is a view illustrating the longitudinal section in the case in which the optical system shown in FIG. 32 is a wide end.

Further, FIGS. 32 to 33 are views illustrating a detailed Example 3 of the optical projection system 20 of the first embodiment, and illustrate the optical projection system 520 in the second operating state. FIG. 32 illustrates the state of a "tele end", in which a magnification power is comparatively low. FIG. 33 illustrates the state of a "wide end" in which a magnification power is comparatively high.

In the following Table 9 and Table 10, the lens data or the like of the Example 3 is displayed. Table 9 relates to the optical projection system 520 in the first operating state, and Table 10 relates to the optical projection system 520 in the second operating state. In the top column of Table 9 and Table 10, "surface number" is a number assigned to the surface of each lens respectively from an image surface side. Further, "Ry(R1)" and "Rx(R2)" indicate a Y curvature radius or an X curvature radius, and "D" indicates lens thickness or air space between one of the lens surfaces and the remaining surface. Further, "Nd" indicates the refractive index of the "d" line of a lens material, and "vd" indicates the Abbe number of the "d" line of a lens material. In addition, in the case of Example 1, all surfaces, other than the surface of lens L18, are spherical surfaces or cylindrical surfaces. Further, with respect to the lens L18, which is the aspherical surface lens, the values at the bottom of Table 1 and Table 2 are applied to the above-described polynomial expression h.

TABLE 9

| | Anamorphic mode | | | | |
|---|---|---|---|---|---|
| Surface No. | Ry | Rx | D | Nd | vd |
| 1 | 57.267 | 57.267 | 7.59 | 1.556973 | 49.9231 |
| 2 | 440.215 | 440.215 | 0.11 | | |
| 3 | 60.175 | 60.175 | 2.20 | 1.532237 | 73.5867 |
| 4 | 29.297 | 29.297 | 7.03 | | |
| 5 | 3674.199 | 3674.199 | 2.20 | 1.846660 | 23.7779 |
| 6 | 36.404 | 36.404 | 6.36 | | |
| 7 | −962.592 | −962.592 | 2.77 | 1.559709 | 68.9292 |
| 8 | 44.905 | 44.905 | 15.79 | | |
| 9 | −150.198 | −150.198 | 2.73 | 1.696797 | 55.5322 |
| 10 | 55.639 | 55.639 | 7.81 | 1.697542 | 30.3002 |
| 11 | 158.867 | 158.867 | 0.78 | | |
| 12 | 95.225 | 95.225 | 6.56 | 1.704003 | 29.8732 |

TABLE 9-continued

| | | | | | |
|---|---|---|---|---|---|
| 13 | −78.126 | −78.126 | Variable | | |
| 14 | 55.161 | 55.161 | 2.20 | 1.771084 | 43.1258 |
| 15 | 29.723 | 29.723 | 6.05 | 1.672393 | 32.1744 |
| 16 | 149.947 | 149.947 | Variable | | |
| Diaphragm | Infinite | Infinite | Variable | | |
| 18 | 708.448 | 708.448 | 2.20 | 1.808793 | 31.9168 |
| 19 | 52.013 | 52.013 | 0.10 | | |
| 20 | 44.209 | 44.209 | 5.10 | 1.500097 | 80.7289 |
| 21 | −185.810 | −185.810 | 0.10 | | |
| 22 | 60.364 | 60.364 | 2.20 | 1.808025 | 30.7098 |
| 23 | 28.456 | 28.456 | 6.63 | 1.544292 | 71.4093 |
| 24 | −165.744 | −165.744 | Variable | | |
| 25 | 78.923 | 704.361 | 3.64 | 1.818568 | 43.7246 |
| 26 | −191.462 | 93.889 | 2.96 | 1.727671 | 33.2772 |
| 27 | 130.217 | 160.951 | 18.58 | | |
| 28 | −582.334 | 85.944 | 5.34 | 1.840922 | 30.2152 |
| 29 | −146.804 | 71.202 | 2.20 | 1.512311 | 69.3525 |
| 30 | 46.087 | −733.342 | 8.55 | | |
| *31 | −36.161 | 6.500 | 6.50 | 1.491755 | 57.4711 |
| *32 | −38.427 | 0.100 | 0.10 | | |
| 33 | −51.840 | 8.598 | 8.60 | 1.517354 | 66.2196 |
| 34 | −26.090 | 0.186 | 0.19 | | |
| 35 | Infinite | Infinite | 36.00 | 1.516330 | 64.142 |
| 36 | Infinite | Infinite | | | |

| Aspherical Coefficient | | | | | | |
|---|---|---|---|---|---|---|
| Surface No. | K | A4 | A6 | A8 | A10 | A12 |
| 31 | 1.029 | −1.693E−05 | −4.793E−09 | −4.679E−11 | 1.763E−13 | −6.342E−16 |
| 32 | −5.499 | −1.634E−05 | 1.691E−08 | −8.367E−12 | −5.980E−16 | 3.529E−19 |

*Aspherical surface
*25 to 30 surfaces are toric lenses

TABLE 10

| Normal mode | | | | |
|---|---|---|---|---|
| Surface No. | R | D | Nd | νd |
| 1 | 57.267 | 7.59 | 1.556973 | 49.9231 |
| 2 | 440.215 | 0.11 | | |
| 3 | 60.175 | 2.20 | 1.532237 | 73.5867 |
| 4 | 29.297 | 7.03 | | |
| 5 | 3674.199 | 2.20 | 1.846660 | 23.7779 |
| 6 | 36.404 | 6.36 | | |
| 7 | −962.592 | 2.77 | 1.559709 | 68.9292 |
| 8 | 44.905 | 15.79 | | |
| 9 | −150.198 | 2.73 | 1.696797 | 55.5322 |
| 10 | 55.639 | 7.81 | 1.697542 | 30.3002 |
| 11 | 158.867 | 0.78 | | |
| 12 | 95.225 | 6.56 | 1.704003 | 29.8732 |
| 13 | −78.126 | Variable | | |
| 14 | 55.161 | 2.20 | 1.771084 | 43.1258 |
| 15 | 29.723 | 6.05 | 1.672393 | 32.1744 |
| 16 | 149.947 | Variable | | |
| Diaphragm | Infinite | Variable | | |
| 18 | 708.448 | 2.20 | 1.808793 | 31.9168 |
| 19 | 52.013 | 0.10 | | |
| 20 | 44.209 | 5.10 | 1.500097 | 80.7289 |
| 21 | −185.810 | 0.10 | | |
| 22 | 60.364 | 2.20 | 1.808025 | 30.7098 |
| 23 | 28.456 | 6.63 | 1.544292 | 71.4093 |
| 24 | −165.744 | Variable | | |
| *25 | −36.161 | 6.50 | 1.491755 | 57.4711 |
| *26 | −38.427 | 0.10 | | |
| 27 | −51.840 | 8.60 | 1.517354 | 66.2196 |
| 30 | Infinite | | | |

| Aspherical Coefficient | | | | | | |
|---|---|---|---|---|---|---|
| Surface No. | K | A4 | A6 | A8 | A10 | A12 |
| 25 | 1.029 | −1.693E−05 | −4.793E−09 | −4.679E−11 | 1.763E−13 | −6.342E−16 |
| 26 | −5.499 | −1.634E−05 | 1.691E−08 | −8.367E−12 | −5.980E−16 | 3.529E−19 |

*Aspherical surface

As shown in FIGS. 29 to 33, because each of the lens groups 32a, 32b, and 32c included in the second lens unit 32, and the diaphragm 70 are separately moved along the direction of the optical axis OA, the zooming operation is separately performed in the first and second operating states.

Figure 34A:
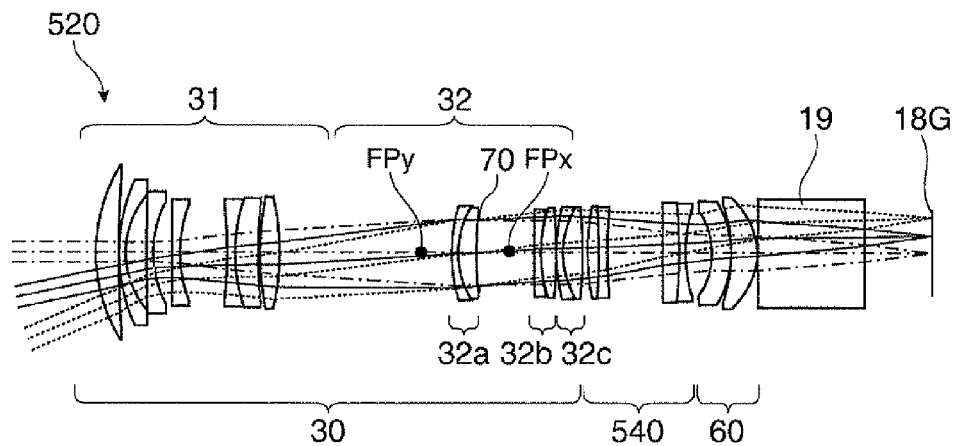
FIGS. 34A to 34C are views illustrating the zooming operation of the optical system in the first operating state of the Example 3.
Figure 34B:
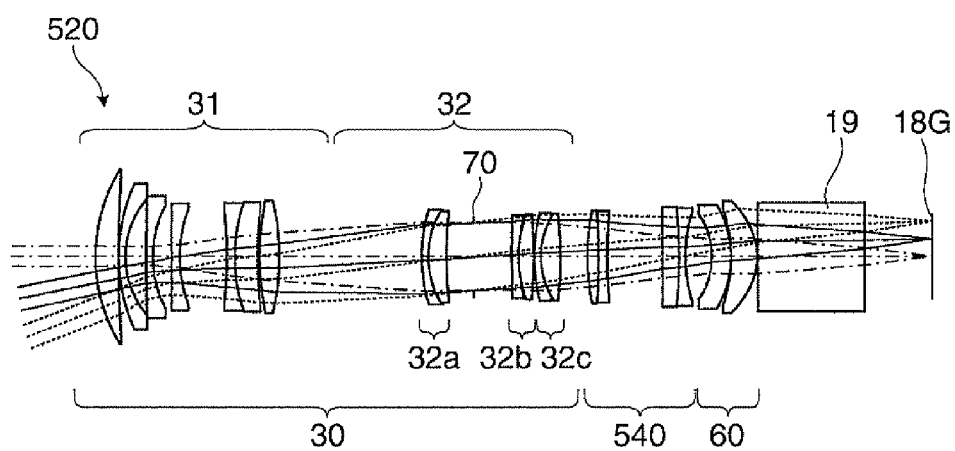
Figure 34C:
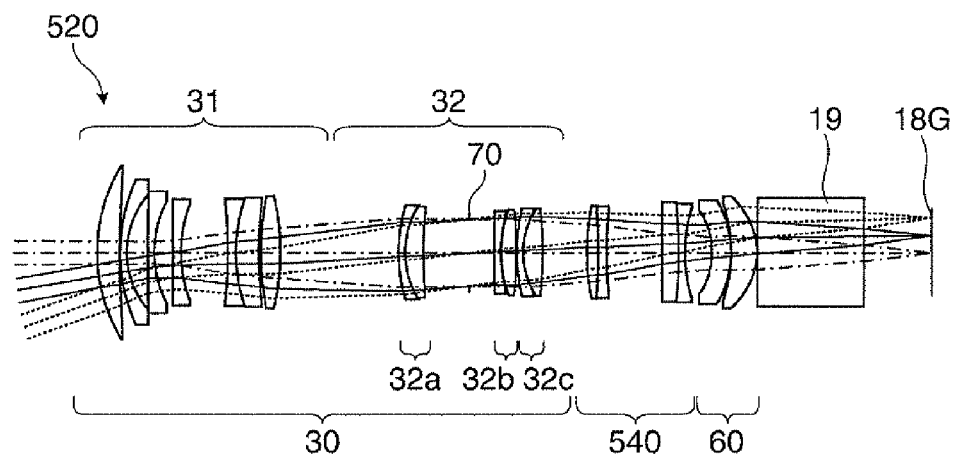
Figure 35A:
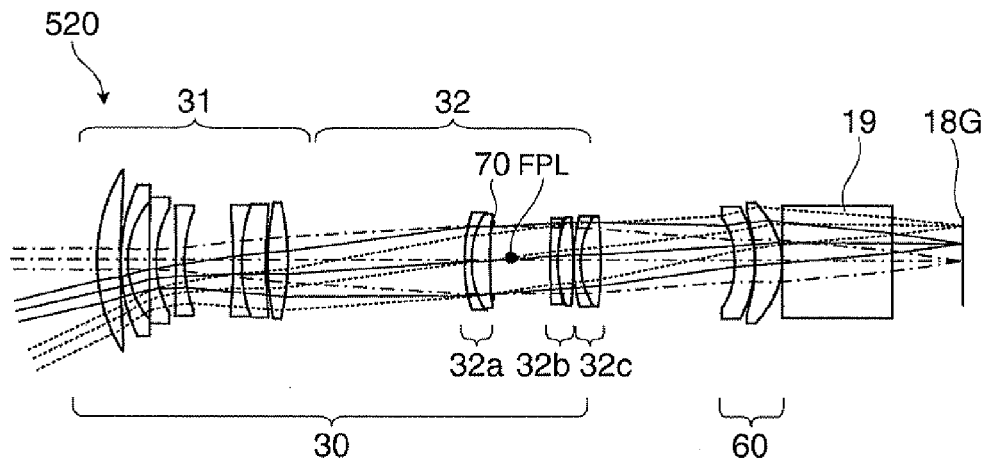
FIGS. 35A to 35C are views illustrating the zooming operation of the optical system in the second operating state of the Example 3.
Figure 35B:
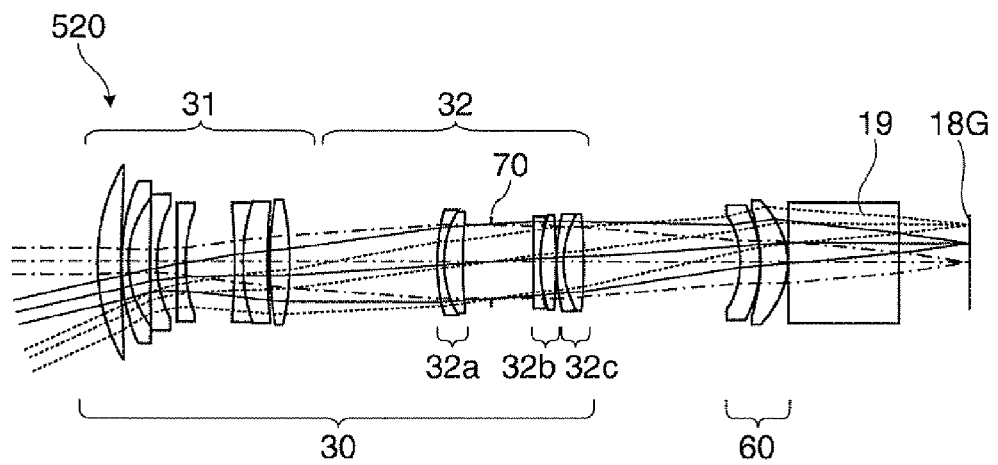
Figure 35C:
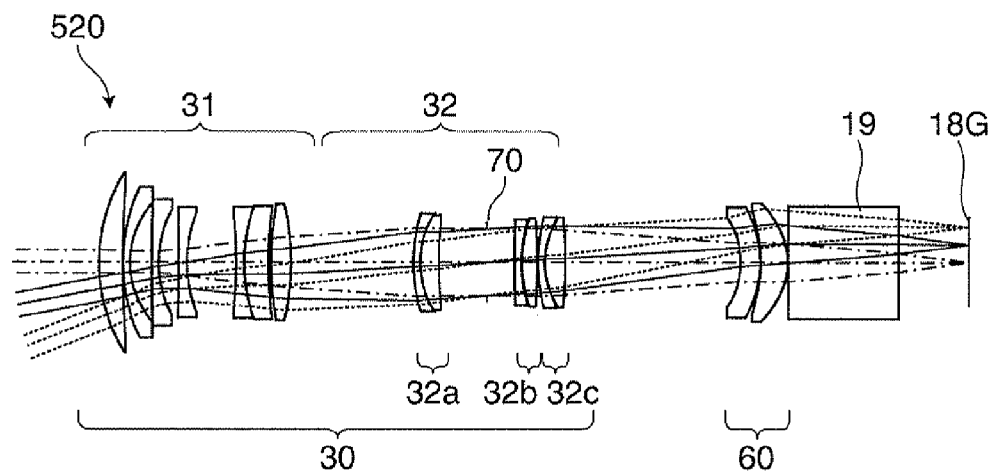

FIGS. 34A to 34C illustrate the zooming operation in the first operating state, and FIGS. 35A to 35C illustrate the zooming operation in the second operating state. FIG. 34A illustrates the state of FIG. 30 of the first operating state, and the case of a "wide end" in which a magnification power is large. Further, FIG. 34B illustrates the case of an "intermediate" state, and FIG. 34C illustrates the state of FIG. 29 and illustrates the case of a "tele end" in which a magnification power is small. In the same manner, FIG. 35A illustrates the case of a "wide end" in the second operating state, FIG. 35B illustrates the case of the "intermediate" state, and FIG. 35C illustrates the case of "tele end". As shown in the drawings, in association with the zooming operation, the position of the diaphragm 70 is changed. However, the diaphragm 70 is located between the focus FPy of the longitudinal section and the focus FPx of the lateral section, and arranged closer to the subject side, that is, a focus FPx side, than the intermediate position between the focus FPy of the longitudinal section and the focus FPx of the lateral section.

In the top columns of the below Table 11 and Table 12, the positions of each lens groups 32a, 32b, and 32c of the second lens unit 32 and the diaphragm 70, obtained when the zooming operations shown in FIGS. 34A to 34C and FIGS. 35A to 35C are performed, are displayed. In particular, the image side surface of the lens L8 of the lens group 32a is a thirteenth surface, the image side surface of the lens L10 of the lens group 32b is a sixteenth surface, and the image side surface of the lens L12 of the lens group 32c is a twenty-fourth surface.

TABLE 11

| Surface No. | Wide | Middle | Tele |
|---|---|---|---|
| Variable portion | | | |
| 13 | 57.847 | 48.272 | 39.693 |
| 16 | 1.000 | 8.685 | 15.547 |
| Diaphragm | 18.524 | 14.136 | 9.130 |
| 24 | 2.408 | 8.685 | 15.408 |
| Focal distance | | | |
| fx | 21.300 | 23.400 | 25.600 |
| fy | 28.160 | 30.931 | 33.837 |
| Fno | | | |
| Fx | 3.07 | 3.17 | 3.28 |
| Fy | 4.06 | 4.19 | 4.33 |

TABLE 12

| Surface No. | Wide | Middle | Tele |
|---|---|---|---|
| Variable portion | | | |
| 13 | 57.847 | 48.272 | 39.693 |
| 16 | 1.000 | 8.685 | 15.547 |
| Diaphragm | 18.524 | 14.136 | 9.130 |
| 24 | 43.678 | 49.955 | 56.678 |
| Focal distance | | | |
| f | 24.489 | 26.903 | 29.432 |
| Fno | | | |
| F | 3.43 | 3.54 | 3.66 |

In addition, the intermediate columns of Table 11 and Table 12 indicate the focal distances between the X direction and Y direction of the optical projection system 520 when the zooming operation is performed. Further, the bottom columns of Table 11 and Table 12 indicate the brightness (F value) in the X direction and Y direction of the optical projection system 520 when the zooming operation is performed.

In addition, in the description of the fifth embodiment, various types of free-form surfaces can be applied as the surface shape of the first and second optical device groups 541 and 542. For example, aspherical surfaces can be applied.

The invention is not limited to the above-described embodiments and can be implemented using various types of illustrative embodiments without departing from the gist of the invention.

Further, in the optical projection system 420 according to the fourth embodiment or the optical projection system 520 according to the fifth embodiment, it is possible to perform conversion in which expansion is performed in the longitudinal direction and compression is performed in the lateral direction as shown in FIG. 16A or the like, in addition to the conversion in which compression is performed in the longitudinal direction and enlargement is performed in the lateral direction. Further, the invention can be configured such that the third group 69 is not included, as illustrated in FIG. 17A or the like.

Although the position of the diaphragm 70 is changed in accordance with the zooming operation, the position of the diaphragm 70 is not changed and maintains a fixed state in, for example, the first operating state and the second operating state shown in FIGS. 6A to 6C. However, in addition to the change in accordance with the zooming operation, the change of the position of the diaphragm 70 may be implemented by switching it in a stepwise manner in the first operating state and the second operating state based on the relationship with each of the focuses FPx, FPy, and FPL, thereby further increasing the telecentricity. For example, when the drive mechanism 61 has a structure with which two cam mechanisms are combined, two types of operations, that is, a continuous operation in accordance with the zooming operation and a stepwise operation in accordance with the change of the first operating state for the second operating state, can be performed with respect to the change in the position of the diaphragm 70.

The liquid crystal panels 18G, 18R, and 18B are not limited to the transmission type and can be a reflective type. Here, "the transmission type" means that the liquid crystal panel passes modulated light therethrough, and the "reflective type" means that the liquid crystal panel reflects modulated light thereon.

Although various colors of images formed on the plurality of liquid crystal panels 18G, 18R, and 18B are combined with each other in the above-described projector 2, an image formed on a certain color or monochrome liquid crystal panel, which is a single light modulation device, can be enlarged and then projected using the optical projection system 20. In this case, since the cross dichroic prism 19 is not necessary, the degree of freedom of the optical design of the optical projection system 20 increases.

As the projector, there are a front projector in which image projection is performed from a direction in which a surface to be projected is observed, and a rear projector in which image projection is performed from a direction which is opposite to the direction in which a surface to be projected is observed. However, the projector shown in FIG. 2 or the like can be configured with any of them.

Instead of the liquid crystal panels 18G, 18R, and 18B, a digital micro mirror device or the like, which uses a micro mirror as a pixel, can be used as the light modulation device.

The entire disclosure of Japanese Patent Application No. 2011-147999, filed Jul. 4, 2011 is expressly incorporated by reference herein.

What is claimed is:

1. A optical projection system which, when an image is enlarged and projected on a surface to be projected, makes an aspect ratio of an image of a light modulation device different from an aspect ratio of the image projected on the surface to be projected, the optical projection system comprising:
   a diaphragm which restricts a passage of light flux; and
   a light modulation device side lens group which is arranged between the light modulation device and the diaphragm, configured to have different powers in a longitudinal direction and a lateral direction of the light modulation device, and configured to include an adjustment optical device group capable of advancing and retracting on an optical path,
   wherein the adjustment optical device group integrally advances and retracts on the optical path, and changes a focus in a side of the surface to be projected in a lateral section and a focus in a side of the surface to be projected in a longitudinal section of a subject side lens group; and
   wherein, when it is assumed that a distance between the focus in a side of the surface to be projected and an end surface in the side of the surface to be projected is set to "FFPx" in the lateral section of the light modulation device side lens group in a state in which the adjustment optical device group is arranged on the optical path, a distance between the focus in the side of the surface to be projected and the end surface in the side of the surface to be projected is set to "FFPy" in the longitudinal section of the light modulation device side lens group in the state in which the adjustment optical device group is arranged on the optical path, and a distance between the focus in the side of the surface to be projected and the end surface in the side of the surface to be projected is set to "FFPL" in the light modulation device side lens group in a state in which the adjustment optical device group is withdrawn from the optical path, FFPx, FFPy, and FFPL satisfy the following expressions:

$FFPx<FFPL<FFPy$ if $FFPx<FFPy$, and $FFPy<FFPL<FFPx$ if $FFPy<FFPx$.

2. The optical projection system according to claim 1, wherein, when it is assumed that a distance between the diaphragm and the end surface in the side of the surface to be projected in the light modulation device side lens group, is "p" in the state in which the adjustment optical device group is arranged on the optical path, p satisfies the following expressions:

$FFPx<p<FFPy$ if $FFPx<FFPy$, and $FFPy<p<FFPx$ if $FFPy<FFPx$.

3. The optical projection system according to claim 2, wherein the distance p, between the diaphragm and the end surface in the side of the surface to be projected in the light modulation device side lens group, is substantially equal to the distance FFPL between the focus in the side of the surface to be projected in the light modulation device side lens group and the end surface in the side of the surface to be projected in the state in which the adjustment optical device group is withdrawn from the optical path.

4. The optical projection system according to claim 2, wherein $FFPx<p\leq(FFPy+FFPx)/2$ if $FFPx<FFPy$, and wherein $FFPy<p\leq(FFPy+FFPx)/2$ if $FFPy<FFPx$.

5. The optical projection system according to claim 1, wherein the adjustment optical device group includes a rotationally symmetric lens group which includes at least one or more rotationally symmetric lenses.

6. The optical projection system according to claim 1, wherein the adjustment optical device group includes:
   at least one or more first anamorphic lens groups each having stronger power in one of the longitudinal direction and the lateral direction of the light modulation device than in a remaining direction; and
   at least one or more second anamorphic lens groups each having stronger power in the remaining direction than in the one direction.

7. The optical projection system according to claim 1, wherein the adjustment optical device group includes at least one or more free-form surface lenses each having power to which positive power and negative power are combined in the longitudinal direction and the lateral direction of the light modulation device.

8. The optical projection system according to claim 7, wherein the adjustment optical device group includes at least two free-form surface lenses in which positive power and negative power are interchanged in the longitudinal direction and the lateral direction of the light modulation device.

9. The optical projection system according to claim 5, wherein the adjustment optical device group includes a first optical device group which has positive power in a section of the longitudinal direction of the light modulation device, a second optical device group which is arranged closer to the light modulation device side than the first optical device group and which has negative power, and the rotationally symmetric lens group, and
   wherein the rotationally symmetric lens group includes a first rotationally symmetric lens which has negative power, and a second rotationally symmetric lens which is arranged closer to the light modulation device side than the first rotationally symmetric lens, and which has positive power.

10. The optical projection system according to claim 5, wherein the adjustment optical device group includes a first optical device group which has negative power in a section of the lateral direction of the light modulation device, a second optical device group which is arranged closer to the light modulation device side than the first optical device group and which has positive power, and the rotationally symmetric lens group, and
    wherein the rotationally symmetric lens group includes a first rotationally symmetric lens which has positive power, and a second rotationally symmetric lens which is arranged such that the second rotationally symmetric lens is closer to the light modulation device side than the first rotationally symmetric lens and which has negative power.

11. The optical projection system according to claim 6, wherein the first anamorphic lens group includes, in order from the side of the surface to be projected, a first anamorphic lens which has positive power, and a second anamorphic lens which has negative power in the section of the longitudinal direction of the light modulation device, and
    wherein the second anamorphic lens group includes, in order from the side of the surface to be projected, a third anamorphic lens which has negative power, and a fourth anamorphic lens which has positive power in the section of the lateral direction of the light modulation device.

12. The optical projection system according to claim 8, wherein each of the two free-form surface lenses includes, in order from the side of the surface to be projected, a first free-form surface lens which has positive power, and a second free-form surface lens which has negative power in the section of the longitudinal direction of the light modulation device.

13. The optical projection system according to claim 1, in order from the side of the surface to be projected, further comprising:
   a first group which performs enlargement;
   a second group which is the adjustment optical device group having different powers in the longitudinal direction and the lateral direction of the light modulation device, and capable of advancing and retracting on the optical path; and
   a third group having positive power.

14. The optical projection system according to claim 1, in order from the side of the surface to be projected, further comprising:
   a first group which performs enlargement; and
   a second group which is the adjustment optical device group having different powers in the longitudinal direction and the lateral direction of the light modulation device, and capable of advancing and retracting on the optical path.

15. The optical projection system according to claim 1, further comprising:
   a photosynthesis prism which is arranged in the side of the light modulation device of the light modulation device side lens group.

16. A projector comprising:
   the optical projection system according to claim 1; and
   the light modulation device.

17. A projector comprising:
   the optical projection system according to claim 2; and
   the light modulation device.

18. A projector comprising:
   the optical projection system according to claim 3; and
   the light modulation device.

19. A projector comprising:
   the optical projection system according to claim 4; and
   the light modulation device.

20. A projector comprising:
   the optical projection system according to claim 5; and
   the light modulation device.

* * * * *